US005576844A

United States Patent [19]
Anderson et al.

[11] Patent Number: 5,576,844
[45] Date of Patent: Nov. 19, 1996

[54] COMPUTER CONTROLLED VIDEO INTERACTIVE LEARNING SYSTEM

[75] Inventors: Ronald K. Anderson, Aloha; Duane F. Benson, Canby; Michael K. Crock, Lake Oswego; Bruine R. Hack, Wilsonville; James E. Howard, Portland, all of Oreg.; Ray S. McKaig, Boulder Creek, Calif.; John Peers, West Linn, Oreg.

[73] Assignee: Unilearn, Inc., Wilsonville, Oreg.

[21] Appl. No.: 300,990

[22] Filed: Sep. 6, 1994

[51] Int. Cl.[6] .............................. H04N 5/91; H04N 9/79; H04N 5/76; G11B 27/02
[52] U.S. Cl. .................................. 386/52; 386/96
[58] Field of Search ............................. 358/341, 335, 358/343, 311; 360/13, 14.1, 14.2, 14.3, 19.1; 348/552; H04N 5/76, 5/78, 5/92, 9/79, 5/91

[56] References Cited

U.S. PATENT DOCUMENTS

| | | |
|---|---|---|
| 3,878,560 | 4/1975 | Ramage . |
| 3,987,484 | 10/1976 | Bosche et al. . |
| 4,359,223 | 11/1982 | Baer et al. . |
| 4,384,284 | 5/1983 | Juso et al. . |
| 4,466,023 | 8/1984 | Busby . |
| 4,490,810 | 12/1984 | Hon . |
| 4,598,324 | 7/1986 | Efron et al. ............................. 358/341 |
| 4,634,386 | 1/1987 | Tamaki . |
| 4,684,349 | 8/1987 | Ferguson et al. . |
| 4,798,543 | 1/1989 | Spiece . |
| 4,965,675 | 10/1990 | Hori et al. .............................. 358/341 |
| 5,043,829 | 8/1991 | Hahn ..................................... 358/311 |
| 5,408,330 | 4/1995 | Squicciarini et al. ................... 358/341 |
| 5,497,241 | 3/1996 | Ostnover et al. ...................... 358/341 |

FOREIGN PATENT DOCUMENTS

| | | |
|---|---|---|
| 0008124 | 8/1979 | European Pat. Off. . |
| 2083264 | 8/1981 | United Kingdom . |

OTHER PUBLICATIONS

The End of the Skilled–Labor Shortage advertisement, Business Week, Mar. 1967.
The Blackboard is Obsolete advertisement, Time Magazine, Oct. 1972.
Computer Augmented Video Education, M. B. Sousa, Educational Technology, Feb. 1979.

Primary Examiner—Thai Q. Tran
Attorney, Agent, or Firm—Chernoff, Vilhauer, McClung & Stenzel

[57] ABSTRACT

A computer controlled video interactive courseware system is designed for the generation, viewing, and duplication of interactive instructional video tapes. An interactive instructional videotape contains video segments located on the stereo-video portion of a tape containing live-motion video images for the presentation of a lesson. Portions of the stereo-video portion of the tape contains video signals that contain digitally encoded information which is retrieved by the computer during playback of the tape. The digital information extracted from the videotape contains computer instructions to provide interactivity with students. Interactivity could include a presentation of questions to the student and based on the student's response to the question presenting selected video segments from the video tape. Preferably, the video cassette recorder is S-VHS which provides for increased bandwidth and uses a higher quality tape medium than standard VHS tape medium.

1 Claim, 44 Drawing Sheets

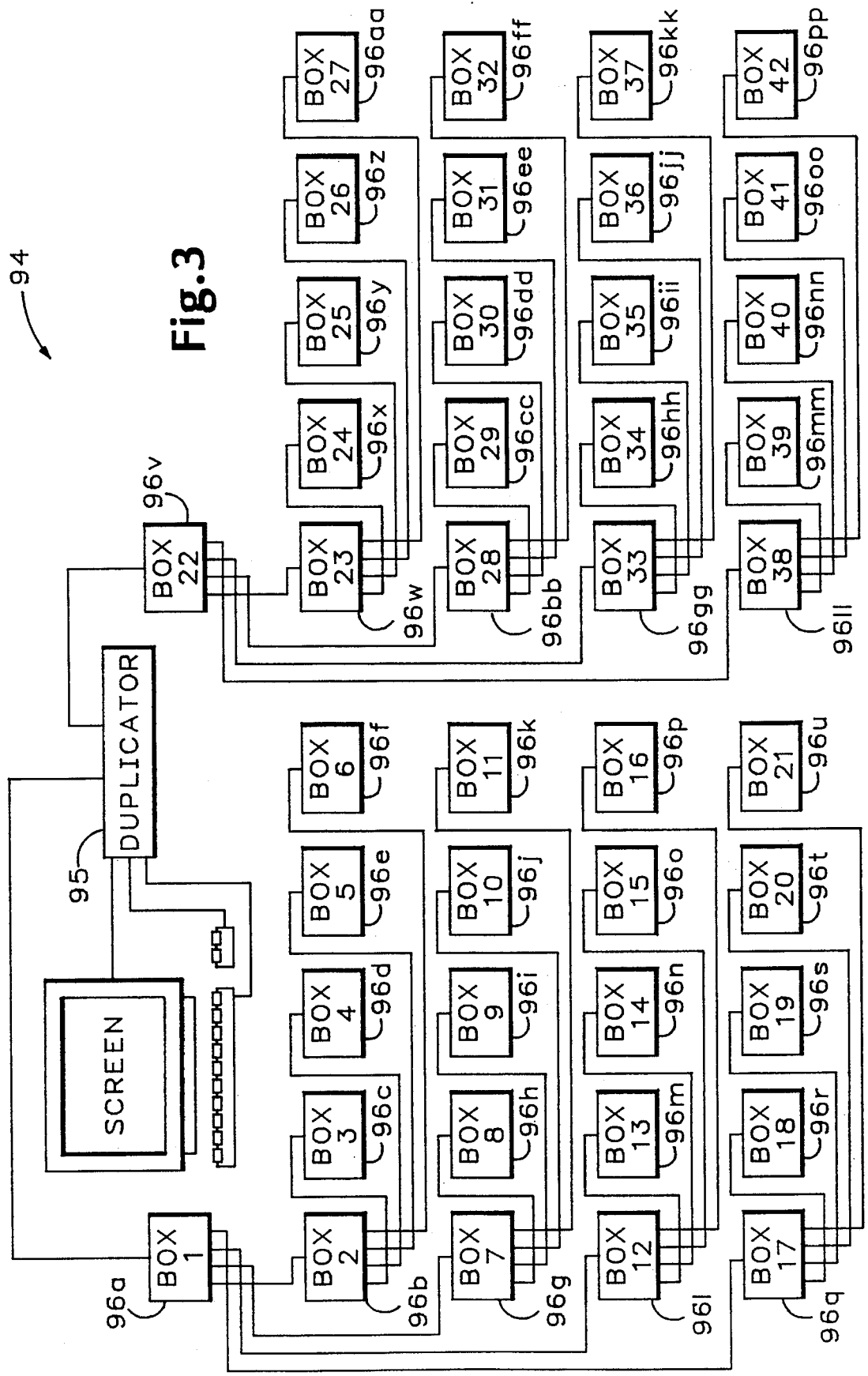

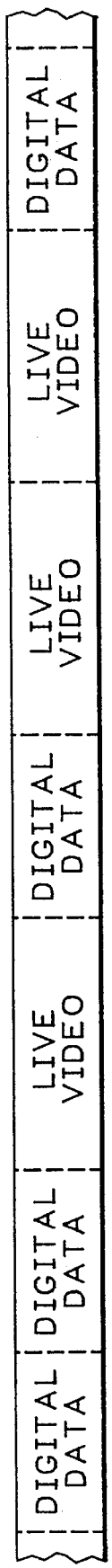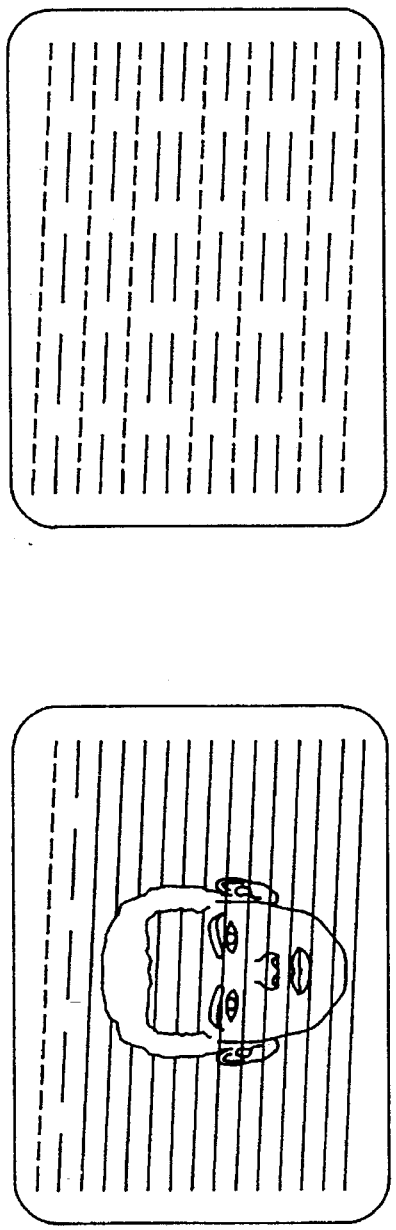

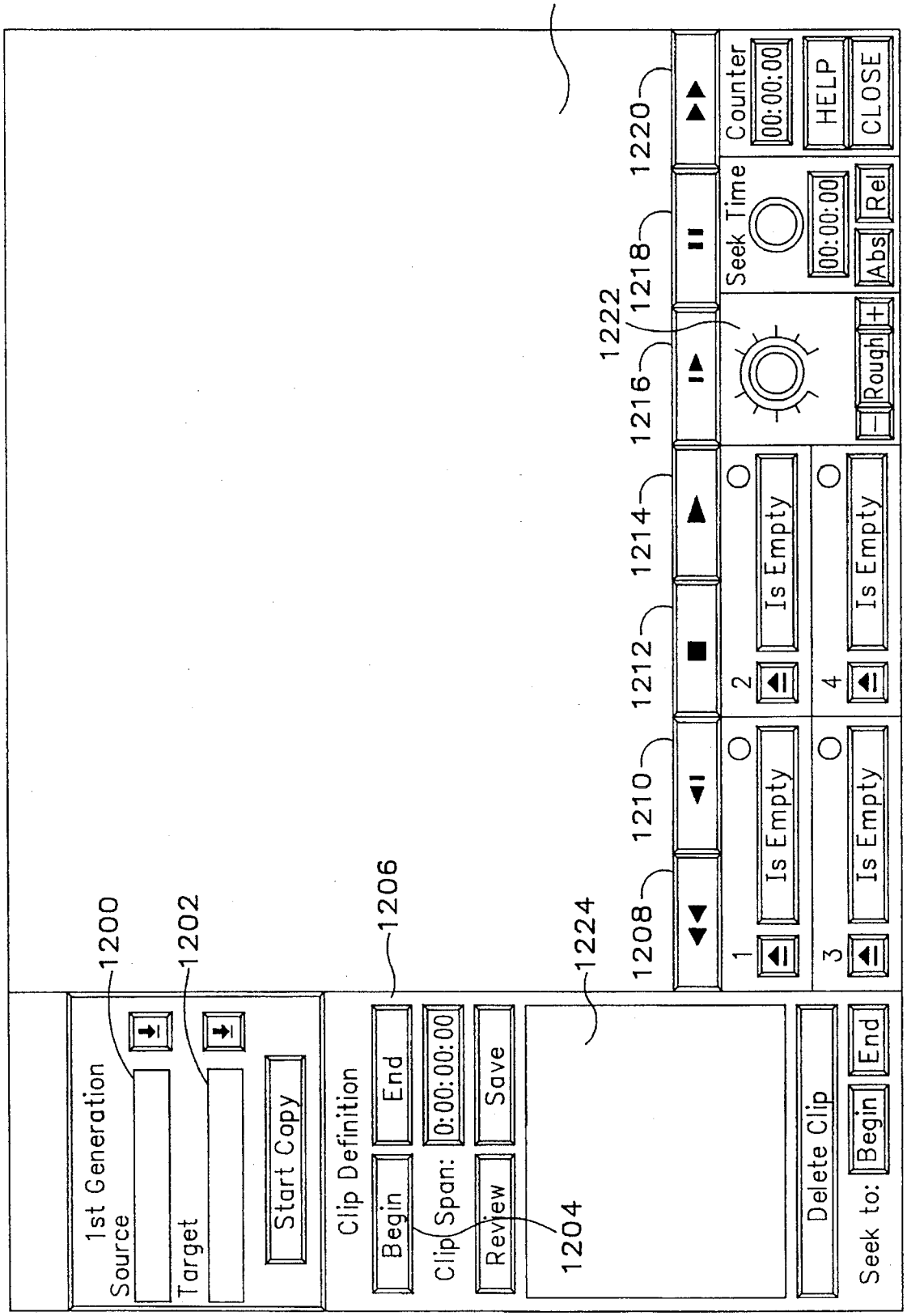

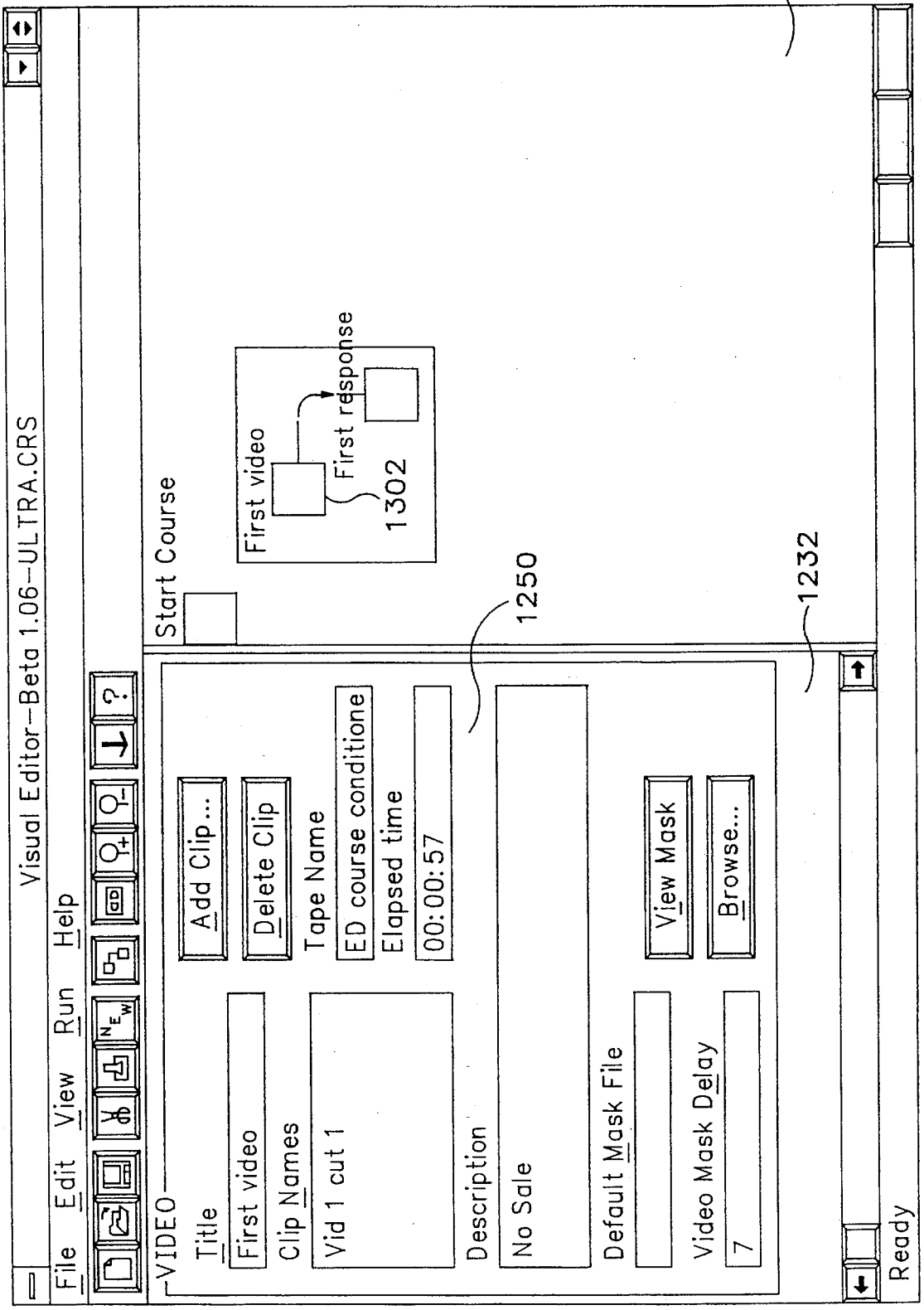

BUILD COURSE MASTER OVERVIEW OF PROCESS

COMPUTER CONTROLLED VIDEO INTERACTIVE LEARNING SYSTEM

BACKGROUND OF THE INVENTION

The present invention relates generally to an interactive audio video learning system, and more particularly to an interactive learning system that stores analog and digital information on a videotape.

In homes, industry, and educational institutions throughout the world, there is a continuous need to learn information and to provide training on a multitude of topics. A traditional educational format is that of a teacher lecturing from his a pulpit with students taking notes of the information presented. While this approach is adequate, the student's interaction is limited.

Another learning approach is to view video tapes to acquire the course information. This approach even more severely limits the student's ability to interact with the lesson presented. Further, a student cannot further explore those topics which he finds difficult, or skip those sections he already knows adequately without manually rewinding and fast forwarding a tape, if the information is contained on the tape. After a lesson is presented on videotape, many instructors ask that the student answers questions relating to the topic presented on the tape. This testing technique is after the fact and provides no feedback to students while they are learning the information. Further, videotape presentations do not permit the student to interact with the tape and, accordingly, the student may frequently become bored and lose interest.

What is desired is a videotape presentation system and method that allows a student to interact with the video segments on the videotape. Such a system would increase a student's ability to retain the information presented and allow a course to be more specifically tailored for a particular student depending on the student's particular needs.

SUMMARY OF THE PRESENT INVENTION

The present invention overcomes the aforementioned drawbacks of the prior art by providing a computer controlled video interactive courseware system for the generation, viewing, and duplication of interactive instructional video tapes. An interactive instructional videotape contains video segments located on the stereo-video portion of a tape containing live-motion video images for the presentation of a lesson. Sections of the stereo-video portion of the tape contains video signals that contain digitally encoded information which is retrieved by the computer during playback of the tape. The digital information extracted from the videotape contains computer instructions and other digital information to provide interactivity with students. Interactivity could include a presentation of questions to the student and based on the student's response to the question presenting selected video segments from the video tape. Preferably, the video cassette recorder is S-VHS which provides for increased bandwidth and uses a higher quality tape medium than standard VHS tape medium.

Preferably, the video interactive courseware system is embodied in three separate systems, namely an editing system, a viewing system, and a duplicating system.

The editing system is designed to facilitate an instructors creation of a video interactive courseware tape. The courseware tape is a single tape that includes all the information necessary for a particular course. To obtain the desired interactivity with a student, a portion of the video signal contains digitally encoded information stored on the courseware tape. The digital information includes computer instructions and data to provide the interactivity when viewing the courseware tape on the viewing system. As an incidental aspect of the editing system, viewing of courseware tapes may be accomplished in a manner similar to the viewing system.

The viewing system, preferably a reduced capability version of the editing system, is designed to allow students to view and interact with the courseware tape. The video segments stored on the tape are viewed on a screen. The digital information is extracted from the digitally encoded video signal and used by the viewing system to provide interactivity. The viewing system allows student responses and other data of interest to be recorded, while a tape is being viewed, by storing the data on the linear audio track of the tape.

The duplicating system, preferably a modified version of the editing system, includes specialized software to permit the duplication of many courseware tapes simultaneously.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 3 is an exemplary embodiment of the duplicating system of the present invention.

FIG. 4 is a pictorial representation of video tape, including video signals with digital encoded information and video segments.

FIG. 5 is a pictorial representation of video tape, indicating the stereo video and linear audio track portions of the tape.

FIG. 6 is a pictorial representation of a computer screen showing a video image.

FIG. 7 is a pictorial representation of a computer screen showing digital data.

FIG. 25b is a representation of a possible screen view for controlling the method and apparatus of FIG. 25a.

FIG. 27a–27i are representation of preferred screen views for the method and apparatus of FIGS. 26a–26d.

DETAILED DESCRIPTION OF THE PREFERRED EMBODIMENT

Unlike a standard videotape which is usually passively viewed from start to finish, an interactive video instructional tape allows a student to interact with the tape. Such interaction could consist, by way of example, of answering questions which allow a variable order to the presentation of video segments depending on a particular student's responses. Allowing a student to interact with a lesson that is presented using a video format increases the student's ability to learn and retain the information presented. In addition, saving the student's responses on some recordable medium permits an instructor to evaluate the student's progress.

One use for an instructional interactive tape might be to teach the operation of a forklift. The tape could present the basic operational skills required for a forklift followed by a series of questions to be answered by the student. Based on the student's responses to the questions posed, additional video segments could be presented to teach the student those topics where additional training is necessary.

A video interactive courseware system for the generation, viewing, and duplication of interactive video instructional tapes preferably consists of three related systems, namely, an editing system 90, a viewing system 92, and a duplicating system 94. First, a general description of each system will be presented, followed by a more detailed description.

Figure 1:
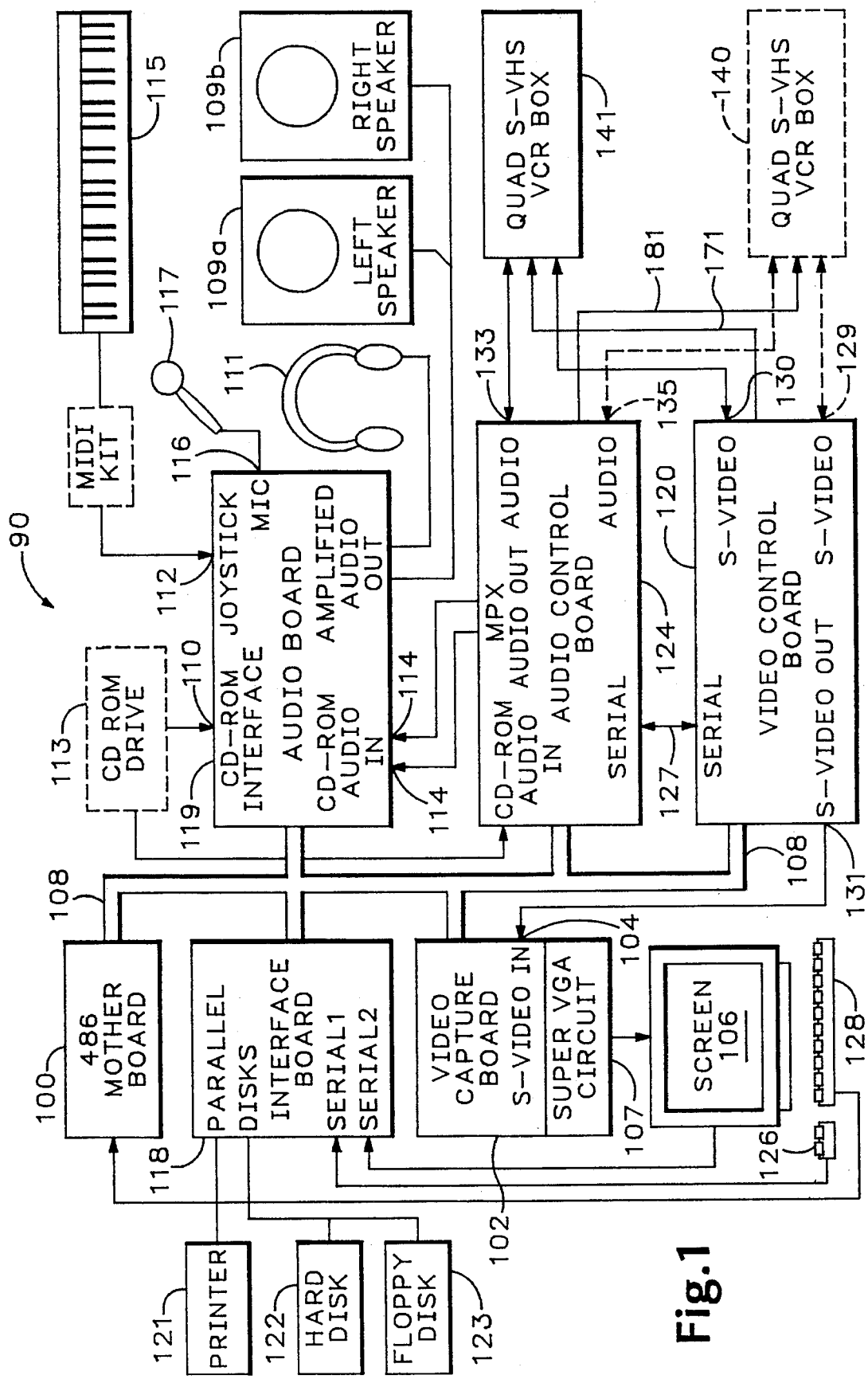
FIG. 1 in an exemplary embodiment of the editing system of the present invention.

Referring to FIG. 1, the preferred embodiment of the editing system 90 is designed to facilitate an instructor's generation (e.g., creation and editing) of interactive video courseware that is easy to use and reliable. The present invention preferably stores all necessary information for a completed interactive instructional video courseware tape to a single medium, e.g., one magnetic tape. A videotape is a highly desirable medium because of its inherent capability to record segments of video and view the recorded video segments at the normal video rate of speed of thirty (30) frames (pictures) per second. Other storage mediums, such as hard disks, may store video segments, albeit in a digital format. Systems using these alternate storage means which have enough data storage and which are capable of retrieving the data at normal video rates are prohibitively expensive.

To obtain interactivity with students, digitally encoded information, in addition to the video segments, is stored on the tape. The digitally encoded information preferably includes instructions and data used by the video interactive courseware system. These codes are encoded on the videotape by the editing system 90. Examples of tasks which could be encoded include displaying digital images, playing digital audio, placing text on video images, asking questions and receiving responses from the student, evaluating student responses, selecting the appropriate course of action based on student responses, and saving student responses. An incidental feature of the editing system 90 is that the video courseware may be viewed as though the tape is being played by the viewing system 92 (see FIG. 2). The editing system 90 permits numerous video segments to be recorded in any order on the tape, along with necessary digital information, to control the order of presentation and provide interactivity with the student.

Figure 2:
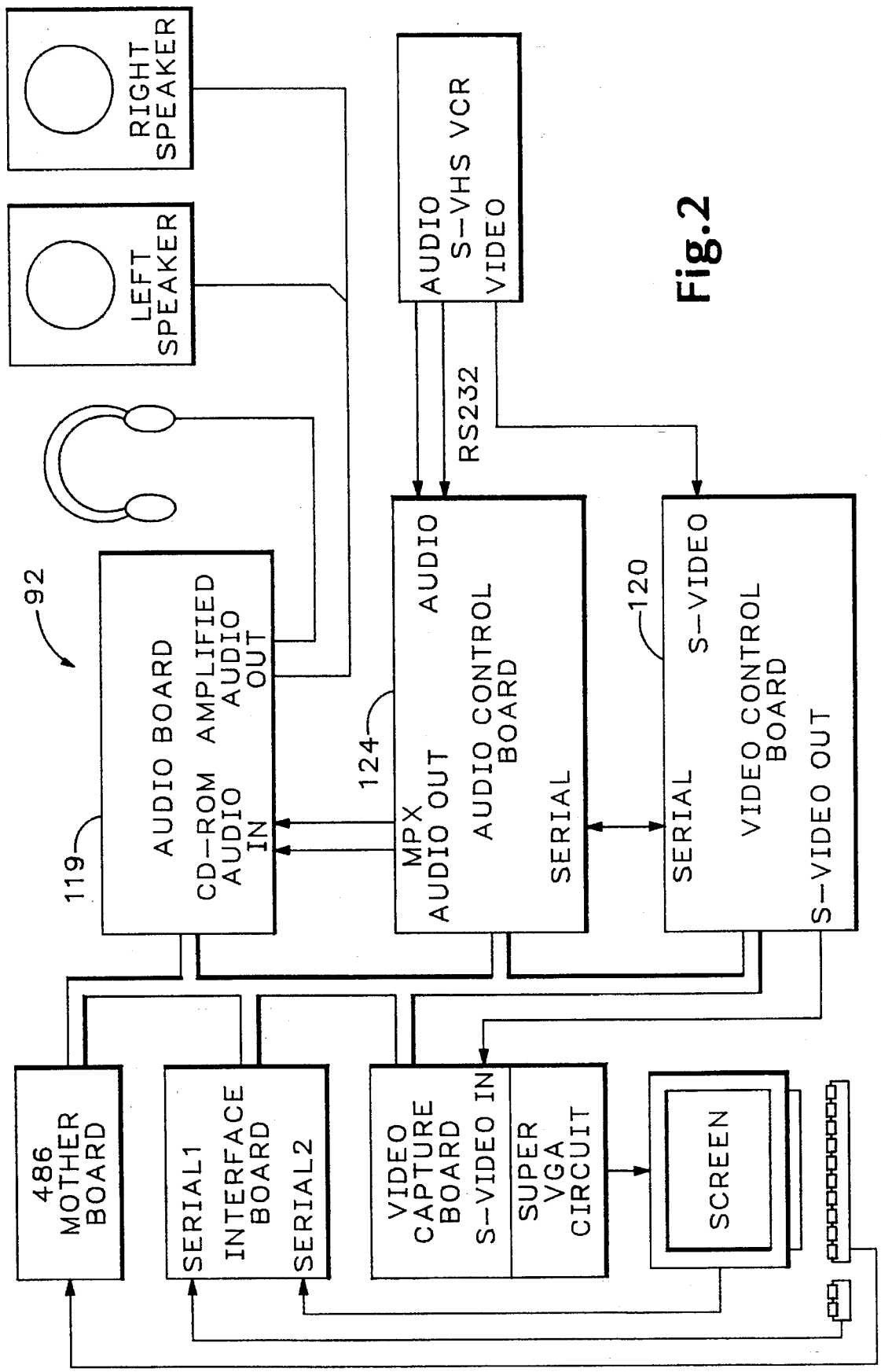
FIG. 2 is an exemplary embodiment of the viewing system of the present invention.

Referring to FIG. 2, the viewing system 92 is preferably a reduced-capability version of the editing system 90 designed to allow students to view and interact with the interactive video courseware tape that was generated on the editing system 90. To provide the interactivity with the student, the viewing system 92 recovers the digital information stored on the tape during playback, and allows the student to make responses to questions posed. The digital information also supplies any other data desired for the viewing system 92, including the order of presentation of the video segments. Student responses, and other data of interest may be recorded onto the same video courseware tape for future use or review.

Figure 11:
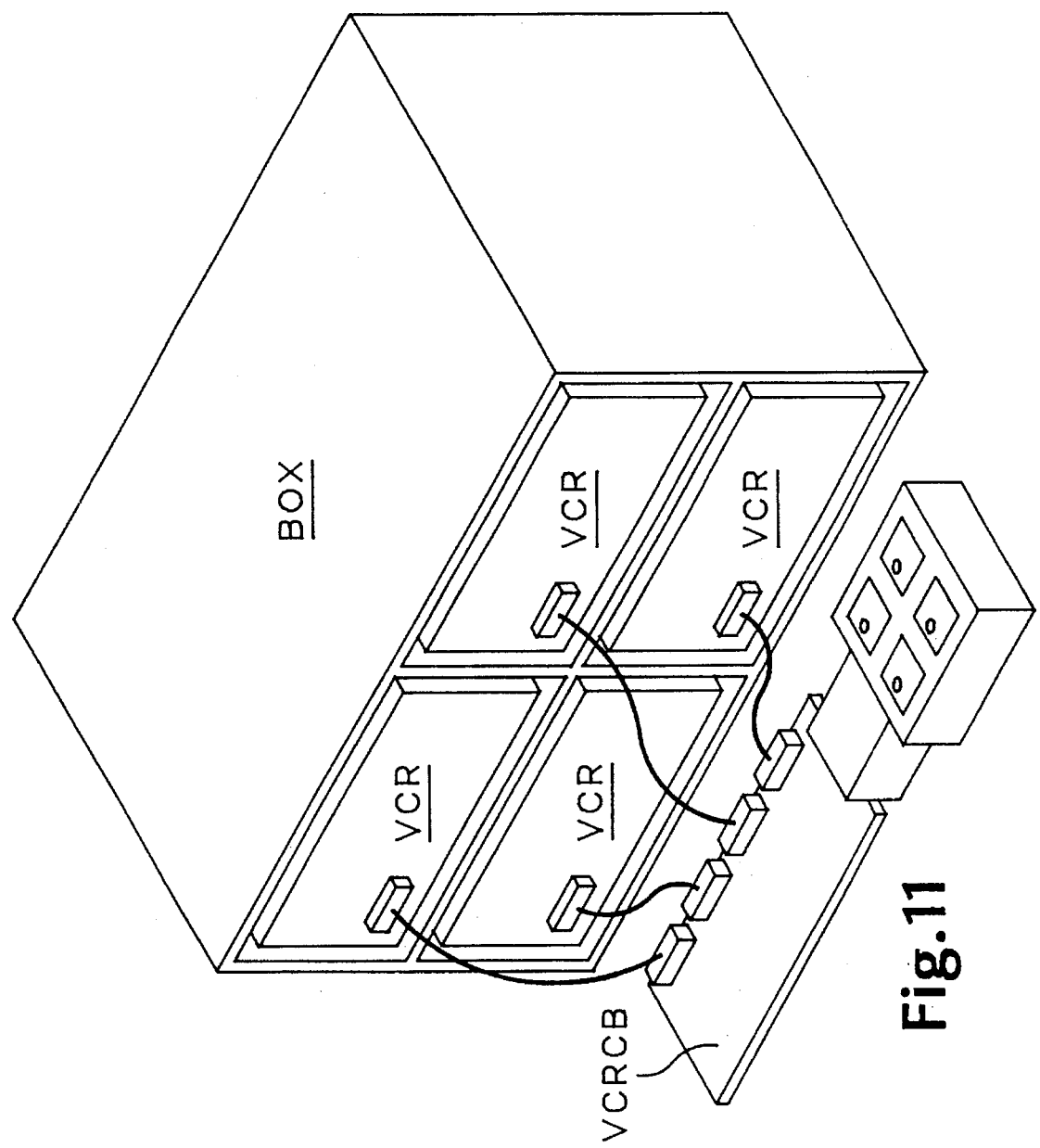
FIG. 11 is a pictorial representation of a box containing a video cassette recorder control board and four associated video cassette recorders.

Referring to FIG. 3, the duplicating system 94 is preferably a modified version of the editing system 90 that includes specialized software for controlling local (e.g., external to the computer) video cassette recorder control boards (hereinafter referred to as VCRCBs) that in turn each control a group of VCRs. The VCRCBs are connected in a network fashion to allow creation of multiple simultaneous duplicate video courseware tapes. The duplicator system 94 includes a complement of VCRs grouped in boxes 96a–96pp. Each box preferably includes a single VCRCB housed with VCRs (see FIG. 11). In the preferred embodiment, each VCRCB in the duplicator system 94 includes an eight-channel board housed externally to the duplicator 95. Four channels of the VCRCB control four separate VCRs. The remaining four channels are dedicated for external use. The number of channels on the VCRCB could be decreased or increased as desired. The boxes 96a–96pp are preferably arranged in two pyramids by connecting the external channels of one VCRCB to four other VCRCB's to create a network of interlinked boxes. Any suitable number of boxes can be networked together to provide the desired number of VCRs. One VCRCB can provide the duplicator 95 with a source of a video segment from a VCR that it directly controls, while a selected group or all of the other VCRs within either or both pyramids can be used simultaneously as the target of the video segment. Each VCRCB is responsible for controlling and switching video signals, digital information and control commands (signals) throughout the network of VCRs of the duplicator system 94. The video signal from the source tape is routed through the VCRCB network to an audio and video control board (as will be described herein) in the duplicator 95 (located in the main system) and is then redistributed through the VCRCB network to the target VCRs.

The following is a detailed description of the editing system 90, viewing system 92, and duplicating system 94. Thereafter follows a more detailed description of the actual circuit boards and specifications.

EDITING SYSTEM

Referring to FIG. 1, the editing system 90 is preferably based around an Intel processor-based 486 mother board 100, or other suitable microprocessor based mother board, which utilizes system firmware for communication protocols to other portions of the editing system 90. A keyboard 128 or other input means is connected to the mother board 100 for student input. The mother board 100 also executes the editing software 1000 used by an instructor for the design and control of the recording of an interactive video courseware tape. In combination with the mother board 100, the editing system 90 uses specialized circuit boards to record and retrieve video signals and digital information from the videotape and display an appropriate image on the screen 106. The recordation and retrieval of digital information on the tape is a critical function necessary for a versatile interactive video courseware system. To provide the aforementioned functions, the editing system 90 uses several vendor supplied circuit boards.

The first of the vendor supplied circuit boards is a video-capture board 102 for displaying live-motion video on a computer screen 106. The video-capture board 102 receives video signals supplied to its video input 104, preferably in VHS or S-VHS format. The computer screen 106 may be a touch screen which allows students to make input directly through the screen 106. The editing system 90, receives video signals from the tape for display on the video-capture board 102. Further, the editing system 90 retrieves digital information from the tape. Some of the digital information may be digital images which the mother board 100 may send to the video-capture board 102 via the system bus 108. To allow for maximum usage worldwide, the video-capture board 102 should be capable of accepting video signals through its video input 104 in several standard video formats, such as NTSC (primarily used in the United States), SECAM (primarily used in the Middle East), and PAL (primarily used in Europe). Video signals received by the video capture board's 102 video input 104 or digital images received by the video capture board 102 through the system bus 108 may be routed to the video capture board's 102 super VGA circuit 107 for display to the screen 106, preferably at VGA or SVGA display resolution. The preferred video-capture board 102 is manufactured by Cardinal and is sold under the trademark Snap Plus.

The second of the vendor supplied boards is an audio board 119. The preferred audio board is manufactured by Creative Labs and is sold under the trademark Sound Blaster Pro. The audio board 119 is an 8-bit (16-bit or 32-bit) sound board that preferably receives audio input, synthesizes music, and generates amplified audio output to drive an audio output device, such as a set of speakers 109a and 109b or headphones 111. The audio board 119 has analog inputs 110, 112, 114 and 116 for accepting analog audio signals originating from various attached devices such as a CD rom drive 113, musical keyboard 115, audio control board 124, and microphone 117, respectively. The audio board 119 is preferably connected to the system bus 108 to accept digitized audio signals.

A third vendor supplied board is an interface board 118 which allows sending output to and receiving input from external devices, such as a printer 12, hard disk 122, floppy disk 123, mouse 126, or other suitable device. The interface board 118 communicates with the editing system 90 through the system bus 108.

A single circuit board could be designed and fabricated to integrate the video capture board 102, the audio board 119 and the interface board 118. Such a custom circuit board would reduce the cost of purchasing three separate circuit boards.

In addition to the aforementioned vendor supplied circuit boards 100, 102, 118 and 119, a specially designed video control board 120 (described below) and a audio control board 124 (described below) are used which respectively primarily process video and audio signals.

The video control board 120 (hereinafter referred to as VCB) preferably includes a NEC V53 microprocessor 201 and on-board RAM 216 to permit it to process control commands and data independently from the mother board 100. The independent processing capability of the VCB 120 increases the overall performance of the editing system 90 by relieving the mother board 100 from performing those tasks that the VCB 120 performs. The VCB 120 is connected to the system bus 108 to permit high-speed data communications between different boards of the editing system 90. Although the VCB 120 may use the system bus 108 to communicate with any board connected to the system bus 108, the VCB 120 primarily uses the system bus 108 to communicate with the mother board 100. The VCB 120 includes a serial interface 127 to allow bidirectional serial communication with an audio control board 124, and one serial interface 171 to allow serial communication to box 141. The VCB 120 also has two video interfaces 129 and 130 to allow connection to respective boxes 140 and 141. Boxes 140 and 141 may also be VCRCB pyramids, each of which contain several boxes networked together. Additionally, the VCB 120 uses DMA (direct memory access) of its own internal memory to transfer data. The advantage of the VCB 120 having DMA is that it allows concurrent internal tasks within the VCB 120 to be performed. The VCB 120 includes circuitry to facilitate the recording and reading of video signals to selected VCRs within boxes 140 and 141.

Each VCR within boxes 140 and 141 has a separate address so that video signals and digital information sent from the VCB 120, will be acted upon only by the appropriate VCR(s). Conversely, when reading video signals and digital information only the appropriate VCR is selected by its address. The specific details on the encoding method used for recording and retrieval of the digital information and video segments is described later.

The storage of digital information on alternative mediums, such as magnetic disks, would require additional expensive hardware which increases the likelihood of system breakdown, and eliminates the simplicity achieved by using a single inexpensive medium, such as tape, for an entire interactive video course. Additionally, storage of video segments on disk drives requires exceptionally large storage capabilities and the low transfer rates from such disk drives makes it impractical to view live-motion video (30 frames per second). The VCB 120 receives an S-video signal or other suitable format in its S-video inputs 129 and 130. As the video signal is received the VCB 120 monitors the video signal for digital information. Digital information is extracted from the received signal and is transferred to the mother board 100 for further processing. The VCB 120 uses the video signal as a transfer means to record and retrieve digital data or information, and video segments on a single videotape as indicated by FIG. 4. Received video signals that contain video segments are sent via the S-video output 131 to the video capture board 102 for viewing, as shown in FIG. 6. If digital information were sent via the S-video output 131 to the video capture board 102 it will look garbled, as indicated in FIG. 7. Overall, it is readily apparent that the video signal provides live-motion video for viewing on a screen 106 and the video signal also allows encoding of digital information to allow dynamic control of the interactive videotape presentation.

The video and stereo-audio portion of VCR tapes are recorded with a one-time process when they are first generated. Once recorded, the stereo-audio signals on a VCR tape cannot be separately re-recorded because the stereo-audio recording is actually embedded deeper within the tape's oxide surface beneath the video portion of the tape. The video head in a VCR tape is difficult to accurately position to a single frame accuracy. Accordingly, to re-record a portion of the tape over a previous recording is difficult and realistically necessitates overlapping the ends of the previous video segment. Further, re-recording video segments requires re-recording the underlying stereo-audio signals. To obtain the read/write capability desired to save student responses and other desirable information during playback, the linear audio track of a tape is used as a storage location. Referring to FIG. 5, the linear audio track 150 uses a separate signal, in a separate location on the tape, from the stereo-audio and video portion 152, hence modification of the linear audio track does not effect the stereo-audio or video signals 152.

The audio control board 124 (hereinafter referred to as ACB) is connected to the system bus 108 and connected through a audio interface 133 and 135 to respective boxes 141 and 140 to record and read audio signals recorded on the linear audio track of a tape. Also, there is a serial interface 181 to allow serial communication to box 140. Once a digital signal is converted by a modem 274 on the ACB 124 to appropriate audio tones, the audio tones are written on the tape using the VCR's dubbing mode (dubbing mode provides access to the tape's linear audio track). In the preferred embodiment, the data on the linear audio track 150 is recorded and retrieved at 1,200 bits per second, which is about 120 characters per second when using 10 bits per character. Additionally, the ACB 124 can accept control commands from the VCB 120 to control the ACB 124 and external VCRCBs.

The ACB 124 has three primary functions as used in the editing system 90 and viewing system 92.

The first primary function is to control the operation of the source VCR directly. This function is used when the viewing system 92 is configured. Additionally, all VCRCB's are eliminated.

The second primary function is to receive audio signals from the VCR, pan the audio sounds from one speaker to the other, adjust volumes, and send processed signals to the audio board 119. The panning capability specifically accommodates bilingual teaching. By way of example, two audio channels with a different language in each channel can be independently aurally positioned anywhere between the listener's left and right ears at any volume level. If desired, the two channels may be placed in the same aural location.

The third primary function is to process the digital data to be recorded on and that is received from the linear audio track 150 on the tape.

To perform these three primary functions, the ACB 124 operates in two different modes. The first mode, used to perform the second and third primary functions, is a pass-through mode where digital signals from the VCB 120 are converted to audio tones and passed directly to VCRCBs for recording on the tape's linear audio track 150. The ACB's 124 microprocessor also monitors the digital signals as they are received accepting and executing commands. The second mode, used to perform the first, second and third primary functions, does not simply pass digital signals but instead generates command codes to control a VCR connected to its serial port when configured as the viewing system 92.

DATA CONTROL AND ACCESS

The VCB 120, in addition to distributing information in the editing system 90, monitors the closed caption area, also known as the header portion, of the video signal (the area above the television monitor's visual window). Conventional close captioning uses merely a single line of the signal with two characters per frame (60 characters a second) to encode the close caption data seen on a television. This is totally inadequate even for recording a modest amount of digital data. In contrast, the interactive courseware system of the present invention monitors 11 lines of the video signal in each field (two fields produce a full-frame image) all of which are above the viewed image. The VCB 120 is capable of resolving 9 bytes of information from each line of a field. This means in a video courseware development system that can record 99 bytes per field, 198 bytes per frame, 5940 bytes per second, which is a significantly higher density of data than is achievable using closed caption. Even a greater density can be achieved by compressing the data on the tape, but as the density becomes greater, reliability problems may occur.

Many VCRs have the capability to fast-forward and fast-rewind to a specified tape location, but the control provided by the VCR is not sufficiently accurate enough to resolve individual frames on the tape. During playback of a tape it becomes necessary to wind the tape forward or rearward to a specific frame to locate digital information or a video segment. To accomplish precise tape movement to a specific frame, a unique frame number, preferably sequential in number, is recorded in the header portion of the video signal. During playback, the frame number is received by the VCB 120 to allow precise positioning commands to be issued to the VCR.

SYSTEM SOFTWARE

A brief description of the courseware running on the mother board will now be presented, followed by a detailed description of the firm ware. A more detailed presentation of the courseware software will be presented later.

The system software includes both the courseware software running on the mother board and the firmware embedded in ROM in assorted chips in the system. The courseware software is preferably written in the C programming language or other object oriented programming language for execution under a Windows-based environment.

The courseware development software communicates with the system hardware through port structures. For example, the courseware development software in combination with the video-capture board 102 is capable of capturing video pictures directly from the computer screen 106 and storing them in memory. The courseware development software can manipulate the digital video pictures and the digital audio files used with the audio board 119 as desired by the instructor.

A central feature of the courseware development software is the visual editing. The visual editing uses a block-oriented hierarchy to describe video segments, e.g., lesson segments. The visual editing assimilates segments of visual material (video segments) and supporting information (audio and digital information) to allow video segments stored in the computer's memory or on one or more VCRs, to be recorded in some preselected order on target VCRs. Interspersed between video segments on the tape are segments of video containing digital information particularized for the interactive courseware designed.

The visual editing controls the transmission of appropriate digital information to the appropriate control boards to be recorded onto the tape. In the process of viewing the video segments, particularly on the viewing system, digital information is received by the control boards, recovered by the visual editor, distributed to appropriate locations in memory, and used as needed for controlling the courseware presentation.

The system's communication firmware uses a 14 byte command packet. Command packets are transferred on the system bus 108 and through various serial interfaces between control boards. Using command packets to communicate between various control boards, each of which contains its own independent microprocessor, allows for an efficient division of processing. A command packet received by one control board may need to be transmitted to another control board, such as from the VCB 120 to the ACB 124, or from the VCB 120 to a VCRCB. Alternatively, if the command packet is intended to be used by the receiving control board, the command packet is deciphered and its instructions are followed. Using a command packet is a compact and efficient way to provide instructions between control boards. Periodically, the control boards must also transfer large data packets, such as video images, digital information, digital sound, etc. Accordingly, a command packet may be followed by such data packets.

There are two forms of data packets used in the preferred embodiment of the present invention. The first form of data packet is up to 128 bytes and the second form of data packet is used to transfer a large block of data exclusively between the mother board 100 and the VCB 120 for recording digital information onto the tape. All data packets transferred to the ACB 124 or to the external VCRCBs are limited to 128 bytes (plus a one-byte check sum [129 bytes]). If the number of bytes that needs to be transferred to the ACB 124 or the external VCRCBs exceeds the 128 byte limit, then multiple 128 byte data packets are transmitted in succession until all the desired data has been transferred. This is accomplished by sending a command packet followed by a 128 byte data packet, and repeating the command packet/data packet sequence, until all the data is transferred.

The rationale for using a command packet followed by a 128 byte data packet is to reduce lock-out time and allow other interspersed concurrent operations to be performed. In this way, command packets need not be contiguous to send the next block of data—each one is an individual entity.

However, in the special case of recording digital video data onto the tape, contiguous command packets, followed by 128 byte data packets is expected until the transfer is complete.

The special mode in the VCB 120 for transferring large data blocks allows full 43K blocks of data to be efficiently transferred from the mother board 100 to the VCB 120, thereby, speeding up the transfer process. The chosen density of digital data to be stored in a video frame on the tape is 43K of information. To maintain standard video recording rate, the VCB 120 must be capable of receiving and processing the 43K block of data within 400-milliseconds. The VCB 120 may store several 43K blocks of data (or whatever is sent) in a queue for distribution to the target videotape at the appropriate time. The density of data may be increased or decreased if desired, but increased density may decrease reliability.

In all cases of writing digital information on the video section of the tape, even if the digital information to be recorded is only a few bytes long, a full 43K data block is recorded on the videotape (e.g., the video block size is preset), requiring 400 milliseconds (60 fields a second/30 frames per second) per video block written. Video fields (two fields comprise one frame which is an image) are standard for a particular recording format, so the digital data is sized to correspond to the frame size. The digital data is further conditioned with error-correction information that is used during data recovery to eliminate errors. The error reduction circuit is described in greater detail below.

Video signals are comprised of multiple levels of luminescence to create an image. Inherent in digital encoding is that the digital data contains only two levels of luminance (at least in a binary system). A greater number of luminescence levels could be used in a higher order system.

For digital recording a 50 percent luminescence value is chosen (half the height of white which is 100 percent) to signify one of the binary levels. The rationale for not selecting a 100 percent value is that the video signals received in the VCR are self-adjusting. Self-adjusting means that if a video signal is continually bright (high luminescence) or continually dim (low luminescence) the internal VCR circuitry will automatically reduce or increase, respectively, the luminescence level. Thereafter, the VCR will take a period of time to self-adjust the luminescence back to the correct value while reading subsequent video segments. A 50 percent luminescence signal is optimum for recording digital signals because it provides a recording level that is easily detected against a base value of zero, and during playback of subsequent video segments the VCR is not substantially self-adjusted. Additionally, if the digital signals were recorded at the white level (100 percent luminescence), increased distortion would be introduced into the video signal, which would need to be removed in order to recover the transitions in the digital information. Also, this could result in an increased error rate.

As previously noted, the header portion of a video frame is a portion of video signal that is not viewed on the display. It is in the header portion that the system encodes additional digital information for videotape control. Such digital information may include the frame number, trigger points, information concerning how the tape was recorded to permit future changes to the recording method and maintain historical compatibility, marketing data, indicators whether the video signal following the header portion is digital in nature, and any other data that one wishes to record.

One method of controlling the operation of the interactive videotape is to use trigger points recorded in the header portion. Accordingly, the header portion may have a single byte dedicated as a trigger point containing a trigger value (00 to 255). During tape playback, the VCB 120 continuously monitors the tape's header information, including the trigger byte. If a change in the trigger byte is noticed, representing a trigger point, the VCB 120 interrupts the mother board 100 to inform it that a trigger point has occurred. The mother board 100 then assumes control and performs any functions necessary. Necessary functions are endless in possibilities and might include, prepping the student, posing questions, awaiting student feedback, rewinding or moving the tape forward to a selected location, and viewing digital images.

The trigger points can be set at any selected frame locations, up to every frame, so there is virtually no limit to the number of trigger points available. The use of trigger points provides a simple way to notify the mother board 100 that a segment of video has been played, and to insert desired interactivity presumably at that point.

An alternate method of triggering the occurrence of events is to use the frame numbers stored in the video header portion of each frame. The preferred embodiment uses a table of 16 frame numbers stored in the VCB 120. The size of the table may be expanded if desired. As the tape is being viewed and a particular frame is read that matches a frame number stored on the VCB 120, the VCB 120 interrupts the mother board 100 to notify it of the occurrence. The mother board 100, in turn, performs any necessary functions at that point. The VCB 120 also passes the video segments from the VCRs to the video capture board 102 for display as live-motion video.

VIEWING SYSTEM

The viewing system 92 is similar in design to the editing system 90. While viewing a tape the VCB 120 operates in substantially the same manner as in the editing system 90. The entire interactive video courseware is contained on a single tape. The necessity for a VCRCB is eliminated and only one VCR is needed. This results in a substantial savings in the costs of each viewing system. The ACB 124 controls the operation of the VCR assuming many of the functions of the VCRCB. Student responses and other information of interest is recorded by the ACB 124 on the linear audio track during viewing. Otherwise, the viewing system 92 operates similar in nature to the editing system 90.

DUPLICATING SYSTEM

Referring to FIG. 3, the duplicating system 94 includes two pyramids, each preferably with multiple boxes. Each box preferably contains a VCRCB and four VCRs. The duplicator 95 selects one VCR as the source of a complete video interactive courseware tape or a portion thereof and that VCR plays the signal which is received in the duplicating system by the VCB 120 and ACB 124. The duplicator 95 selects which of the VCRs it wants as a target of the received video and audio signals and broadcasts the received signals to the two pyramids. The selected VCRs, though the VCRCB, act upon the signal making a duplicate of the original tape.

VIDEO CONTROL BOARD BLOCK DESCRIPTION

Figure 8:
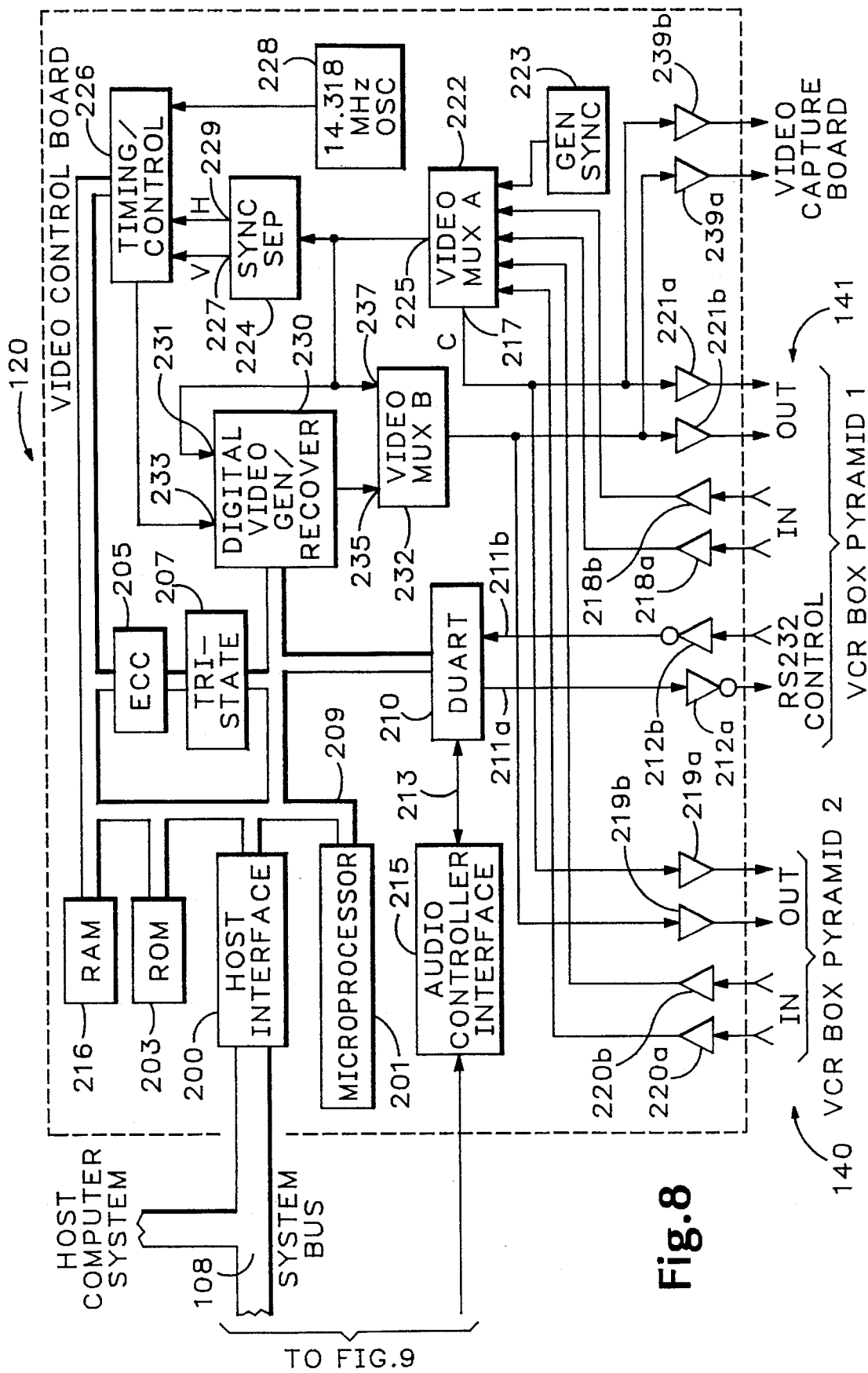
FIG. 8 is a block diagram of an exemplary embodiment of the video control board used with the editing system, viewing system, and duplicating system.

Referring to FIG. 8, a block diagram of the VCB 120 is shown. The functions of the VCB 120 are internally controlled by a microprocessor 201, which is preferably a V53 microprocessor by NEC. Commands are passed from the microprocessor 201 to other blocks of the VCB 120 by use of an internal bus 209. Instructions for internally controlling the VCB 120, and consequently the microprocessor 201, are stored in a ROM 203 (64K). The mother board 100, or other suitable board, transfers digital data in a parallel fashion on the system bus 108 to the host interface 200 on the VCB 120. The host interface 200 receives the data and transfers it into a RAM 216 (2MB). The host interface 200 also may transfer data from the RAM 216 to the system bus 108.

When recording data to and reading data from the tape, it is imperative that the data has a zero error rate, or as nearly so as possible. Videotape is a good storage and retrieval medium for viewing video segments because even a modest error rate does not significantly effect the quality of the viewed video segments. However, when employing videotape as the storage medium for digital data, the inherent error rates of the medium are totally unacceptable. Further, the mechanical mechanisms in video cassette recorders are designed to record and read analog video signals rather than signals digital in character. Accordingly, an error correction chip (ECC) 205 is used to reduce the error rate. The preferred chip, chip 4011, is sold by Advanced Hardware Architectures from Pullman, Wash. The ECC 205 operates in two modes. The first mode generates error correction bytes and the second mode checks error correction bytes to correct any corrupted data. Prior to recording digital data onto a tape, the ECC 205 encodes the digital data using the first mode. Conceptually, if the digital data stored onto the tape is thought of as a rectangular block of digital data, then each row is supplemented with additional error correction bytes and each column is likewise supplemented with additional error correction bytes. This dual row and column method of adding error correction bytes to the digital data block reduces the error rate to zero, or close to zero. The design of chip 4011 (ECC 205) does not provide an internal buffer so if a chip 411 was connected to the internal bus 209 it would continuously place data onto the internal bus 209. This would permit the ECC 205 to monopolize the internal bus 209. A tri-state 207 buffer is added in series with the ECC 205 to isolate the output of the ECC 205 from the internal bus 209 to eliminate the problem.

The VCB 120 includes a Dual Universal Asynchronous Receiver Transmitter 210 (hereinafter referred to as a DUART) to receive parallel data from the internal bus 209 and output a serial bit stream on two serial communication channels 211a/211b and 213. Further, the DUART 210 may receive a serial bit stream from either of the two serial channels 211a/211b and 213. The received serial bit stream is output as parallel data on the internal bus 209. The DUART 210 preferably provides serial communication at 9600 baud. Connected to the serial channels 211*a* and 211*b* are respective inverting buffers 212*a* and 212*b*. The inverting buffers 212*a* and 212*b* convert the serial signals transmitted from the DUART 210 to RS232 protocol (+/−9 volts at 3 ma) for transmission to pyramid 1 for the control of VCRCBS's, and consequently the VCRs. The DUART 210 also transmits and receives serial information on the serial channel 213 to and from the audio controller interface 215. The audio controller interface 215 is a gating circuit to help effectuate transfers of digital data to and from the ACB 214. The audio controller interface 215 permits signals to be transferred to and received from the ACB 124 without use of the system bus 108.

In the preferred embodiment of the present invention, S-VHS VCR's are employed because the S-VHS has a significantly higher quality and bandwidth than a standard VHS tape. When using S-VHS VCRs, the composite video signal is separated into a luminescence signal and a chroma signal. The chroma signal is not used to process and store digital signals because it has a narrower bandwidth than the luminescence signal which decreases storage capability. Further, the chroma signal is used in different modes for different signal protocols (NTSC, PAL, SECAM) making system design difficult. However, the luminescence signal has a more constant usage among different signal protocols. The video mux A 222 selects one of the incoming signals from either Pyramid 1 140, Pyramid 2 140, or a synch generator 223. The VCB 120 receives the luminescence and chroma signals from pyramid 1 through respective buffers 220*a* and 220*b*. Likewise, the VCB 120 receives the luminescence and chroma signals from pyramid 2 through respective buffers 218*a* and 218*b*. The chroma signal is returned by video mux A 222 through its output 217 to both pyramid 1 141 and pyramid 2 140 through respective buffers 221*a* and 219*a*. It is noteworthy that in the current system video signals, digital signals, and control commands are all broadcast to all VCRCBs connected to either pyramid 1 or pyramid 2, but only those VCRCBs that are designated will act upon the received signal.

The VCB 120 may operate in a mode where the received video signals from a VCR are intended to be routed back to both pyramid 1 141 and pyramid 2 140. Video Mux B 232 selects input 237 which is the luminescence signal at the output 225 from video mux A 222. The luminescence input 237 is transferred to buffers 219*b* and 221*b* for pyramid 2 and pyramid 1, respectively. This allows the VCB 120 to receive video signals from a source tape on either of the pyramids and route the video signal back to the pyramids for recording on selected VCRs. Recall that only the appropriate VCR's will act upon the broadcast video signals.

The VCB 120 can also operate in a mode to recover digital information encoded in the received video signal. In this mode the video mux A 222 transmits the selected luminescence signal to the input of the synch separator 224. The function of the synch separator 224 is to determine when the horizontal retrace (end of a horizontal line) and vertical retrace (return to the top of the screen to start the next field) cycles occur within the video signal. This permits timing signals to be generated indicating when to expect digital information within the frame of video signals, and the start and end of each frame. The synch separator 224 transmits a vertical signal at its output 227 when a vertical retrace occurs and outputs a horizontal signal at its output 229 when a horizontal retrace occurs. The vertical signal and horizontal signal are used as inputs to the timing control 226 that is controlled by the microprocessor 201 connected to the internal bus 209. The timing control 226 is responsible for providing a gating signal to input 233 of a digital video generator/recover 230 (hereinafter referred to as DVGR) to recover the digital data encoded in the luminescence signal at input 231. The timing control 226 is clocked at a particular frequency set by the oscillator 228. Changing the frequency of the oscillator 228 changes the bandwidth of the data allowing more or less data to be stored on the tape. As the oscillator 228 frequency is increased, the error rate may increase. The digital information recovered from the luminescence signal is transferred on the internal bus 209 to the RAM 216 for storage and future use. Recovered digital data by the DVGR 230 is placed on the internal bus 209.

The VCB 120 also operates in another mode to encode digital data as a video signal for recording on a videotape. Digital data on the internal bus 209 is received by the DVGR 230. The synch generator 223 is selected by the video mux A 222 when operating under this mode to emulate the same frequency generated by a VCR, so act to emulate a source. The synch generator 223 signal is transmitted to the synch separator 224 to the timing control circuit 226, and to the DVGR 230 at input 233. This allows use of the same circuitry to clock the required transitions in the horizontal retrace and vertical retrace to create a "standard" video signal. The DVGR encodes the digital information into high and low luminescence video signals and clocks the converted digital data to input 235 of the video mux B 232. The video mux B 232 alternatively selects a portion of digitally encoded video signal from the DVGR 230 at input 235 and the synch generator 223 signal at input 237 to complete the end of each horizontal video signal with the appropriate video timing information. In the same way the vertical retrace information is also added to the digitally encoded video signal. The result of video mux B 232 is a "standard" video signal that contains digital information encoded as high and low video pulses and the necessary timing information to allow the use of standard S-VCR's to perform the reading and recording of digital information.

The present invention encodes in the header of each tape digital information for control purposes. Accordingly, each video frame contains in its header a video signal that is processed to retrieve the digital information. The remaining video signal within the frame may be processed to retrieve encoded digital information or an analog video signal, depending upon what is stored in the frame. Information contained within the header portion of each frame indicates whether the remainder of the frame is digital or analog in nature.

Additionally the VCB 120 can pass received video signals through video mux B 232 (luminescence) and video mux A 222 (chroma) to respective buffers 239*a* and 239*b* for output to the video capture board 102.

AUDIO CONTROL BOARD BLOCK DESCRIPTION

Figure 9:
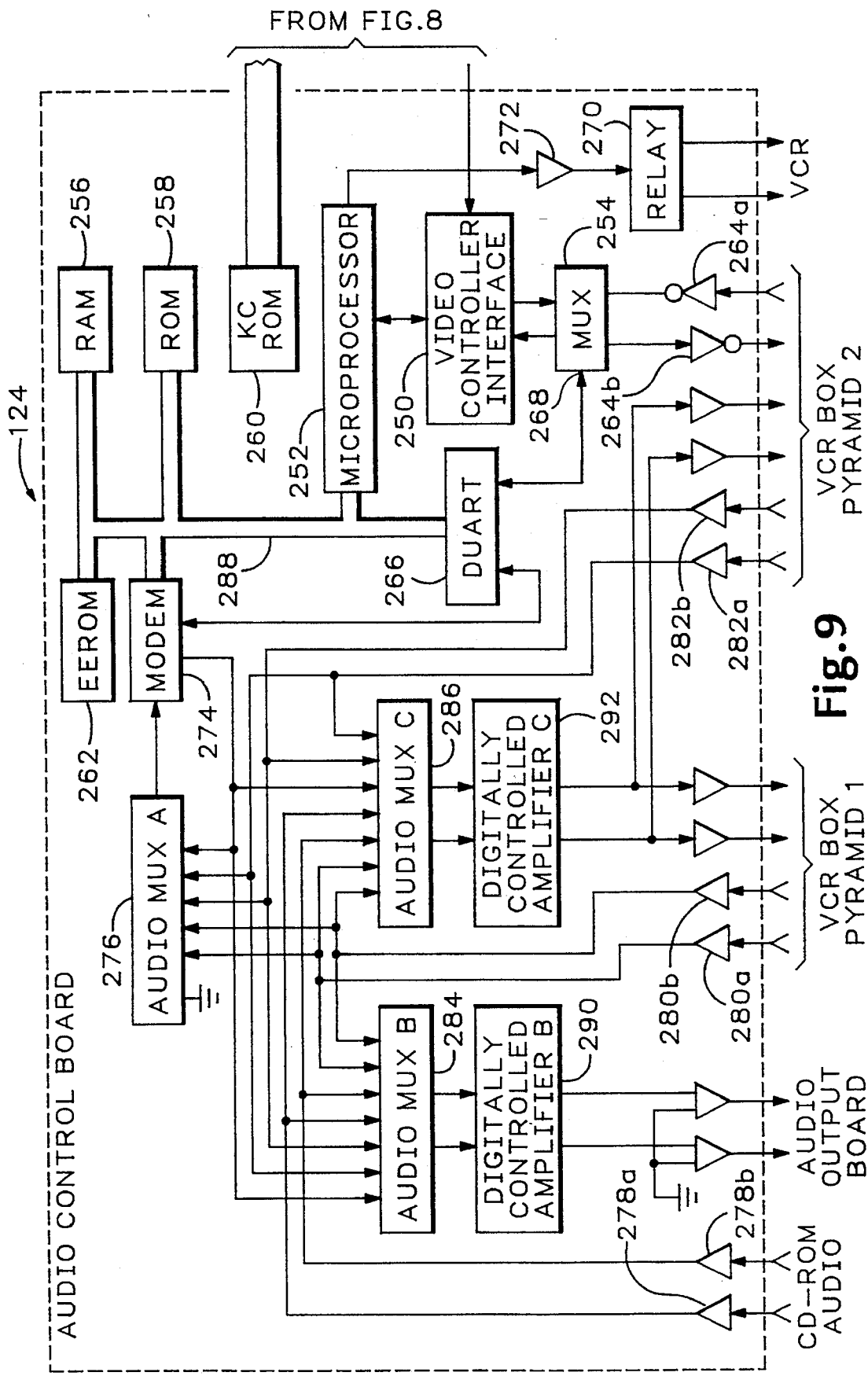
FIG. 9 is a block diagram of an exemplary embodiment of the audio control board used with the editing system, viewing system, and duplicating system.

Referring to FIG. 9, the individual circuit elements of the ACB 124 will be described, followed thereafter by a description of the flow of data through the elements.

The ACB 124 receives and transmits information through a video controller interface 250 that buffers and distributes the signal. The received signal is transmitted to both the microprocessor 252 and to the mux 254. The microprocessor 252 processes commands and transfers information to and from RAM 256 (32K). A ROM 258 (32K) supplies program information for the microprocessor 252.

The KC ROM 260 is located on the ACB 124 for convenience and is used by the mother board 100. The EEROM 262 (8K) is used as a semi-permanent scratch pad to store data for the mother board 100. The EEROM 262 is not used internally by the ACB 124, but rather is accessed by the mother board 100 through the ACB 124 as a storage location for passwords, student history information, and any other information that the system may want to recover in cases of power failure or between uses of the system.

The mux 254 has two modes of operation. The first mode, used with the editing system 90 and the duplicating system 94, passes the serial information received by the video controller interface 250 through the mux 254 and inverting buffers 264a and 264b to pyramid 2. This mode allows the VCB 120 to send commands for control of VCRCB's and VCR's in pyramid 2. Alternatively, if enough board connections were available the buffers 264a and 264b could be located on the VCB 120 to achieve the same function. Information received from the buffers 264a and 264b is routed through the mux 254 and the video controller interface 250 to the VCB 120. The first mode also permits control commands to be received by the microprocessor 252. In the second mode, used with the viewing system 92, the mux 254 selects the DUART 266 input 268 to control a VCR connected directly to the pyramid 2 connections. This eliminates the need to include a VCRCB when the system is configured as a viewing system 92. Under this second mode the ACB 124 takes direct control over the VCR.

The ACB 124 is used to read from the linear audio track of a videotape. Current VCR designs do not allow control commands to accomplish this function. Accordingly a relay 270, connected through a buffer 272, physically pushes the linear audio track read button when necessary.

The audio mux A 276 selects the source of the audio for the modem 274 to receive. Current audio mux A 276 source selections include the CD-Rom Audio 278a and 278b, pyramid 1 connections 280a and 280b, pyramid 2 connections 282a and 282b, and the modem 274. Audio mux B 284 selects the source audio for the audio output board. Current audio mux B 284 source selections include pyramid 1, pyramid 2 or the modem 274 which if selected is used for diagnostic purposes to listen to the audio tones on speakers. The audio mux C 286 selects the source of audio to be sent to pyramid 1 or pyramid 2 from the modem 274 or cd-rom audio buffers 278a and 278b.

When recovering data from a linear audio track the audio mux A 276 selects the source and passes the received sound to the modem 274 for conversion of the audio tones into a serial bit stream. The serial bit stream is routed to the DUART 266 to convert the serial bit stream to a parallel format for placing on the internal bus 288 to store in the RAM 256.

When recording digital data on the linear audio track of the target VCR, the digital information in transferred to the DUART 266 from the internal bus 288. The DUART 266 converts the parallel data into a serial bit stream. The serial bit stream is transferred to the modem 274 to converts the bit stream into frequency shift key tones. The frequency shift key tones are routed through the audio mux C 286 to both pyramids 1 and 2 for recording. The frequency shift tones can also be routed through audio mux B 284 for diagnostic purposes by listening to the output on speakers.

The digitally controlled amplifier B 290 has a dual purpose. Its first purpose is to control the sound amplitude to the speakers. Its second purpose is to pan left and right channels between the left and right ears/speakers. In other words, move sound from one ear to another. The digitally controlled amplifier C 292 controls the sound amplitude for both pyramid 1 and pyramid 2.

VCR CONTROL BOARD

Figure 10:
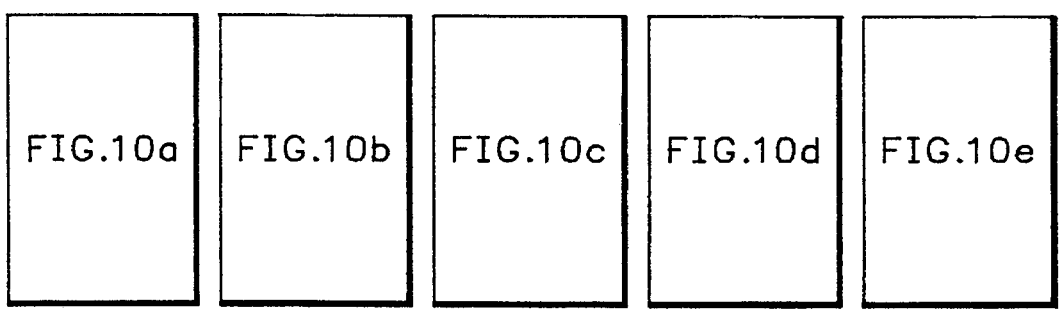
FIG. 10 is an organizational block diagram of the interconnection of the video cassette recorder control board shown in FIGS. 10a–10e.
Figure 10A:
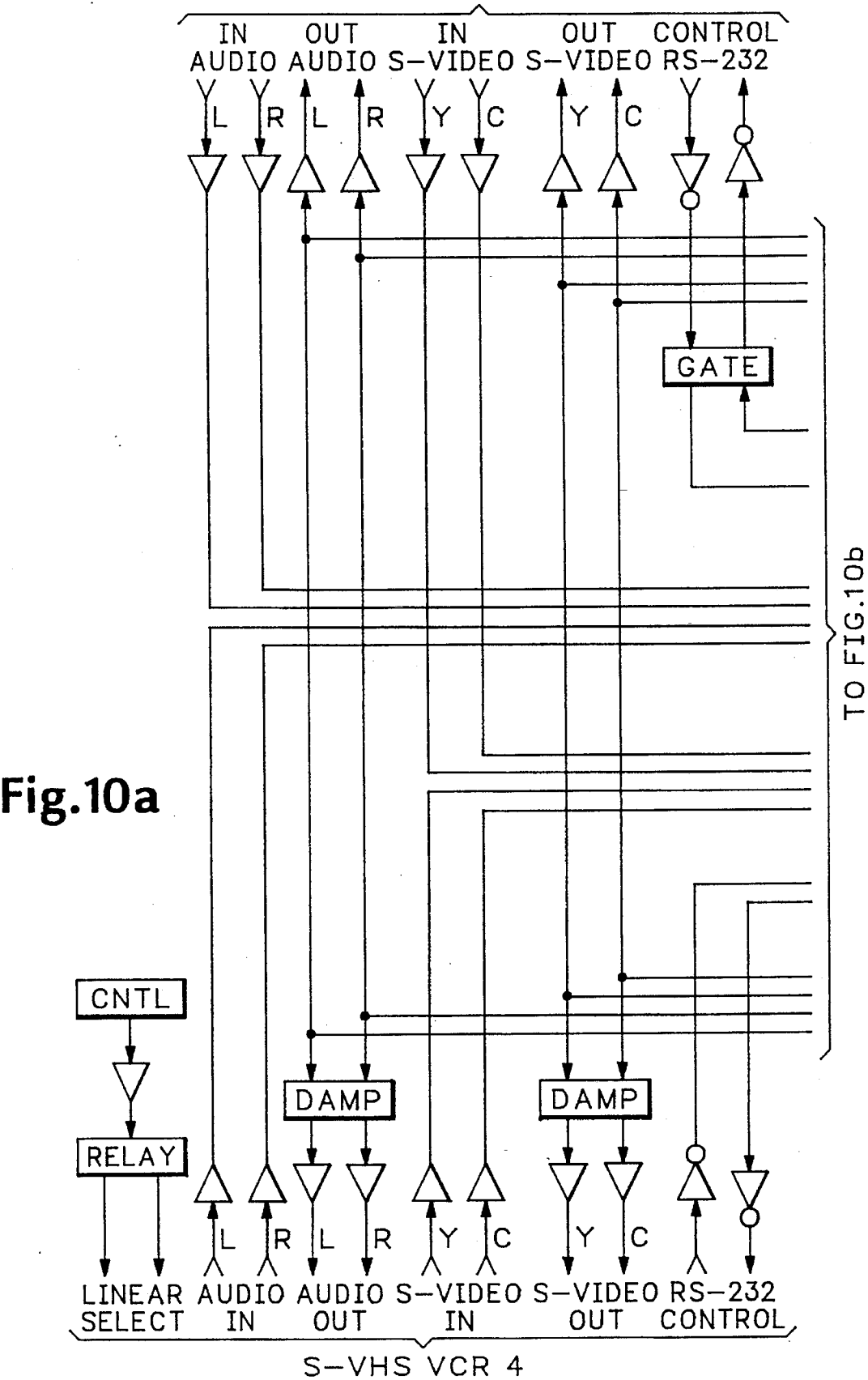
FIG. 10a is a schematic representation of an exemplary embodiment of a portion of the video cassette recorder control board.
Figure 10B:
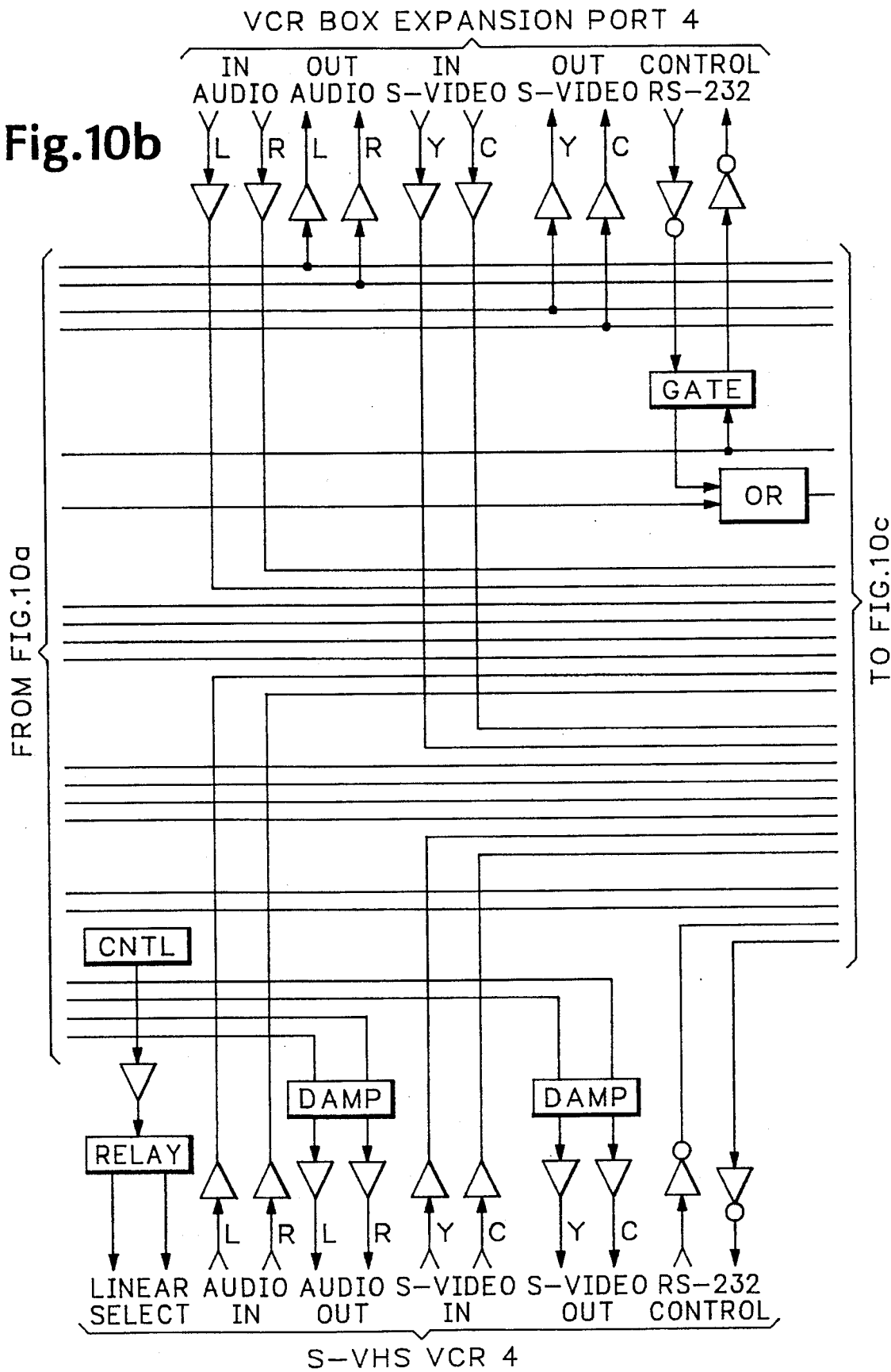
FIG. 10b is a schematic representation of an exemplary embodiment of a portion of the video cassette recorder control board.
Figure 10C:
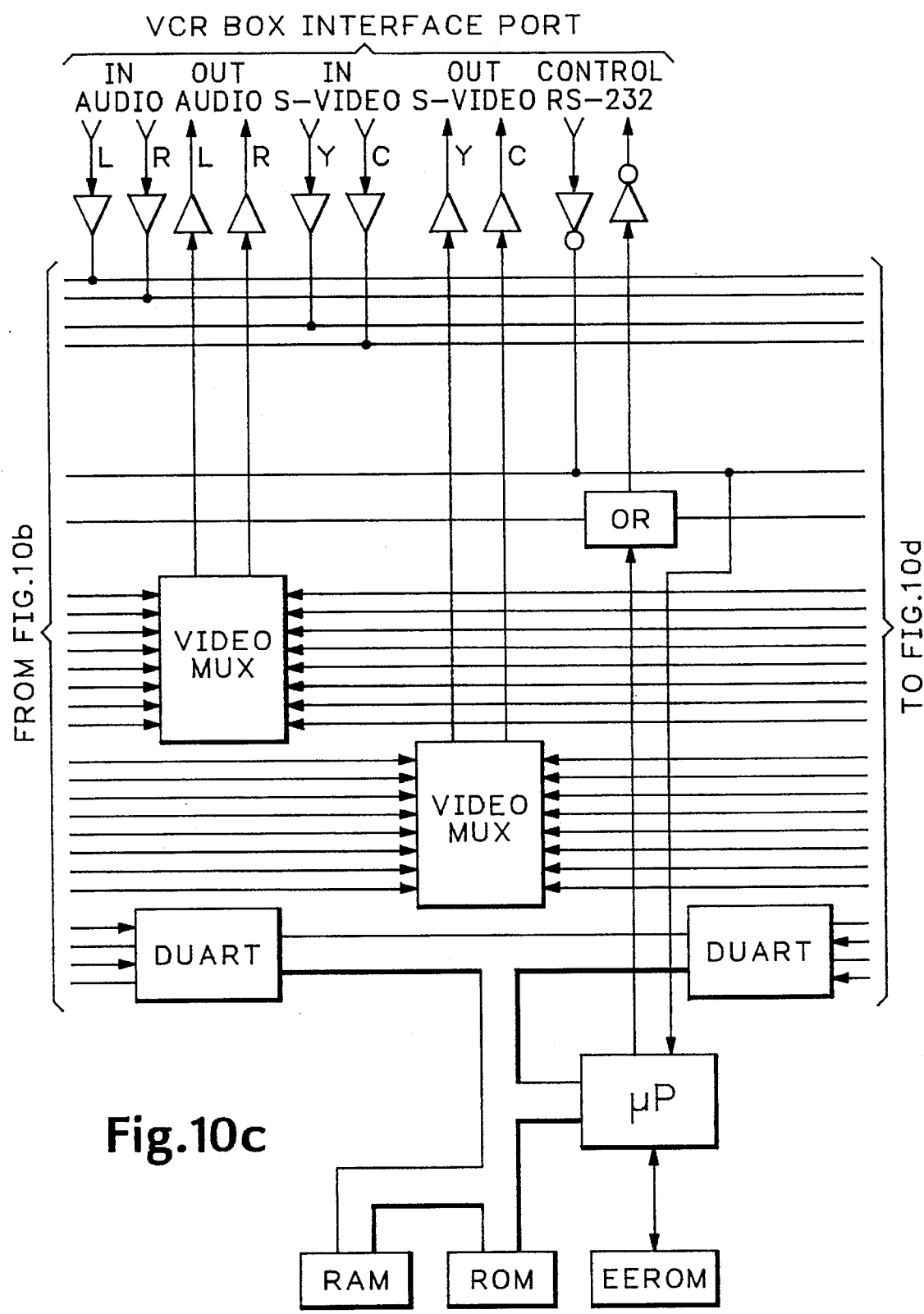
FIG. 10c is a schematic representation of an exemplary embodiment of a portion of the video cassette recorder control board.
Figure 10D:
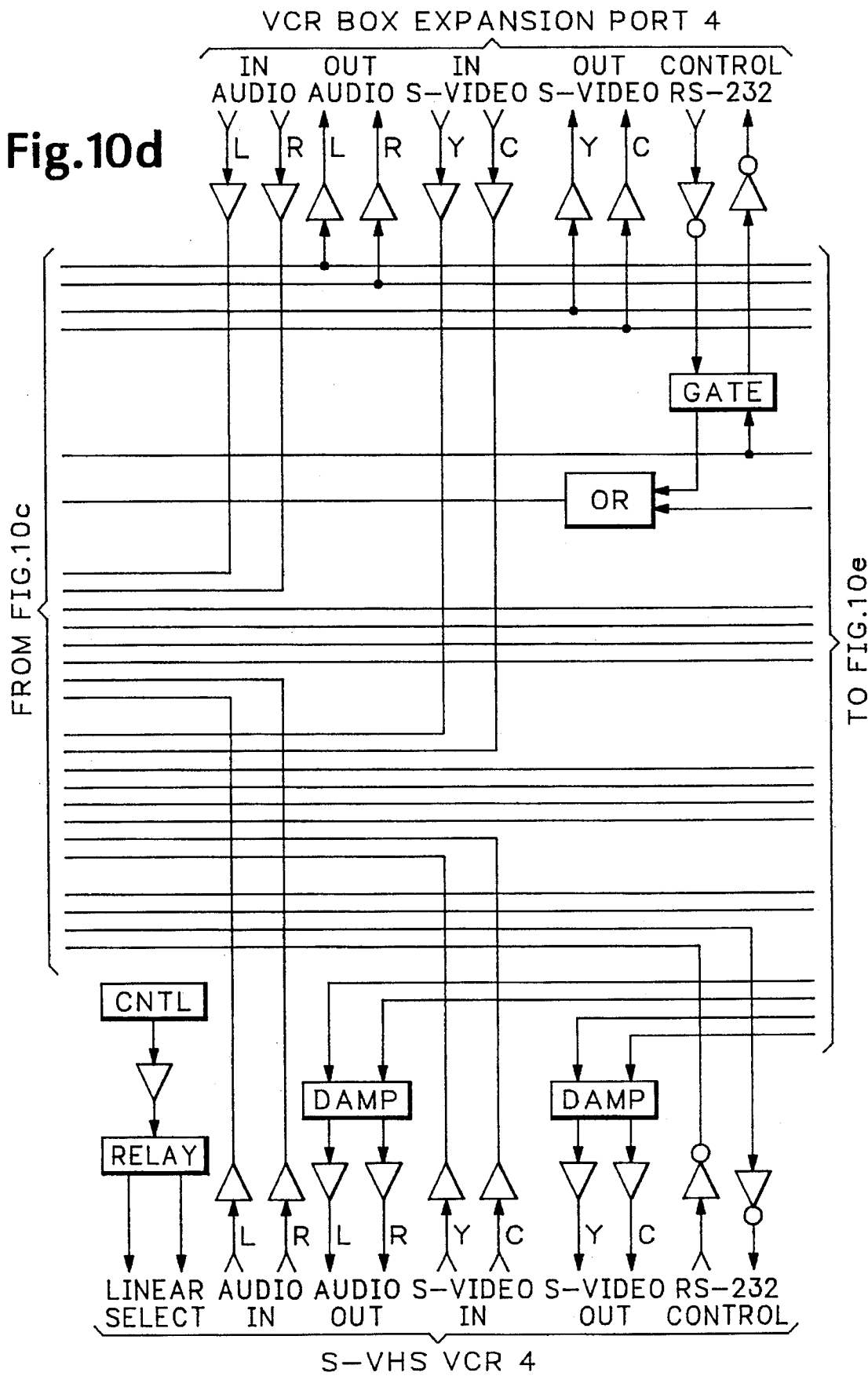
FIG. 10d is a schematic representation of an exemplary embodiment of a portion of the video cassette recorder control board.
Figure 10E:
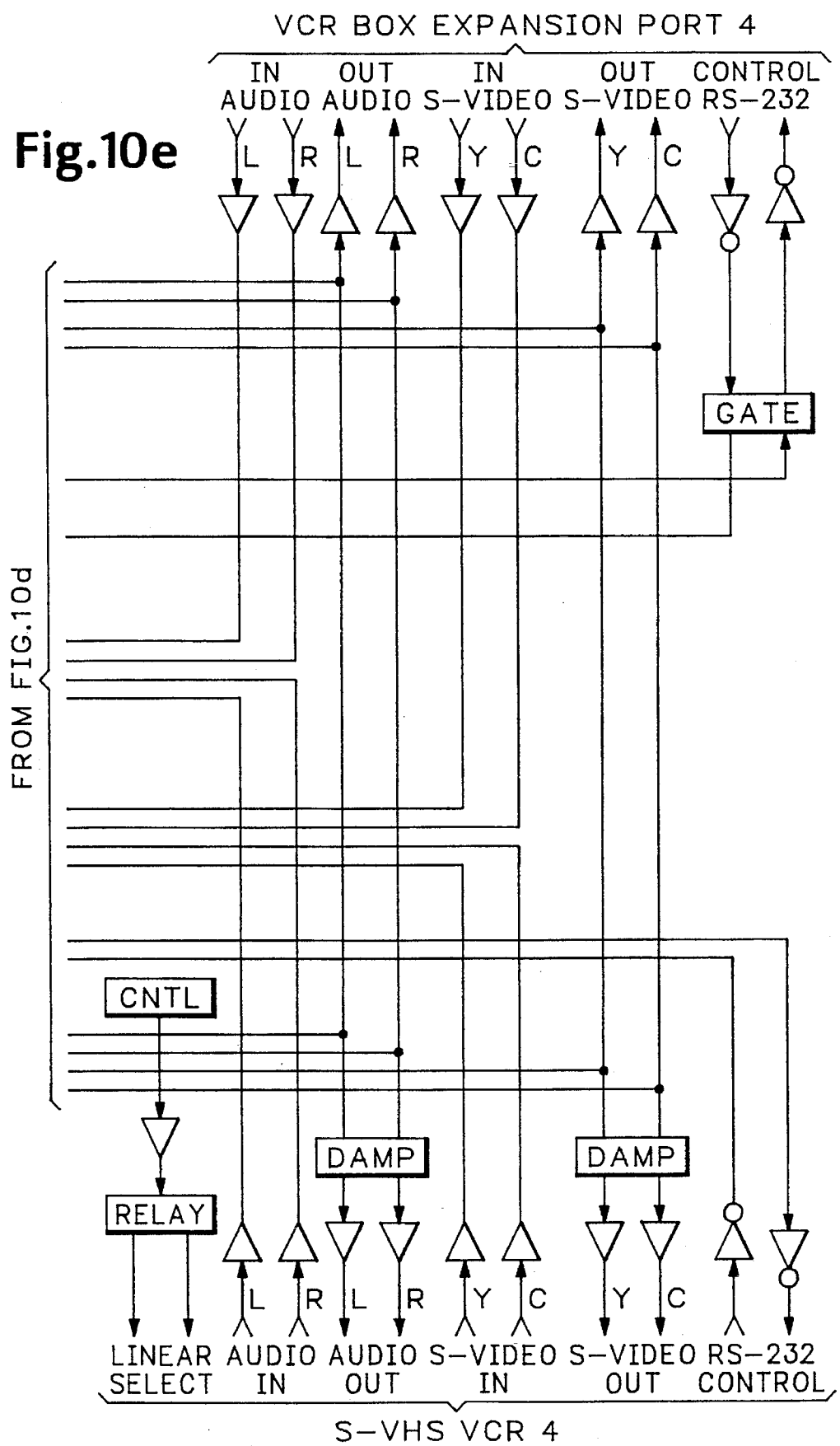
FIG. 10e is a schematic representation of an exemplary embodiment of a portion of the video cassette recorder control board.

Referring to FIG. 10, the video cassette recorder control board 300 (VCRCB) resides in an external box and is only used in the editing system 90 and duplicating systems 94. The viewing system 92 does not use a VCRCB 300 to control its single VCR but rather uses the ACB 124, as previously described.

VCRCB 300 is responsible for selecting signal sources throughout the network of VCRs. For example, a laser disk player or a video camcorder can be connected to an external port on this board. All ports are similar except for the ability to control the VCRs through the RS-232, and damping circuits which are necessary to prevent unwanted oscillation in the system (described later).

The VCR control ports at the bottom of the diagram contain the relays for selecting the linear audio track. The linear audio track can be selected remotely for recording but not for playback. To recover the digital data, the pushbutton circuit on the VCR front panel must be activated (this is done electrically via the relay).

The VCR control port is similar to the one on the audio control board. It has stereo/audio input and output, video input and output, control lines for RS-232 control, and the relay for activating the pushbutton circuit.

Damping circuits in the outputs are selected only for the source VCR. The reason for the damping circuits is that VCRs, when they are inactive, allow signals entering on the input pins to pass through to the outputs. On loop-backed VCRs, the signals cause oscillation that results in audio hum and unwanted color lines on the display. The damping circuits effectively reduce gain through the ganged units and prevent oscillation. The audio damping circuits must be temporarily disabled when modem information is written to the linear audio track.

The VCRCB 200 has an on-board microprocessor that is responsible for accepting command packets and performing appropriate tasks. Tasks performed by the microprocessor include VCR control, multiplex switching, and control of the damping circuits.

The VCR control board is address programmable to specify its location in a pyramid. This allows the system to individually address each VCR—via its VCRCB 300.

The VCR control board also contains on-board EEROM for storing status information. This information includes the number of VCR, operating hours and can be accessed for maintenance information.

COURSEWARE DEVELOPMENT

In writing an interactive video course, the courseware instructor uses resources and assembles a script that defines how the course user interacts with the resources. The resources consist of video, graphic elements, and several types of sound. Sound can be the left-and right-channel stereo on the videotape, or digital sound consisting of MIDI and digitized waveforms.

A courseware development system must allow the author to select, refine, and edit the resources to develop a script. The courseware development diagram shows the process of flow. Different courseware authors have different styles, so the development system must enable them to approach the process from any direction. For example, an author may have an audio file that they may consider to be a key element of a course, and they may want to use the audio file. They may feel that "This segment of video is the cornerstone for our course." They may have a specific set of questions that must be used in a certification process. Or, they may have only a general idea to which they will assign courseware development resources. There is a flow to the courseware development process, but the author can develop the course in a variety of ways. Following is an example of the courseware development resources that can be used in the system software, and the development process.

The raw video editing allows an author to identify video clips and tapes that are important to the teaching task at hand. This editing accepts a raw videotape (this could be a home video or a purchased, commercially prepared videotape) and produces a "conditioned" tape. The conditioning process writes digital information on each frame of the tape that identifies the tape and the source and adds a frame number to each frame. The raw video editing can produce two types of output:

1. A copy of the raw input videotape.

2. A tape containing segments from one or more videotapes.

From the raw videotape the raw video editing produces a sub-master videotape, which is the working copy used for developing the courseware (the process of sub-mastering protects the original raw videotape).

There are two types of digital audio: waveform and MIDI. Waveform audio is essentially an analog sound that has been digitally sampled at discrete points. The digital samples (amplitude and frequency data) are played back to reproduce the original sound. The fidelity of the reproduced sound (the faithfulness with which the original sound is reproduced from the digital data) depends on the resolution, or the number of sample points.

The other type of digital sound is MIDI. MIDI encodes sounds by defining musical notes for specific durations produced by particular instruments. MIDI is a compact form of digital notation, but it is limited to music.

Another course development resource is the bitmap. A Bitmap is a collection of points that have assigned colors. These points fill the display screen. Anything that can be represented on the screen can be a bitmap. The ability to work with bitmaps means that the courseware system can capture and display any screen created (or manipulated) under the Windows environment.

The last course resource is the video-clip database. This database is developed as the author specifies resources for the course. This database is a table and an index that points to elements in the table. The elements in the table specify the resources used in the course, such as the video clips, sound, and MIDI data.

The task of the instructor is to orchestrate these sources of information, and the tool that describes the orchestration is the script. The script defines all user interactions in the course.

When the instructor is satisfied with the resources collected, there are three steps to actually developing the course:

1. Generate the course script.

2. Review the course using the visual editing.

3. Manufacture the course.

The script, collected resources, and the database are all used the manufacture the course. Course manufacturing is a batch process that produces a master course tape.

When the tape is run on the viewing system, the player reads the digital resources from the videotape, reads the script and database, and plays the course using the resources as directed. During course playback, the viewing system also records the student's interactions on the videotape's linear audio track as a historical record for later evaluation.

SYSTEM FLOWCHARTS

Figure 12A:
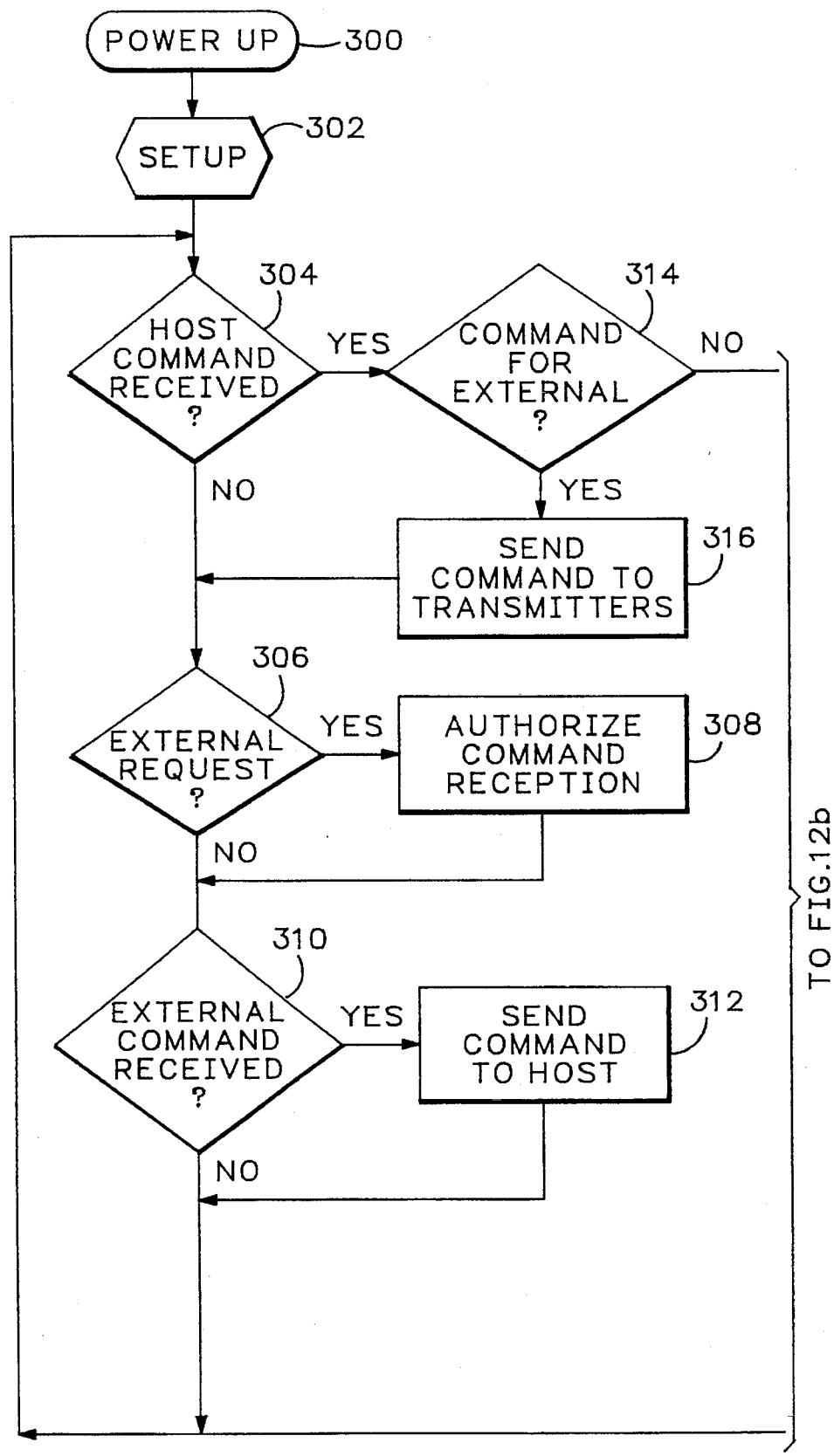
FIG. 12 is a flowchart of the software executing on the video control board.
Figure 12B:
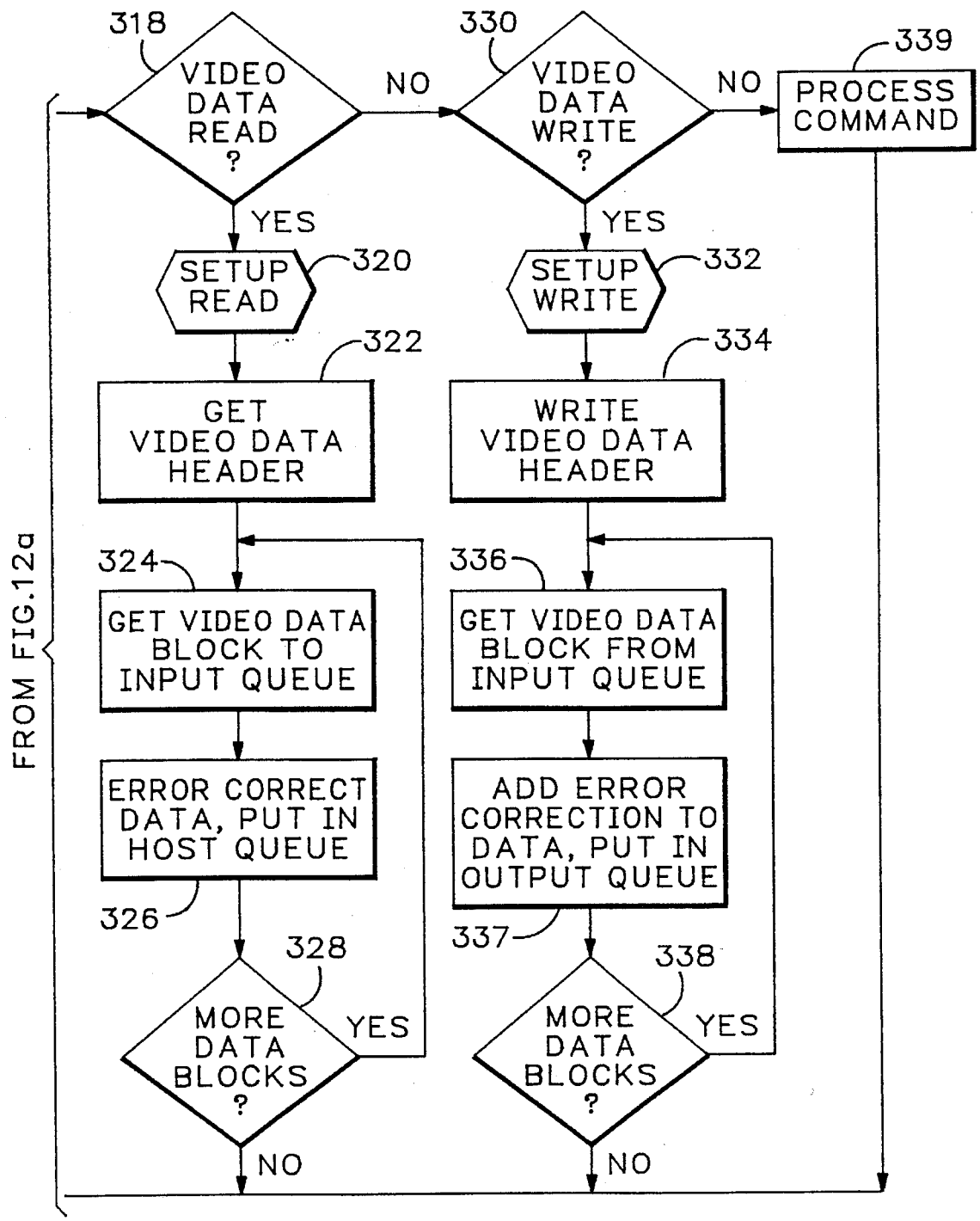

Referring to FIG. 12, a flowchart of the software executing on the VCB 120 is shown. The VCB 120 is powered up 300 and a setup 302 routine is executed on the VCB 120 to perform initialization. The VCB 120 checks to see if a host command, in the form of a command packet, is received 304 from the mother board 100. If no host command is received 304 by the VCB 120, then the VCB 120 checks to see if an external request 306 has been received. An external request is a request from the ACB 124 or a VCRCB. While reference is made to communication between the mother board 100, ACB 124, and VCRCB(s) it is to be appreciated that other devices or control boards similarly situated in the video interactive courseware system could also be included. Only one system bus 108 is included in the video interactive courseware system which both the ACB 124 and VCRCBs need to access. To send data on the system bus 108, the ACB 124 and VCRCBs make a request to the VCB 120, through which they are connected, to get authorization 308 to send data to the VCB 120. After authorization 308 is granted, data received from the authorized device by interrupt service routine 360. If an external command has been received 310 from the ACB 124 or a VCRCB the external command is sent 312 to the mother board 100 (e.g. host via the system bus 108).

If a host command 304 is received by the VCB 120, then the VCB 120 checks to see if the command needs to be transmitted to the ACB 124 or VCRCB at block 314. If the command is intended for an external 314 board(s) then the command is transmitted 316 to that board(s).

Alternatively, if the host command is received 304 and the command is intended for the VCB 120, then the command is first checked to see if video data needs to be read 318. If the command packet indicates that video data is to be read 318, then the VCB 120 is setup for reading 320 the tape. Next, the video data header 322 is read. Thereafter, the VCB 120 enters into a loop whereby the VCB 120 gets video data to an input queue 324 which includes decoding digital data from the video signal and storing the digital data in memory, then an error correction 326 is performed on the stored data. This process is repeated until no more blocks 328 of data need to be read 324 and decoded 326.

Alternatively, if the host command is received 304 and the command is intended for the VCB 120, then next the host command is checked to see if the VCB 120 needs to write 330 data. If the command packet indicates that video data needs to be written, then the VCB 120 is setup for writing 332 the tape and the VCB 120 writes the video data header 324 portion of the tape. Thereafter, the VCB 120 enters into a loop whereby the VCB 120 gets video data from an input queue 326 which includes the data transferred from the mother board 100 to the VCB 120 memory for use, then error correction 328 bytes are added to the data, and the data is placed in an output queue which is transmitted on the video signal to all VCRCBs. This process is repeated until no more blocks 330 of data needs to be recorded.

Finally, the VCB 120 checks to see if the host command received 304 is intended as a local command to be executed by the VCB 120 itself, in which case the VCB 120 processes the received command 332.

Figure 13:
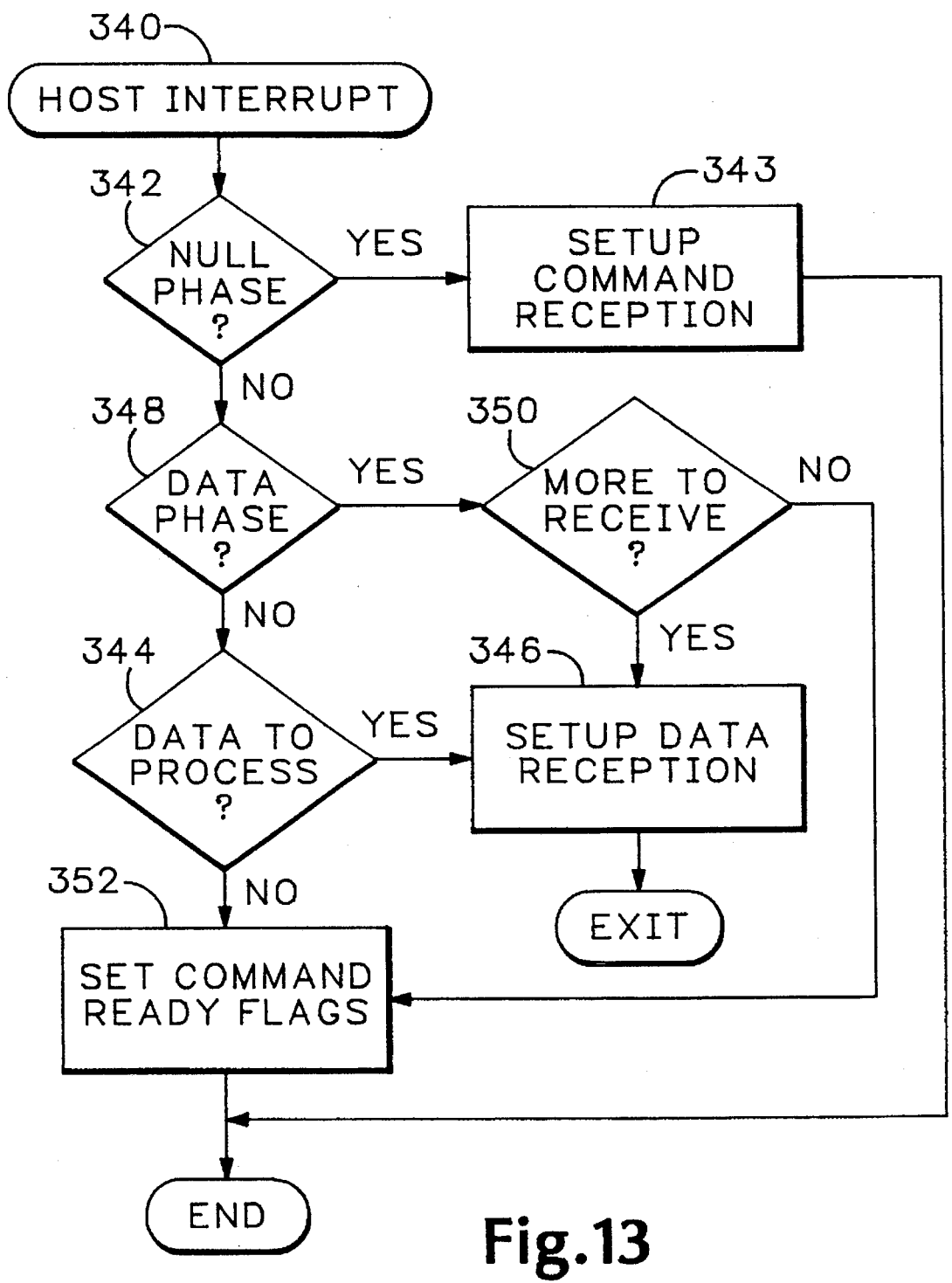
FIG. 13 is a flowchart, generally depicted in a state machine format, of a host interrupt for the video control board.

FIG. 13 is a flowchart, generally depicted in a state machine format, of a host interrupt 340 that is responsible for setting up the communications from the mother board 100 to the VCB 120. The host interrupt 340 is a handshaking protocol between the mother board 100 and the VCB 120. Upon receipt of a first host interrupt 340 the VCB 120 leaves a null phase 342 where nothing happens on the port between the mother board 100 and the VCB 120, and the port is made available for a new command packet to be transferred 343. The mother board 100 then may transfer a command packet. A second command interrupt 340 will cause the VCB 120 to check to see if there is data to process 344. As an example, the data may include a command packet or a data packet. If there is data to process 344, then the VCB 120 is setup to receive the data 346. Thereafter, the mother board 100 may send the data to the VCB 120, which is terminated by a third interrupt 340. If a data phase 358 is complete, then if more data is to be received 350, the VCB 120 is setup to receive more data 346. Finally, after all the command packets and data, if any, have been transferred, the host interrupt 340 mode is reset back to null phase 342 to receive the next command interrupt 352.

Figure 14:
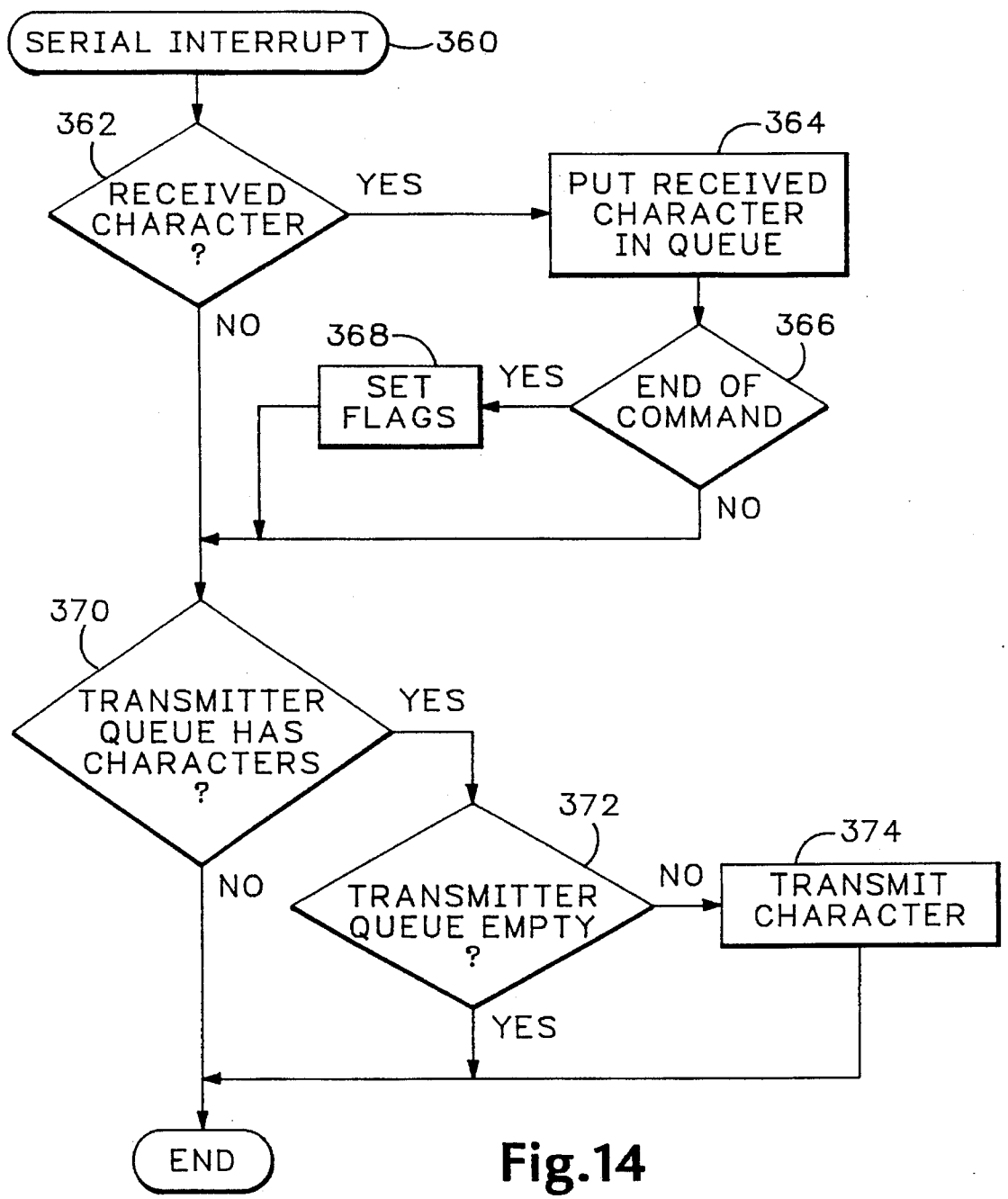
FIG. 14 is a flowchart of a serial interrupt on the video control board responsible for transferring command packets to and from external sources.

FIG. 14 is a flowchart of a serial interrupt 360 that is responsible for transferring command packets to and from external sources, such as the ACB 124 and VCRCBs. A serial interrupt 360 is received for each character that is transferred. If a character is received 362 then the character is put in a queue 364. Upon reaching the end of a command packet 366 flags are set 368 indicating the end of the receipt of the command packet. Additionally, the same serial interrupt 360 is used to transfer command packets to an external source. If the transmitter queue has characters 370, then a check is made to see if the transmitter queue is empty 372. If the queue is not empty, then a character is transmitted 374.

Figure 15:
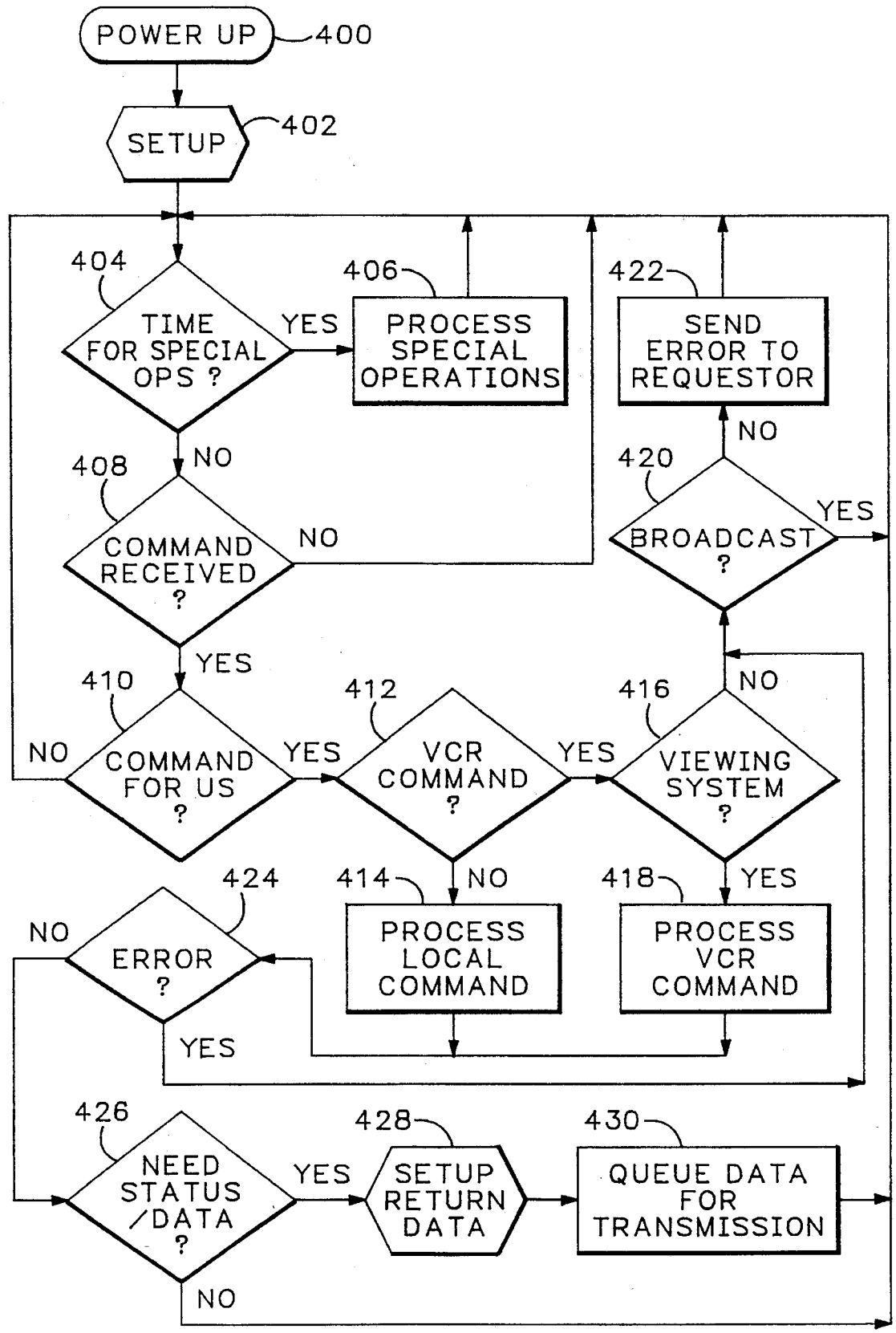
FIG. 15 is a flowchart of the software executing on the audio control board.

Referring to FIG. 15, a flowchart of the software executing on the ACB 124 is shown. The ACB 124 is powered up 400 and a setup 402 routine is executed on the ACB 124 to perform initialization. The ACB 124 checks to see if it is time for special operations 404, which are triggered by real time interrupts. Special operations may include such activities as querying VCRs for operation mode, and querying VCRs every 2 seconds to see if a tape is inserted. If it is time for a special operation 404, then the special operation is processed 406. If it is not time for a special operation 404, then the ACB 124 checks to see if a command packet is received 408. If a command packet is received 408, then the ACB 124 decides whether the command packet is intended 410 to be executed by the ACB 124. Command packets are generally broadcast among all the circuit boards in the entire video interactive courseware system, but contain control codes to indicate who is to act upon the command packet.

If the command packet is intended 410 for the ACB 124, then the ACB 124 is checked to see if the command packet is a VCR command 412. If the command packet is not a VCR command 412 then the command packet is processed by the ACB 124 as an internal command. If the command packet is a VCR command 412, then the ACB 124 checks to see what mode 416 the ACB 124 is operating in. If the viewing system mode 416 is selected, then the command packet is processed as a VCR command 418. If the viewing system mode 416 is not selected, then the command packet is checked to see whether it is a broadcast command 420. If the command packet is not a broadcast command 420 then an error message 422 is sent to the requestor.

Block 424 checks to see if an error has occurred. If no error has occurred 424 then the command packet is checked to see whether the particular command requires some data to be sent to the requestor 426. If data needs to be sent back to the requestor 426 then a setup 428 is performed for the data and the data is queued for transmission 430.

Figure 16:
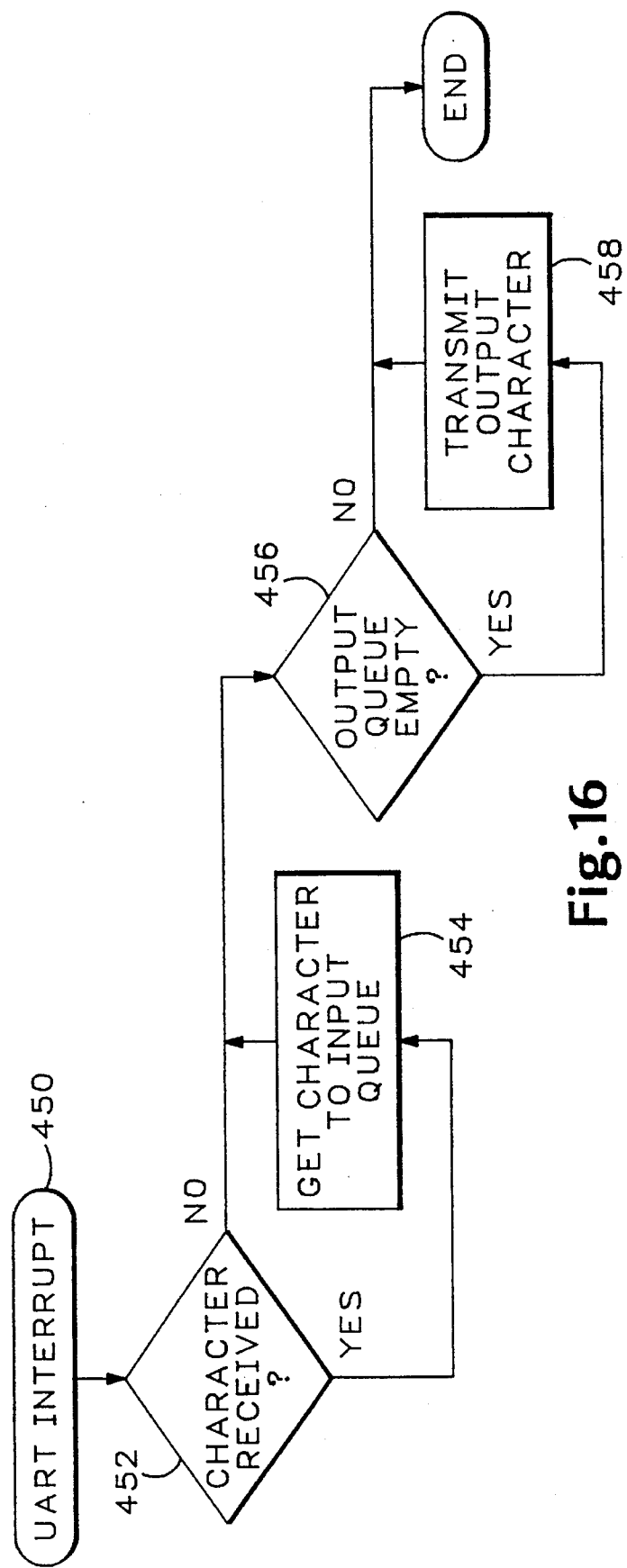
FIG. 16 is a UART interrupt routine for the audio control board.

FIG. 16 is a UART interrupt 450 routine for the ACB 124, that is similar in function to the serial interrupt 360, as shown in FIG. 14. In general, the function of the UART interrupt 450 is to check to see if a character is received 452, then if a character is received 452 put the character in the input queue 454. Similarly, if a character is in the output queue 456, then the character is transmitted 458.

Figure 17:
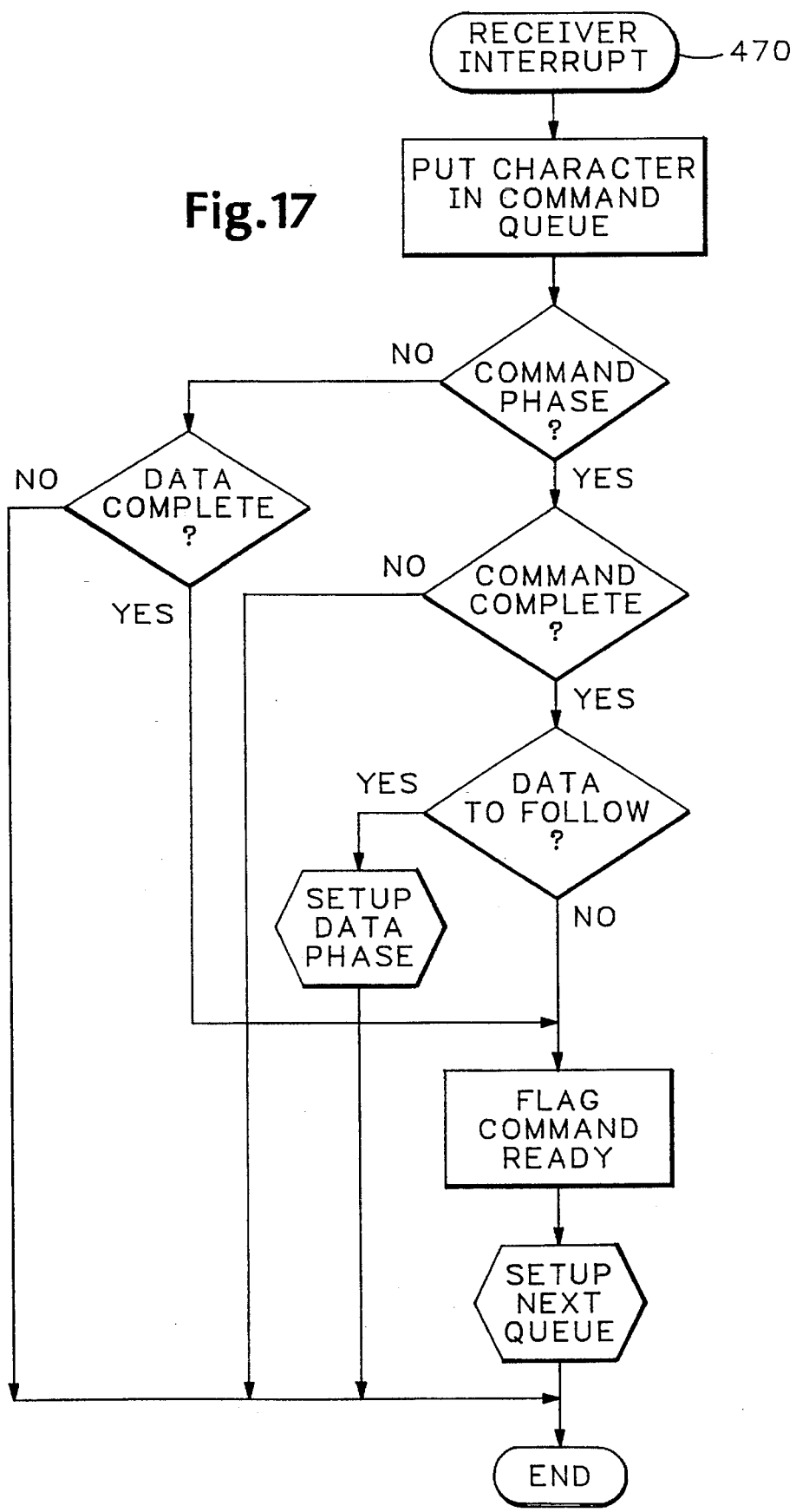
FIG. 17 is a receiver interrupt for the audio control board.

FIG. 17 is a receiver interrupt 470 for the ACB 124, that is similar in function to the host interrupt 340, as shown in FIG. 13. In general, the receiver interrupt 470 allows command and data packets to be received by the ACB 124.

Figure 18:
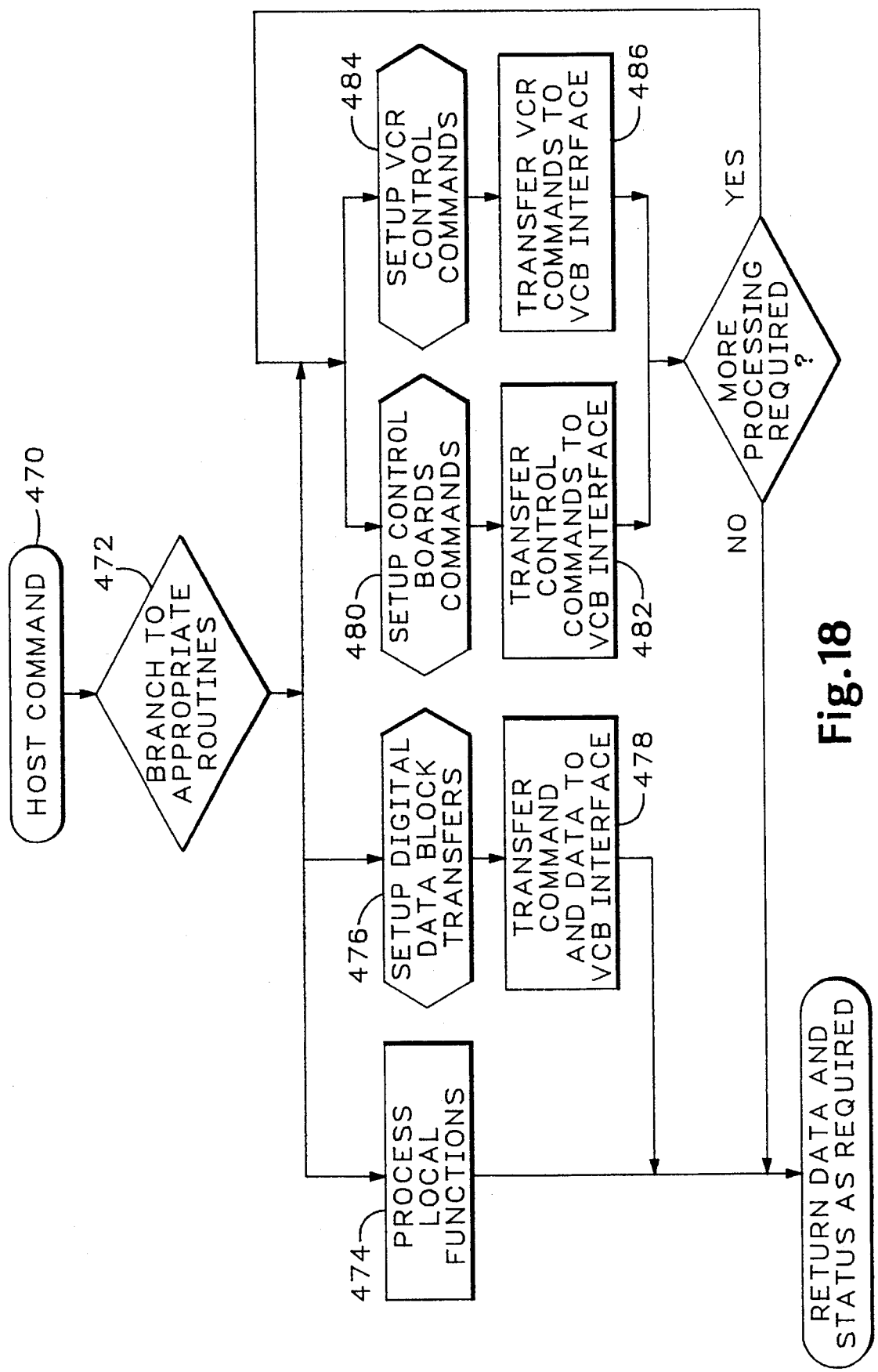
FIG. 18 is a flowchart of the host/VCB interface to the video control board of the editing hardware.

Referring to FIG. 18, a flowchart of the host/VCB interface 1020 (refer to FIG. 24) to the VCB 120 of the editing hardware 1030 is shown. One purpose of the host/VCB interface 1020 is to allow the use of higher level commands in the editing software 1000 to control the editing hardware 1030, and to generate specific commands to perform the required tasks. A host command 470 is executed on the mother board 100 and then the editing software 100 branches to the appropriate routines 472. For example routines may include such functions as; process local functions 474, setup digital data block transfers 476 followed by a transfer 478 of a command packet and data to the host/VCB interface 1020; setup control boards commands 480 followed by a transfer of control commands to the host/VCB interface 1020; setup VCR control commands 484 followed by a transfer 486 of VCR commands to the host/VCB interface 1020.

Figure 19:
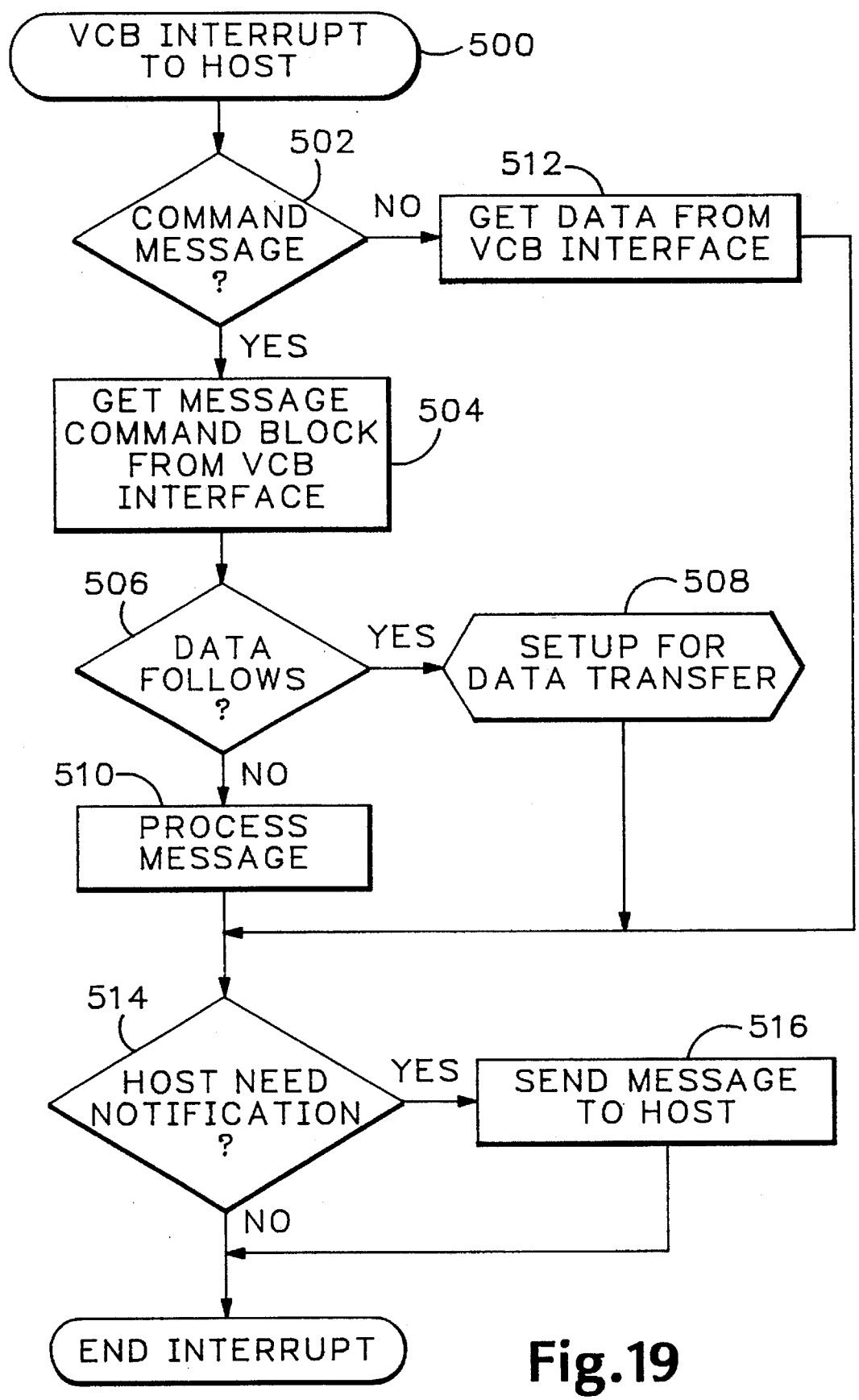
FIG. 19 is a flowchart, generally depicted in a state machine format, of a video control board interrupt to the host/VCB interface.

FIG. 19 is a flowchart, generally depicted in a state machine format, of a VCB 120 interrupt 500 to the host/VCB interface 1020. The purpose of this interrupt is to allow the VCB 120 to send low level commands to the host/VCB interface 1020 that are in turn converted to a high level command to be used the editing software 1000. The interrupt 500 has two states, namely a command message state and a data message state. If a command message 502 is present, then the message command block is read in 504 from the host/VCB interface 1020. If data follows 506 the message command block, then a setup 508 is made for the data transfer. Otherwise the message is processed 510. Alternatively, if a command message 502 is not present but a data message is, then the data message 512 is retrieved from the host/VCB interface 1020. Finally, if the editing software 1000 requires notification 514 of the interrupt, then a message 516 is sent to the editing software 100 (e.g. host).

Figure 20:
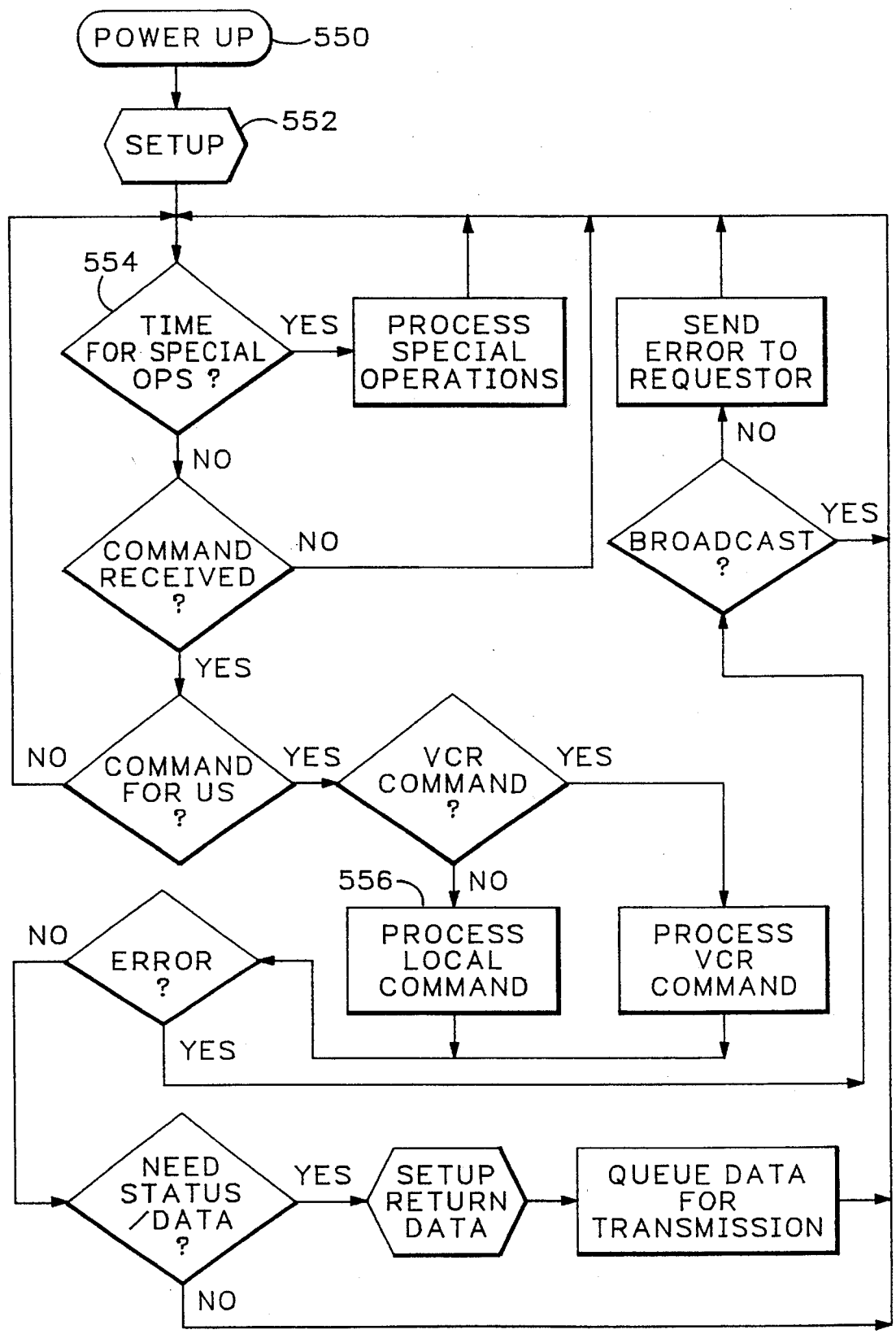
FIG. 20 is a flowchart of the software executing on each video cassette recorder control board.

Referring to FIG. 20, a flowchart of the software executing on each video cassette recorder control board (VCRCB) is shown. The VCRCB is powered up 550 and a setup 552 routine is executed on the VCRCB to perform initialization. The software executing on each VCRCB, as shown in FIG. 20, operates in conformance with a similar flowchart to the software executing on the ACB 124, as shown in FIG. 15, albeit for a different circuit board. An example of a difference in application processing of local commands 556, would include the selections of multiplexers for audio and video signal flow.

Figure 21:
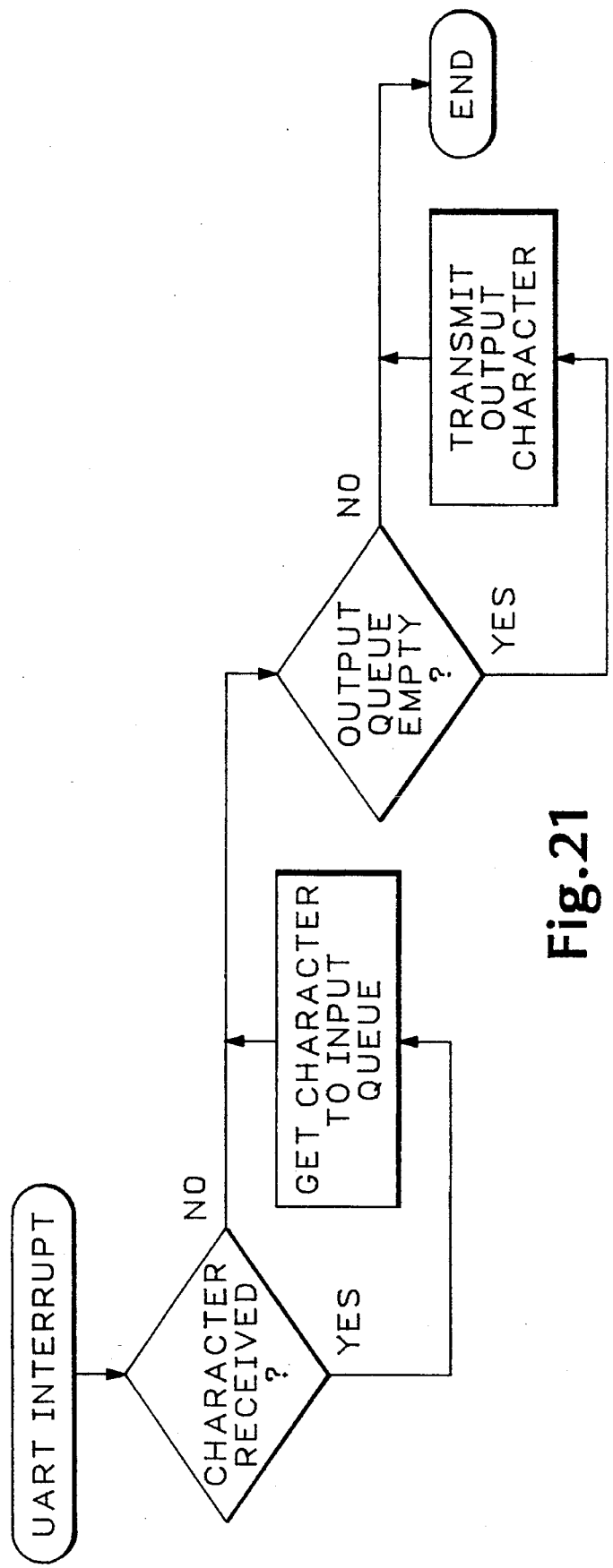
FIG. 21 is a UART interrupt flowchart for a video cassette recorder control board.
Figure 22:
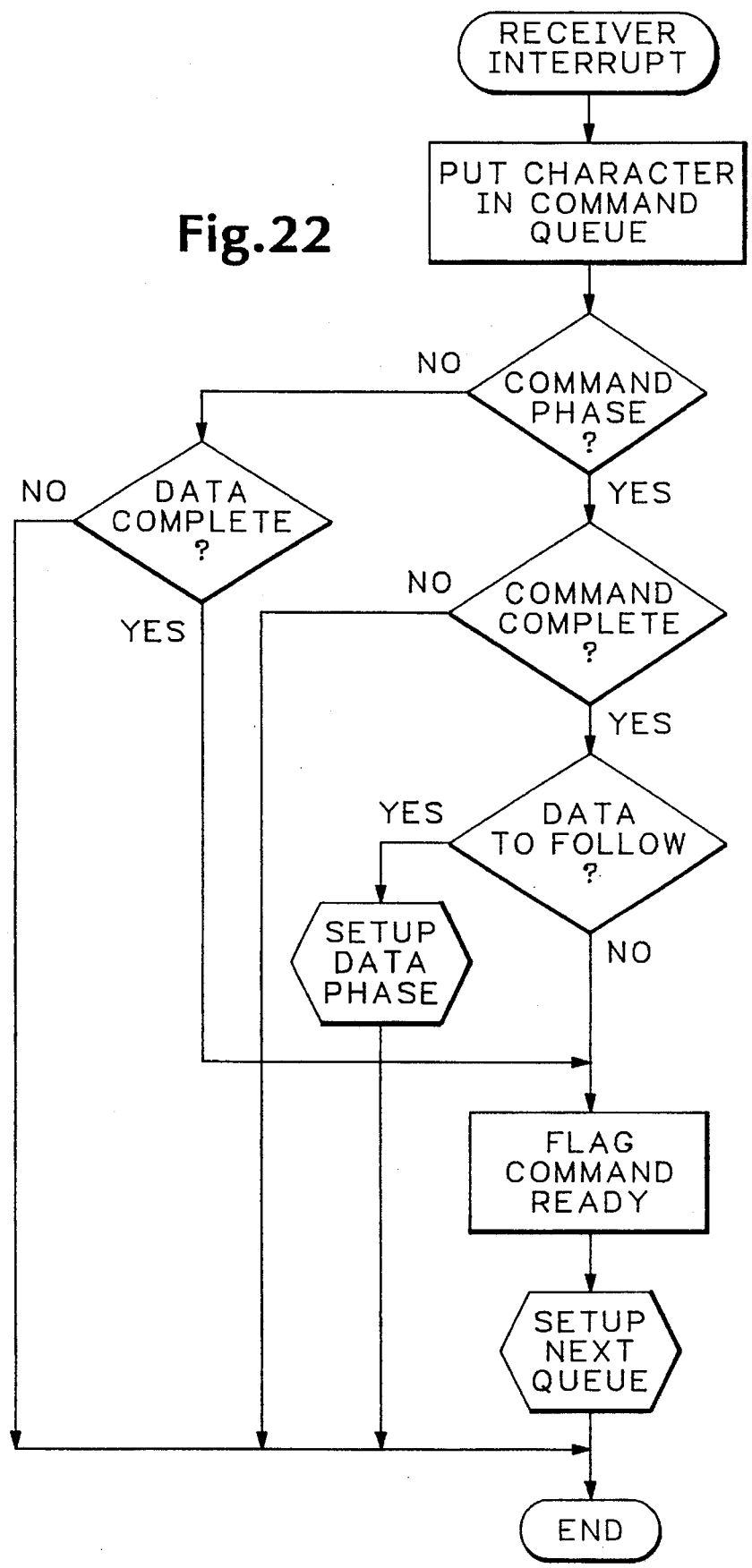
FIG. 22 is a receiver interrupt flowchart for a video cassette recorder control board.

FIG. 21 is a UART interrupt flowchart for a VCRCB. FIG. 22 is a receiver interrupt flowchart for a VCRCB. FIGS. 21 and 22 are similar in function to FIGS. 16 and 17, respectively, albeit for a different circuit board.

SYSTEM SOFTWARE

Figure 23:
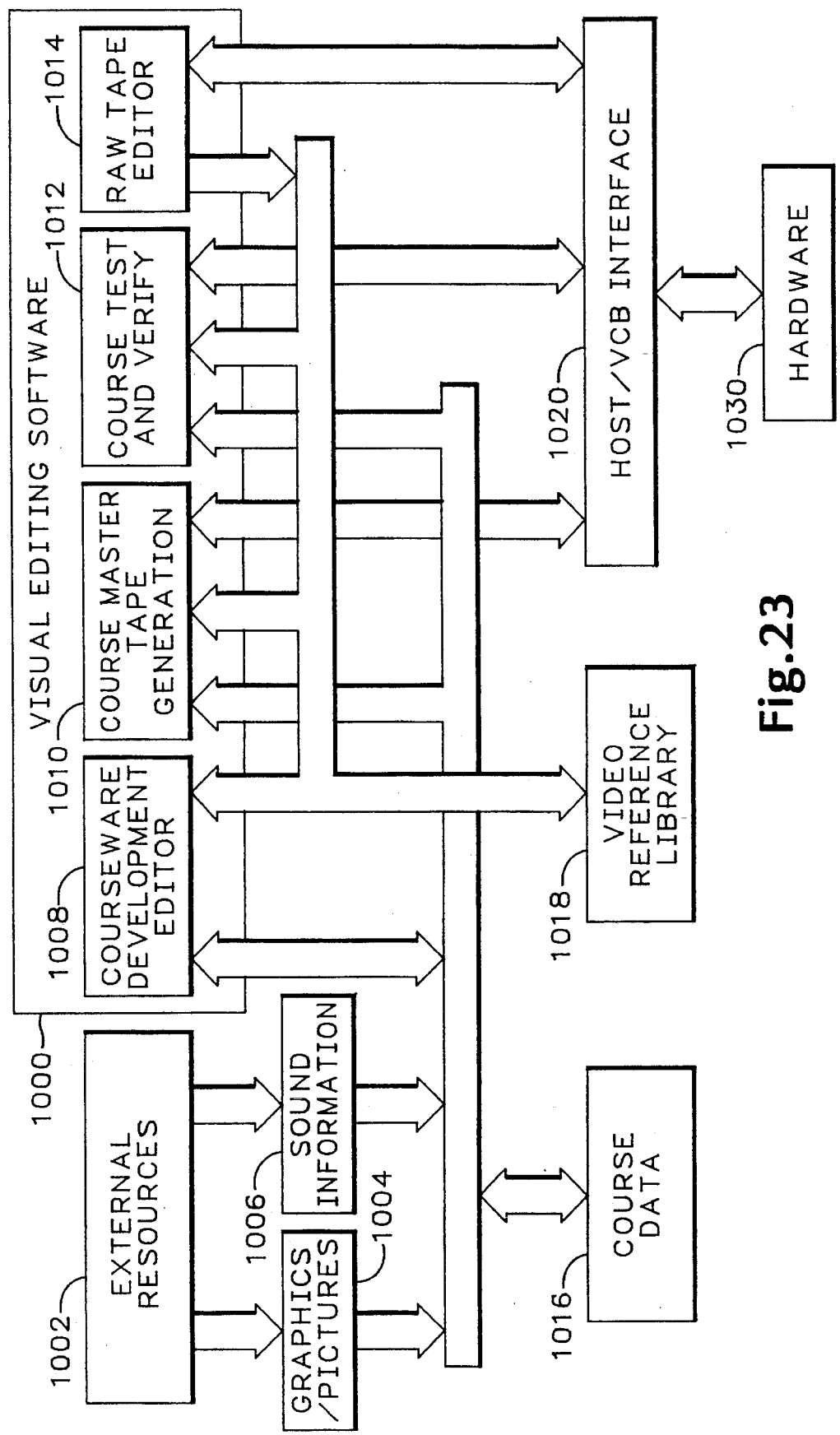
FIG. 23 is a schematic flow diagram of the interaction between the visual editing software and hardware.

FIG. 23 shows a schematic flow diagram of the interaction between visual editing software 1000 and visual editing hardware 1030 of the editing system 90. The visual editing software 1000 is comprised of four sub-units, including a courseware development editor sub-unit 1008, a course master tape generation sub-unit 1010, a course test and verify sub-unit 1012, and a raw tape editor sub-unit 1014. The visual editing software 1000 uses external resources 1002 and information on encoded media 1050 (FIG. 24) controlled by the hardware 1030 as tools to allow an instructor to create an interactive instructional videotape 1150 (see FIG. 28).

Figure 26C:
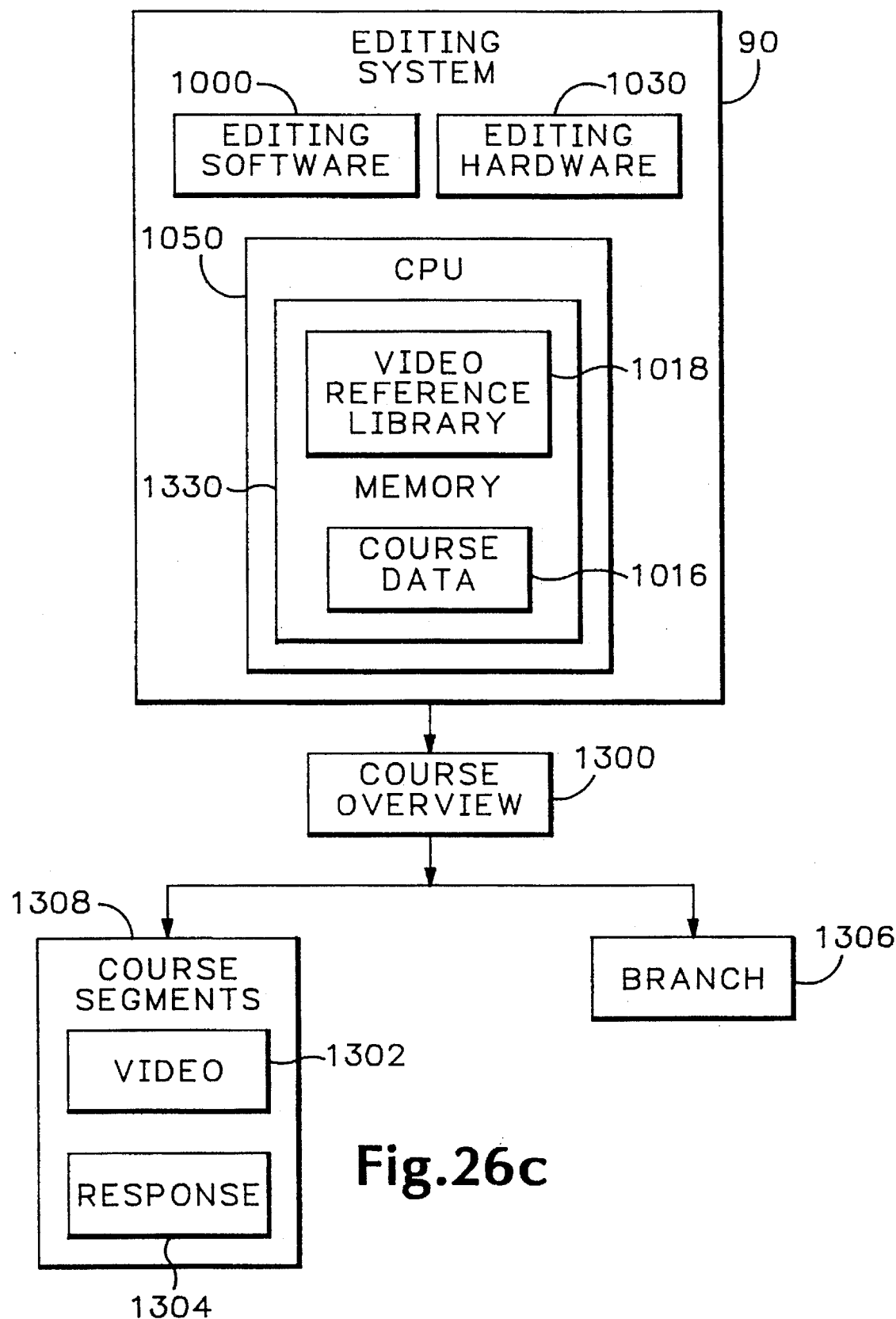
Figure 27A:
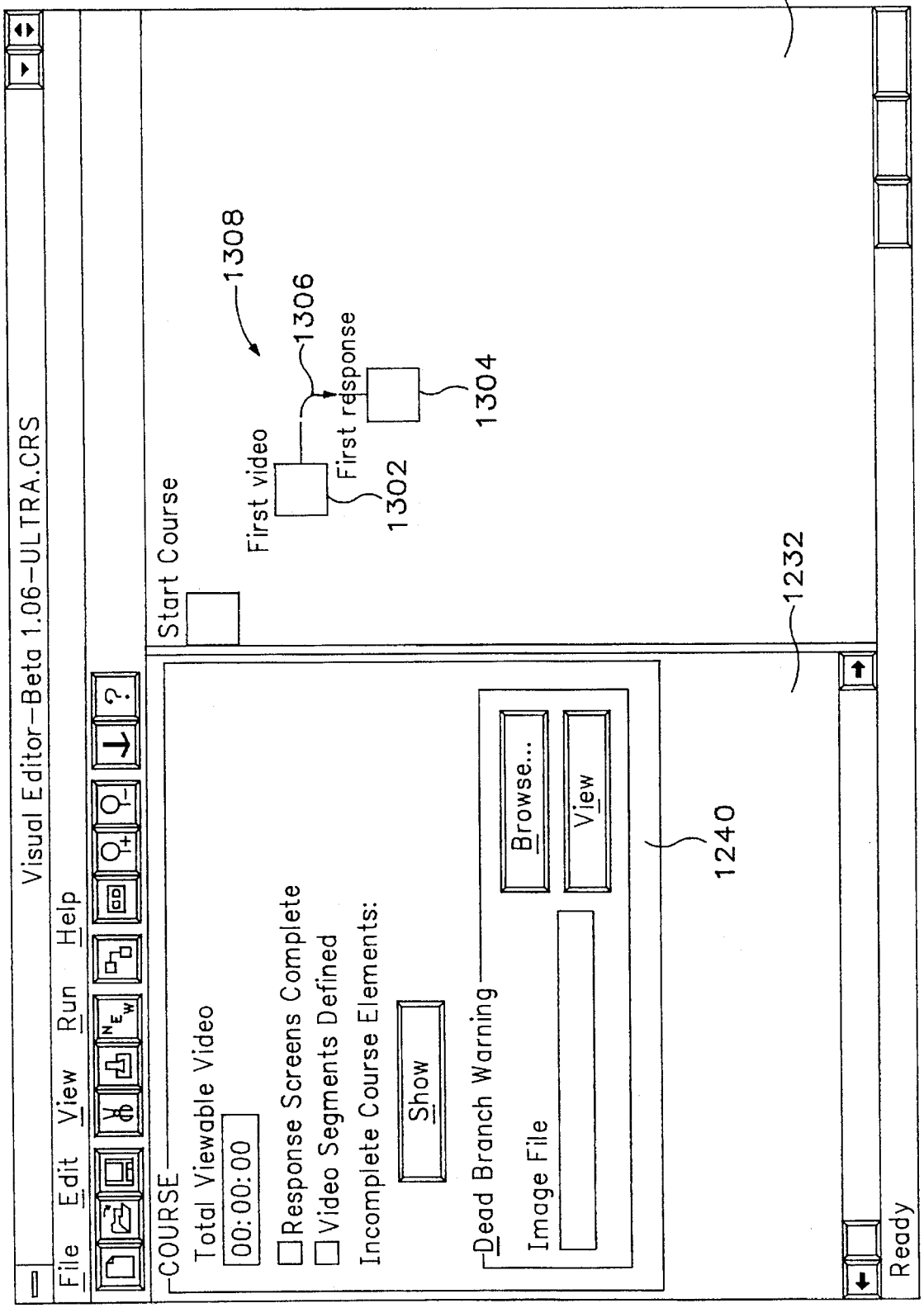

External resources 1002 may include graphics or pictures 1004 stored in any standard format, such as the .GIF, .BMP, .JPEG, and .TIFF format. It is to be understood that these formats are meant to be exemplary and are not meant to limit the scope of the invention. These graphics or pictures 1004 may be brought in from external sources or may be created within the system by an image capture device 1080 (as shown in FIG. 27a and discussed below). External resources 1002 may further include sound information files 1006 such as MIDI music, .WAV files, or any digitized sound that has been recorded to memory. Both the graphics 1004 and the sound information 1006 are stored in the course data section 1016 of memory 1330 (FIG. 26c). The external resources 1002 may also include source videotapes or other video brought in through the hardware 1030 (discussed in connection with FIG. 24). The external resources 1002 are manipulated by the instructor through the visual editing software 1000 to create the final interactive video instructional tape 1150.

A key feature of the present invention is its ability to use and manipulate "moving pictures" (e.g., live-motion video). The preferred embodiment of the present invention stores the "moving picture" on videotape which, to be easily manipulated and controlled, must be "conditioned" or encoded with information relating to position and other pertinent data (including frame number, trigger points, information concerning how the tape was recorded, and other information discussed above).

Figure 24A:
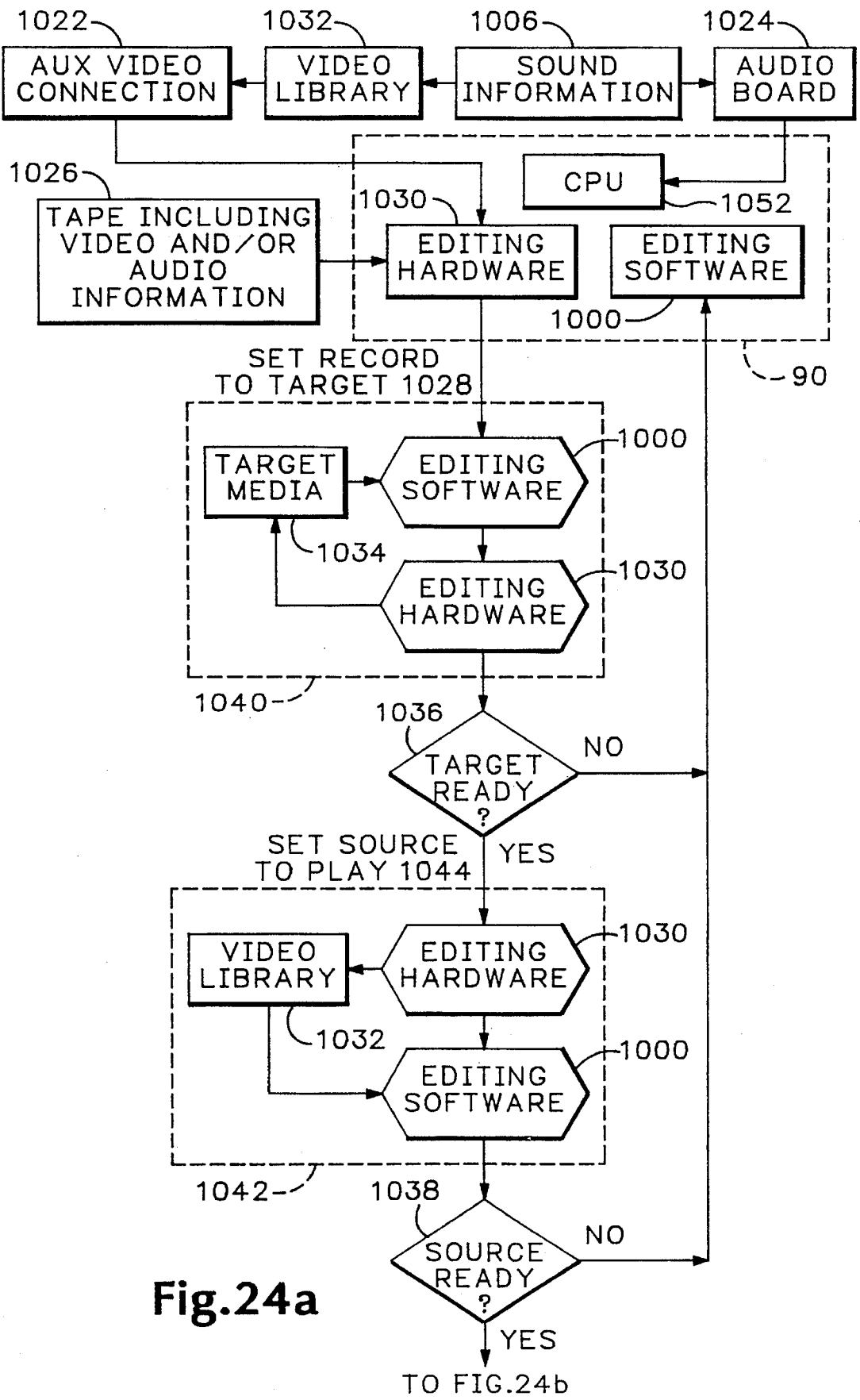
FIG. 24 is a schematic of a method and apparatus for conditioning a videotape.
Figure 24B:
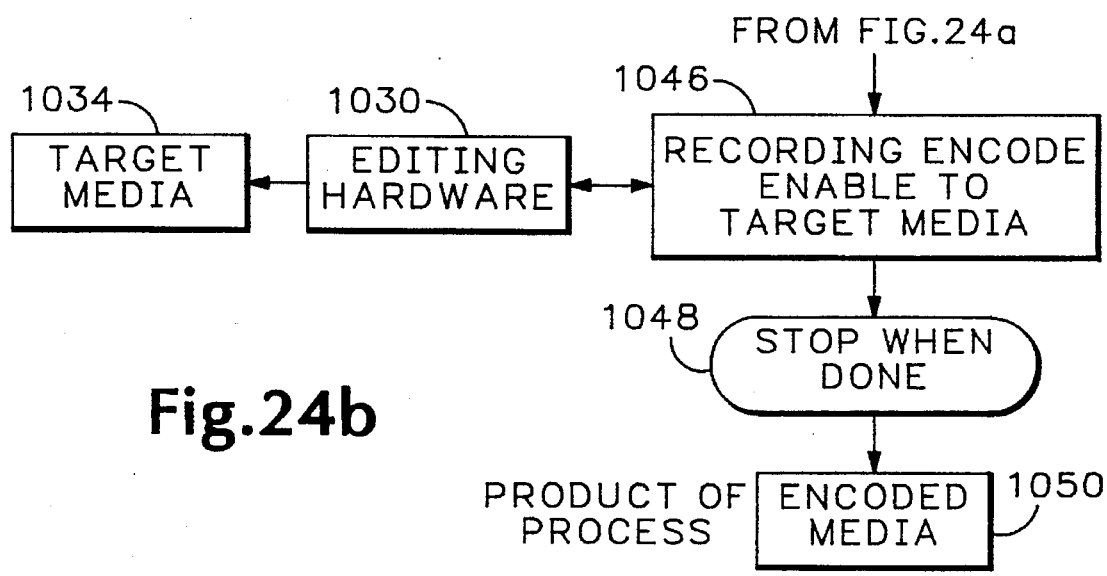

FIG. 24 shows a schematic flow diagram of a method and apparatus for conditioning a videotape. External resources such as sound information 1006, tape including video and/or audio information 1026, or any medium in a video library 1032 (discussed below) is preferably supplied through an audio board 1024 or an auxiliary video connection 1022 into the editing system 90. Sound information 1006 may also be overlapped with information from the video library 1032 and applied to the editing hardware 1030 through the auxiliary video connection 1022. Information which may be included in the video library 1032 includes, but is not limited to, video segments, raw television input, laser disc information, direct input from a video camera, film if it is translated into electrical or digital signals, or any other video information.

The tape is set to record 1028 by the editing system 90, including the editing software 1000, central processing unit (CPU) 1052, and editing hardware 1030. In the record mode 1028, the target media 1034 is initially put in the pause/record mode 1040. If the target is not ready 1036 the editing system 90 is notified. However, if the target is ready, the source media is set to play 1044 and put in the pause/play mode 1042. This is accomplished by a combination of the hardware 1030 controlling the video library 1032 or other source media and the editing software 1000. If the source is not ready 1038, the editing system 90 is notified. When the target media is in the pause/record mode 1040 and the source media is in the pause/play mode 1042, the source is recorded to the target media 1034 and properly encoded 1046 by the editing hardware 1030. When the conditioning is complete 1048 the result is an encoded media 1050 which may be manipulated and controlled by the editing software 1000 and the hardware 1030.

Figure 25A:
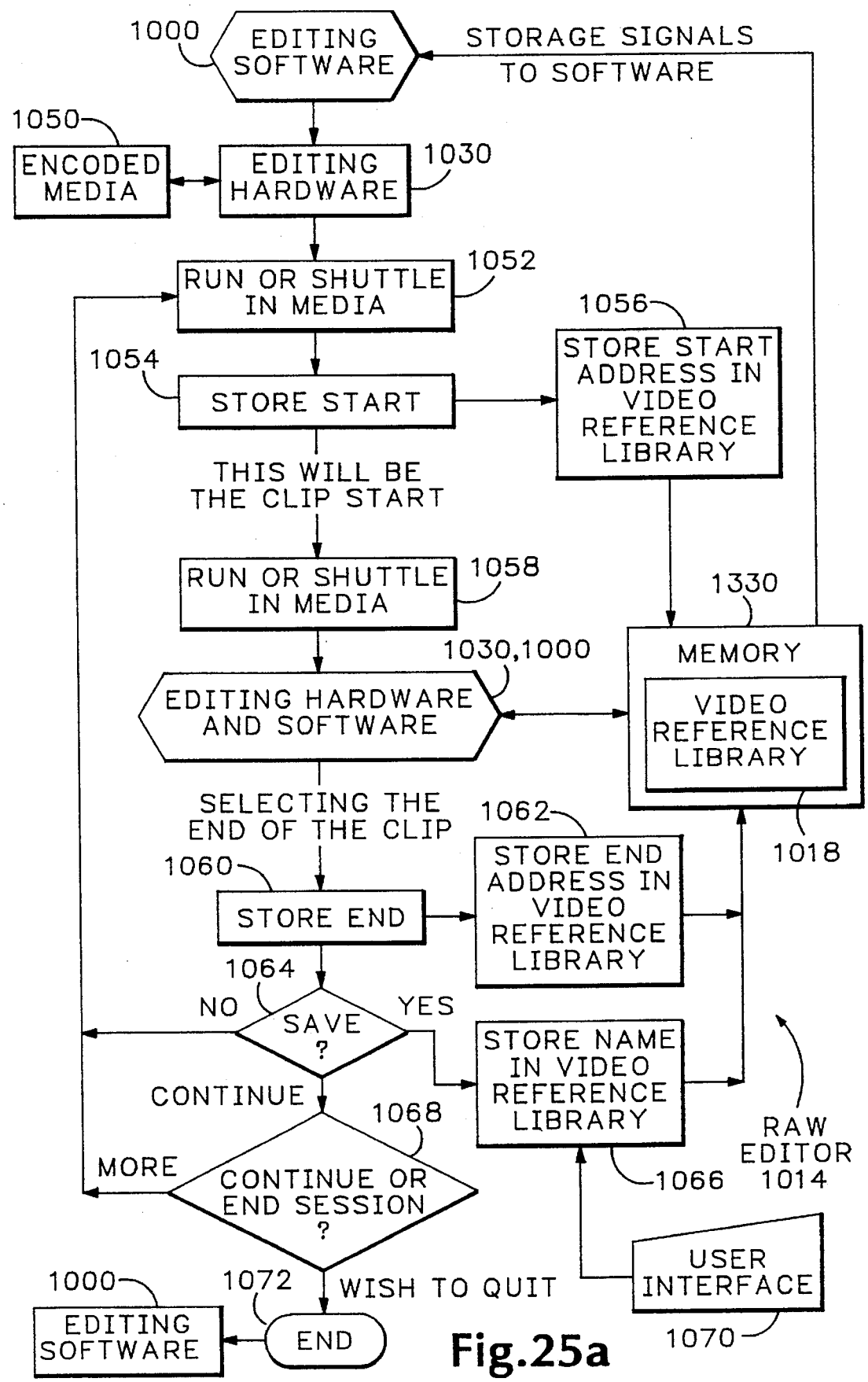
FIG. 25a is a schematic flow chart for another method and apparatus for editing raw videotape.

Referring again to FIG. 23, it can be seen that the visual editing software 1000, including a raw tape editor 1014, interacts with the hardware 1030 through a host/VCB interface 1020. The hardware 1030 controls the encoded media 1050 discussed above. The raw tape editor 1014, through the courseware development editor 1008, allows an instructor to select specific desired portions of the encoded media 1050. References to these specific portions are stored in the video reference library 1018 section of memory 1330 which functions similarly to a table of contents. The actual video information remains on the encoded media 1050. FIG. 25a is a schematic flow diagram generally encapsulating the raw tape editor 1014 which provides a means for editing and saving references to desired selections or clips of the encoded media 1050 to the video reference library 1018.

More specifically, FIG. 25a shows the editing software 1000 controlling the editing hardware 1030 which in turn accesses the encoded media 1050. The instructor is able to run or shuttle (play or otherwise move through the video) 1052 to a desired position on the tape 1050. The start position is preferably stored 1054 by storing a reference address of this "start" position in the reference library 1056 section of memory 1330. The instructor then runs or shuttles in the media 1058 which is again controlled by the editing software 1000 and hardware 1030. The instructor stops the media 1050 at the preferred ending place which is stored as the end of the clip 1060. A reference address of the end of the clip is preferably stored in the video reference library 1062 section of memory 1330. The instructor may then indicate whether this is the clip which is desired and whether it should be saved 1064. If it is not to be saved the instructor may return and select a new starting place 1052. If the clip is to be saved, the instructor 1070 designates a name for the clip which is stored in the reference library 1066 section of memory 1330 along with the start and end reference addresses. The instructor is then prompted to determine if the instructor would like to continue or end the session 1068. If the instructor wishes to continue the instructor may run or shuttle in the media 1052. If the instructor wishes to quit, the session will end 1072 and control is returned to the editing software 1000.

FIG. 25b shows the preferred embodiment of a screen which allows the instructor to control the raw tape editor 1014. The preferred embodiment may include such features as a source designator 1200 which allows the instructor to designate the source media and the target designator 1202 which allows the instructor to designate the target media. Means for designating the beginning of the clip 1204 and the end of a clip 1206 may also be provided. Means for shuttling may include a fast rewind button 1208, a slow or single frame rewind button 1210, a stop button 1212, a forward play button 1214, a slow single frame forward play button 1216, a pause button 1218, and a fast forward button 1220. A means for the instructor to control the speed of the tape may also be included in the form of a dial 1222. A list of already prepared or selected clips may also be included 1224. Also, a screen 1226 which displays the clips as it is being manipulated by the raw editor is preferably provided. Preferably, other features are included such as a means for starting the copy, reviewing the clip, saving the clip, deleting the clip, seeking to the beginning, seeking to the end, controlling the ejection of the actual videotape, indicating the seek by time, counting the tape length, assessing help, and closing the raw editor. It should be noted that these features are meant to be exemplary, and are not meant to limit the scope of the invention.

Figure 26A:
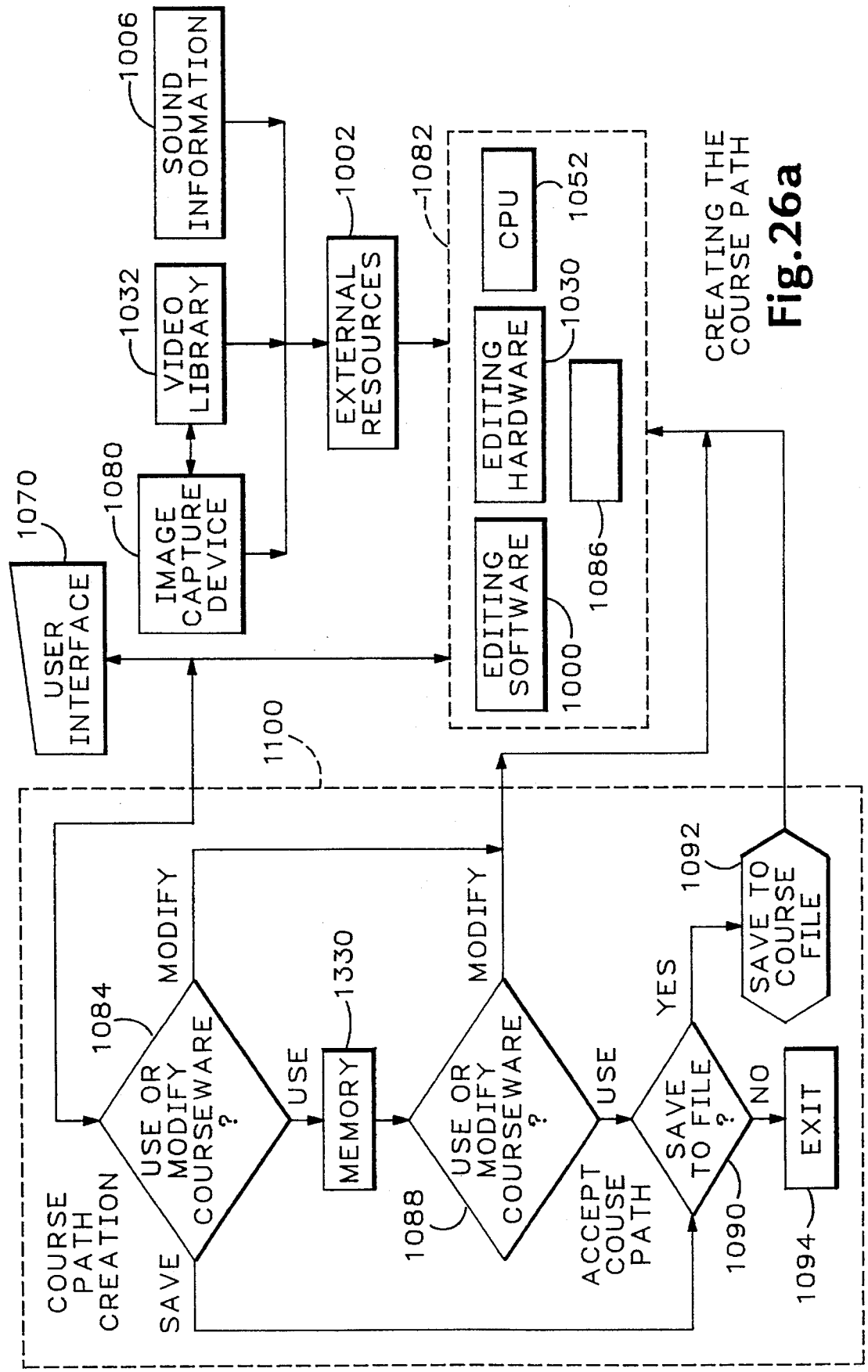
FIG. 26a–26d are schematic flow charts of a method and apparatus for creating a course path.

FIG. 26a is a schematic flow diagram of a means and apparatus for creating the course path of an interactive video instructional tape 1150. An instructor 1070 creates or modifies a course path using the course path creation method and apparatus 1100 and portions of the editing system shown in box 1082 and their respective connections. The instructor interfaces 1070 with the course path creator 1100 to create, save, use, or modify courseware 1084 by using elements of the editing system 90 shown in box 1082. After the instructor has completed the process, the course path is stored in a relatively permanent memory 1330 such as the hard disk. The instructor may then accept the course path by either using the changes or returning to further modify the course path 1088. If the instructor decides to use or accept the current version of the course path, it may be saved to a file or the instructor may choose to abandon the changes 1090 and exit the system 1094. If the instructor chooses to save the course file 1092, the course path is saved by the CPU 1052 in memory 1330.

Figure 26B:
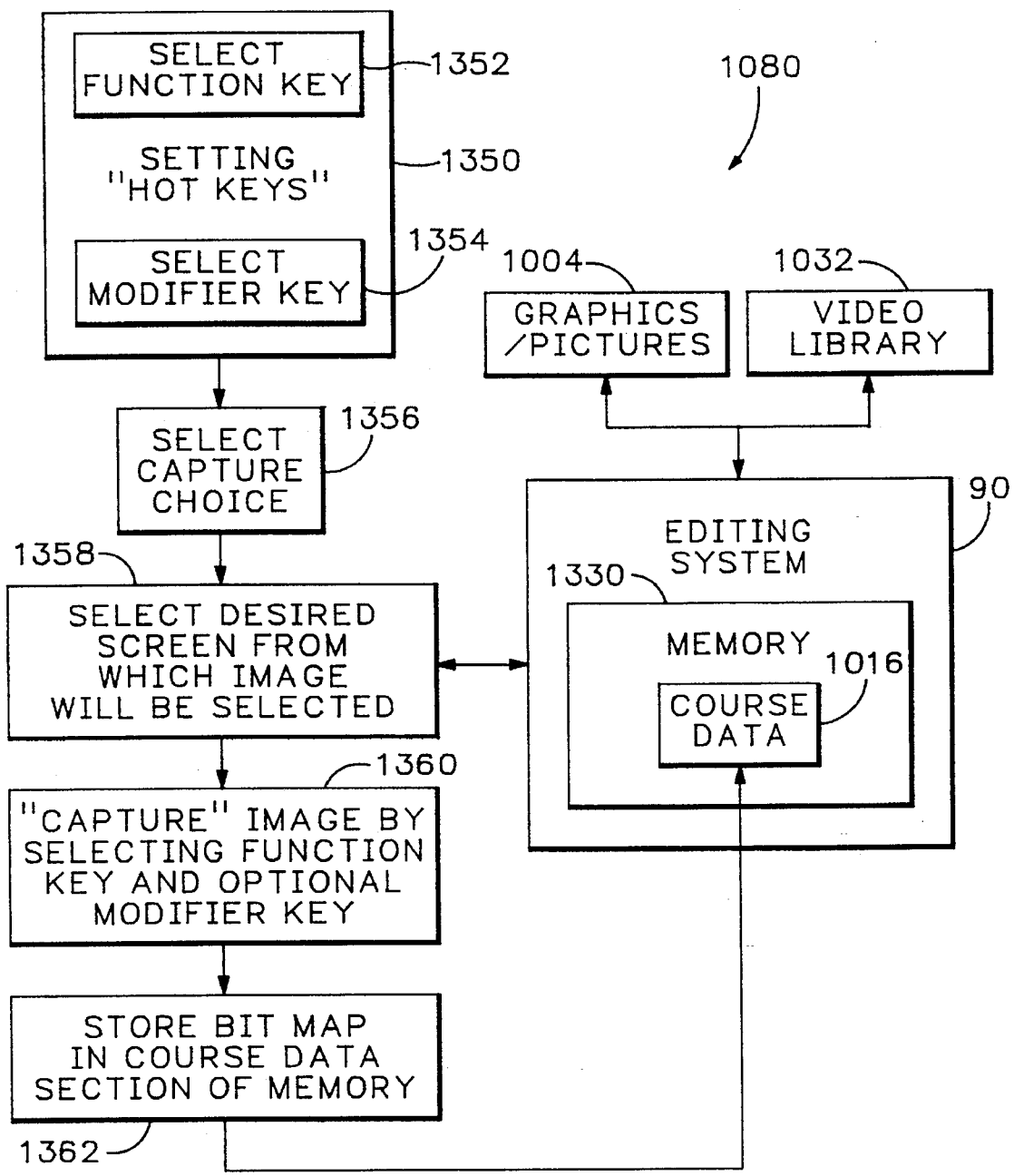

The portions of the editing system shown in box 1082 and their respective connections as access to external resources 1002 including sound information files 1006, the video library 1032 (including clips prepared by the raw tape editor 1014), and "still images" captured by an image capture device 1080. The image capture device 1080, as shown in FIG. 26b is a unique system designed for conversion of visual images depicted on a computer screen (such as any information from the video library 1032 or still media graphics 1004) to a common still media format such as .GIF, .BMP, .JPEG, .TIFF, or any other format. The image capture device 1080 of the present invention is capable of capturing or "grabbing" a bit map or structure of any screen in any application in a windows environment. The procedure for using the present invention's image capture device 1080 involves the setting of activators or "hot keys" 1350 and defining a capture choice 1356. The inventor may select or set a hot key preference option such as a function key (for example F1 or F2) 1352 and an optional modifier (for example Alt, Ctrl, or Shift) 1354. The instructor may define a capture choice 1356 such as a window, a client area, an area on the current working boundaries, an active window, an entire desk top, a variable capture boundary which may be defined using the mouse point and click features, or any other designated capture choice. The instructor selects a desired screen from which the image will be selected 1358 using features of the editing system 90 such as the raw editor 1014. The instructor may then capture an image shown on any screen field by pressing or activating the function key and modifier 1360. The instructor may then save the image as a bit map or in other standard formats in the course data section of memory 1362. The memory 1330 may be a storage medium (such as the hard disk or internal memory in the CPU 1052 or editing system 90) as a file to be used by the course path creator 1100. It should also be noted that the image capture device 1080 preferably captures images without generational loss between subsequent copies. The above description of the image capture device 1080 is meant to be exemplary and is not meant to limit the scope of the invention. Further, the image capture device 1080 may include additional features.

Figure 26D:
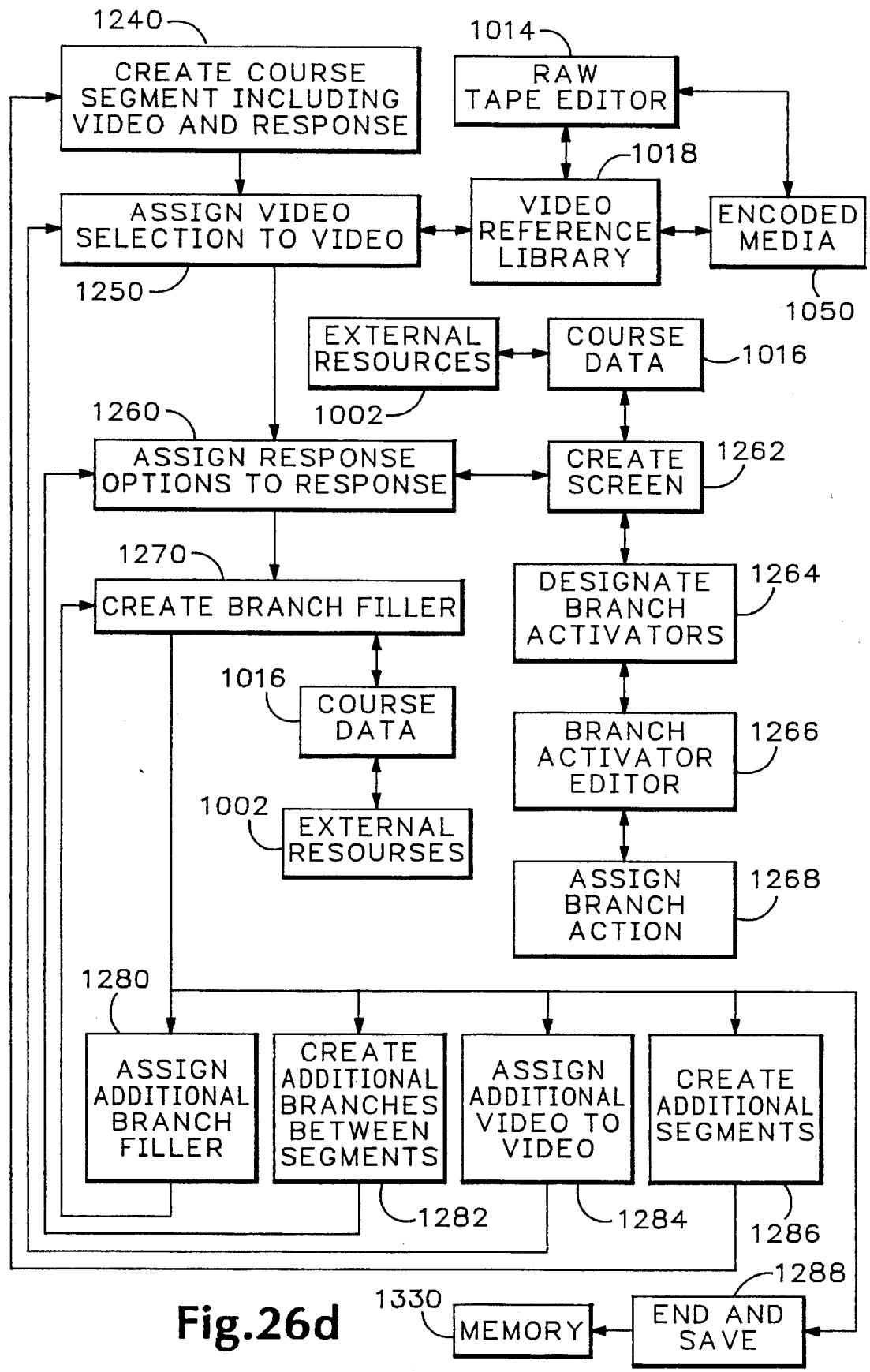

FIG. 26a includes portions of the editing system 1082 including the method and apparatus 1086 shown in the schematic flow diagrams of FIG. 26c and FIG. 26d. FIG. 26c shows an overview schematic diagram of the course segments 1308 and branches 1306. The instructor may interact with various aspects of the editing system 90 including the editing software 1000, the editing hardware 1030, and the CPU 1052. The CPU further includes memory 1330 which preferably has dedicated address locations for the video reference library 1018 and course data 1016. The instructor creates the course overview 1300 which may include course segments 1308 which may be connected by branches 1306. The course segments 1308 generally consist of video elements or screens 1302 and response elements or screens 1304.

FIG. 26d is a flow chart of the method and apparatus for creation of the course segments 1308 and branches 1306 and related elements of a course. An instructor creates a course segment including a video and response 1240. At this point, the course segment 1308 contains no information and no connections other than the branch 1306 between the video element 1302 and the response element 1304. The user may assign a video selection or clip to the video element 1250. Selections may be made from the video reference library 1018 which may reference the encoded media 1050. The raw tape editor 1014 may further modify the video reference library 1018 as discussed above. Multiple video selections or clips may be assigned to a single video element 1302. The instructor may then assign response options to the response element 1260. A response screen (an example of which may be seen in FIG. 27j) may be created 1262 which includes a "still picture" from the course data 1016 (and the external resources 1002). The instructor may also designate branch activators 1264 by a branch activator editor which also can assign a branch action 1268 to each branch activator. Actions may include, but are not limited to, taking a path to another video element, ending the program, or doing nothing. The instructor may then create branch filler 1270 such as a still picture or music from the course data 1016. The filler preferably shows or plays while the editing system 90 accesses the appropriate portion of the course on the interactive video instructional tape 1150. The instructor may then continue editing the course path by assigning additional branch filler 1280, creating additional branches between segments or elements 1282, assigning additional video clips to a video element 1284, creating additional course segments 1286, or ending and saving 1288 the course path in memory 1330 (which may be the hard disk or other storage medium).

FIGS. 27a–27i show the building of a course path using four types of screens in the preferred embodiment of the present invention. The four preferred screens correspond to the steps of the same numbers in FIG. 26d and include the course creator screen 1240, the video assignor screen 1250, the response option assignor screen 1260, and the branch filler creator screen 1270. These screens are preferably divided into a pictorial or icon section 1230 and an information section 1032. Tools which may be used in the creation process may be accessed by pull down menus, buttons on the button bar, control keys, or other standard means. Examples of tools which are preferably available, as shown on the button bar 1234, include the following: a means for changing files or courses; a means for opening a file; a means for saving a file; a means for cutting or removing parts of the course; a means for pasting previously cut, saved, or copied course elements into the current course; a means for creating new lesson segments; a means for linking course elements using a branch arrow with the creation of a segue having content; a means for entering the video tape raw editor; a means for seeing the content of a course segment; a means to run the course; and help files.

These tools are meant to be exemplary and are not meant to limit the scope of the invention.

Figure 27C:
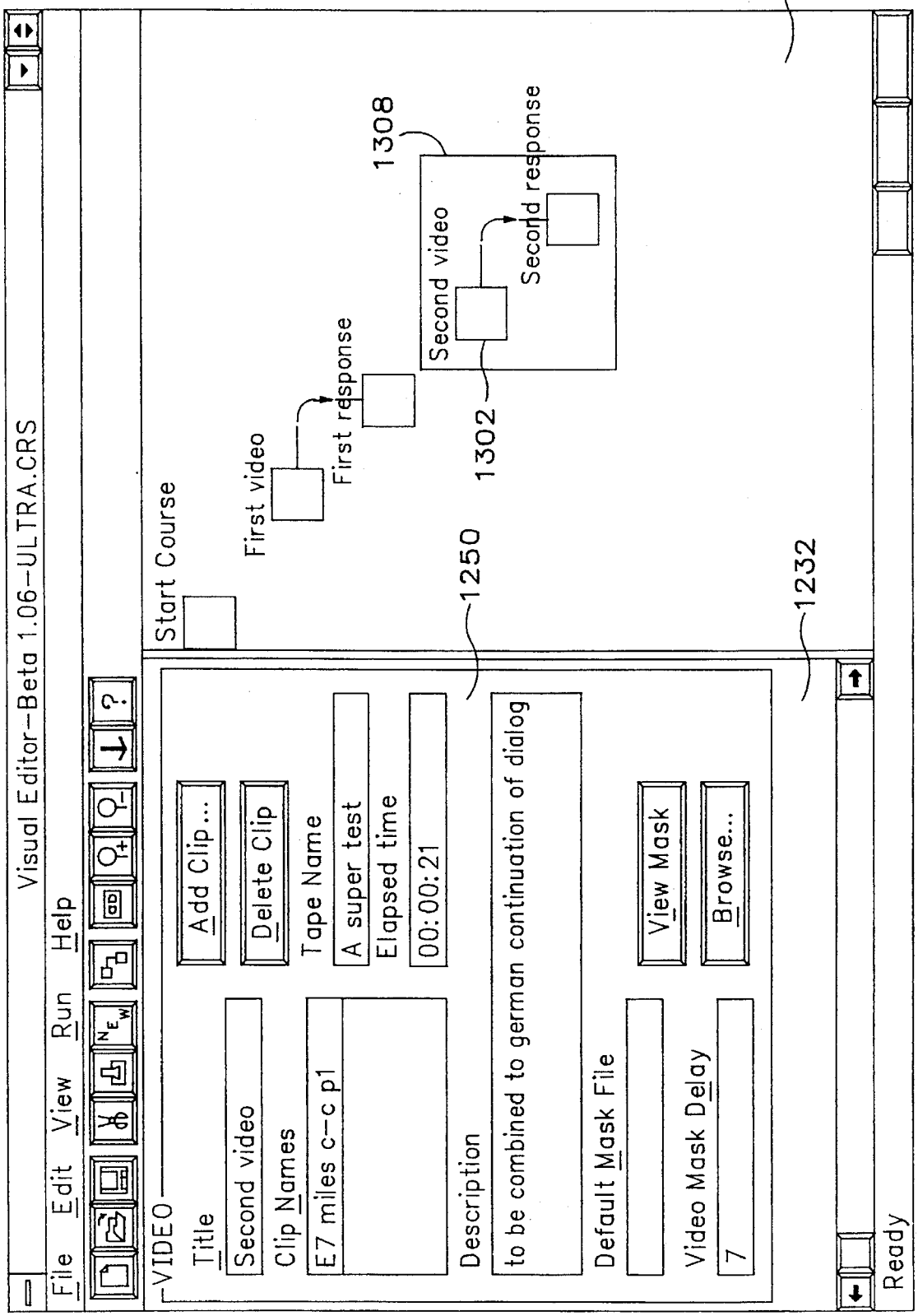
Figure 27D:
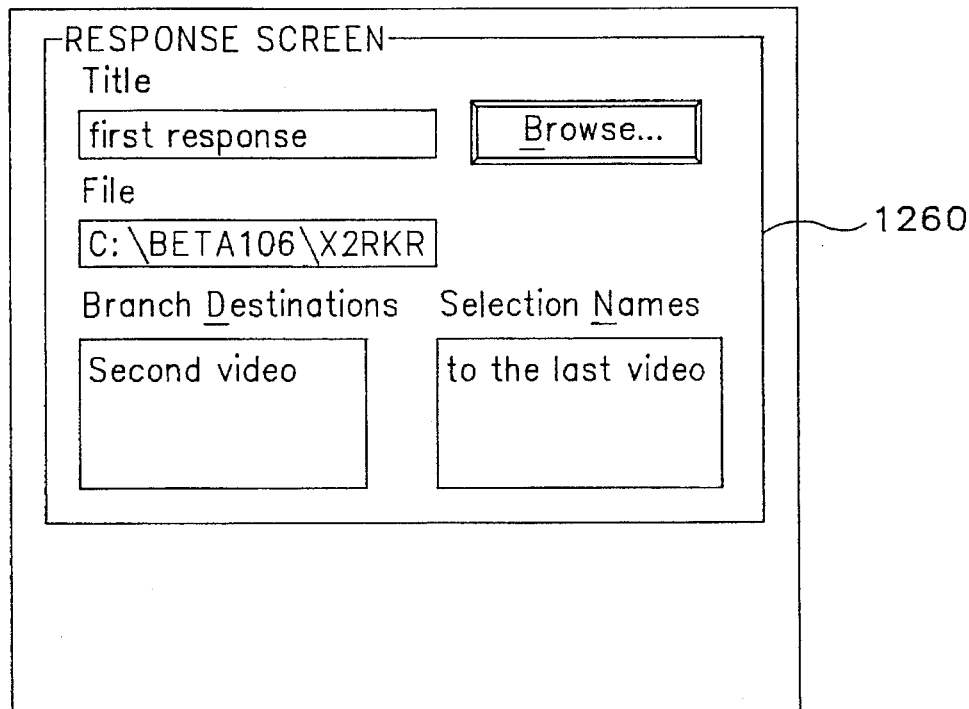
Figure 27E:
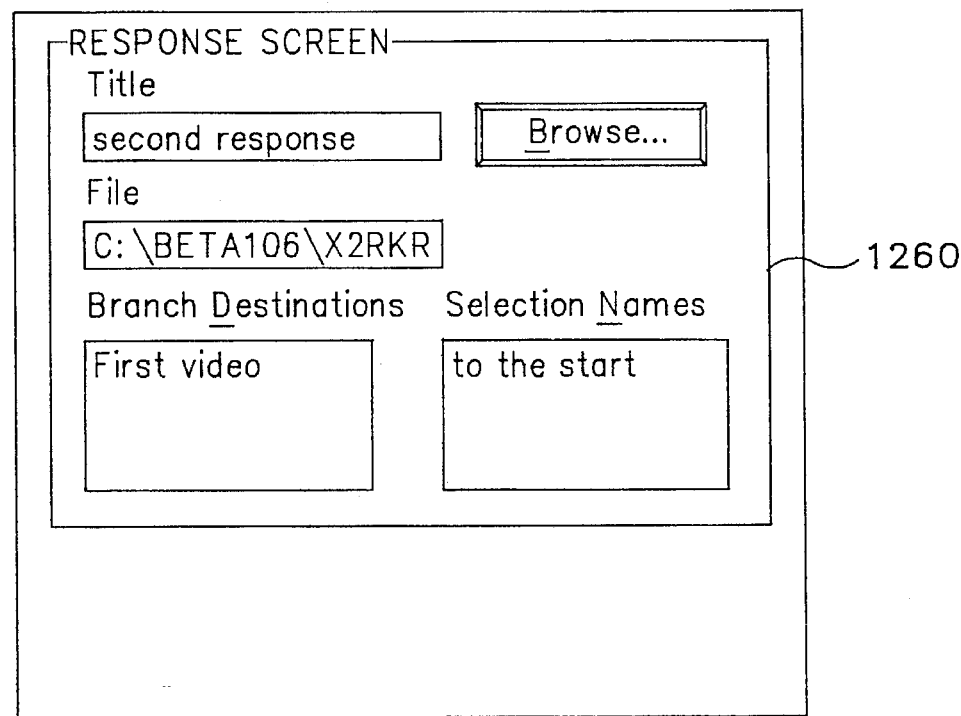
Figure 27F:
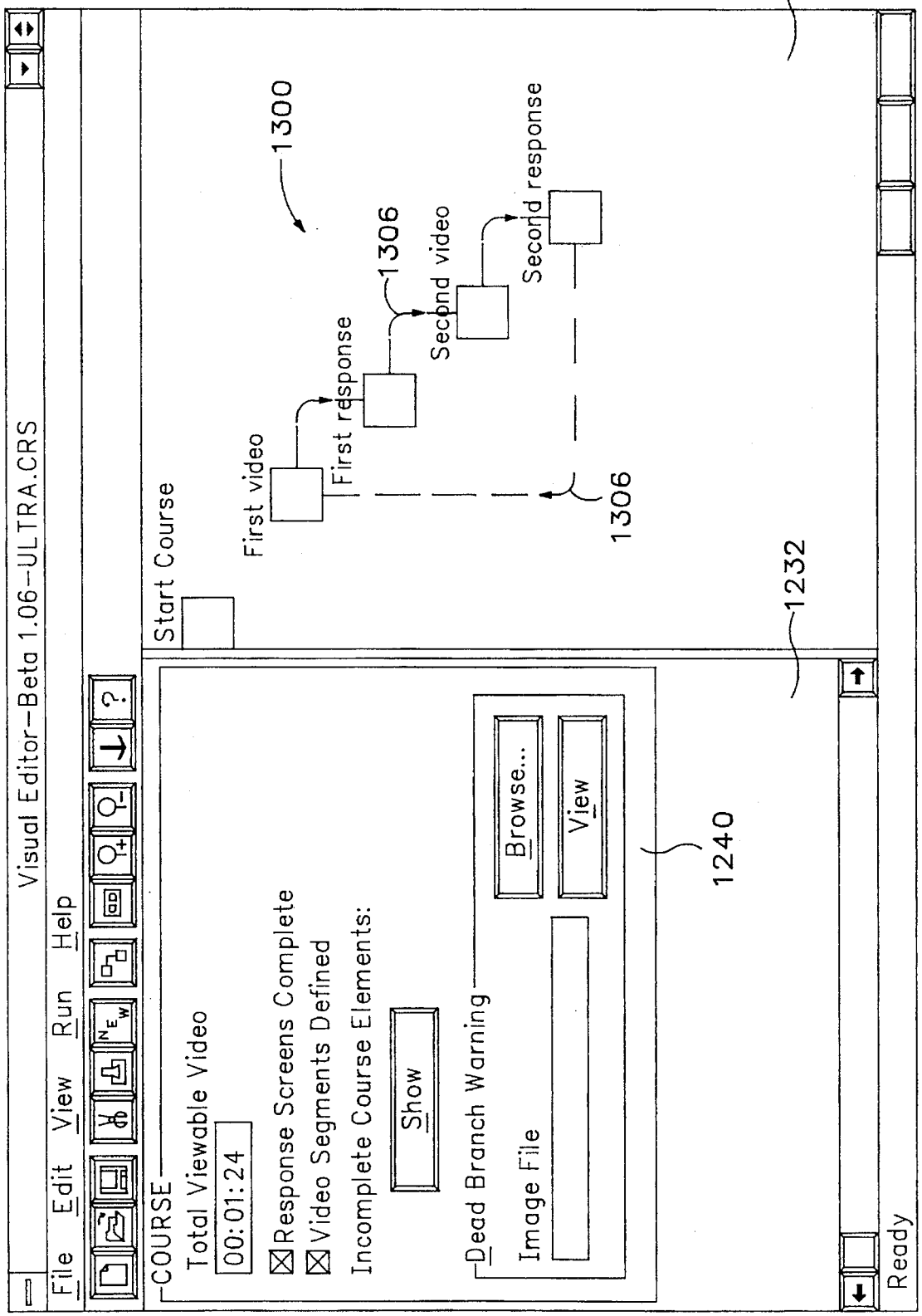
Figure 27G:
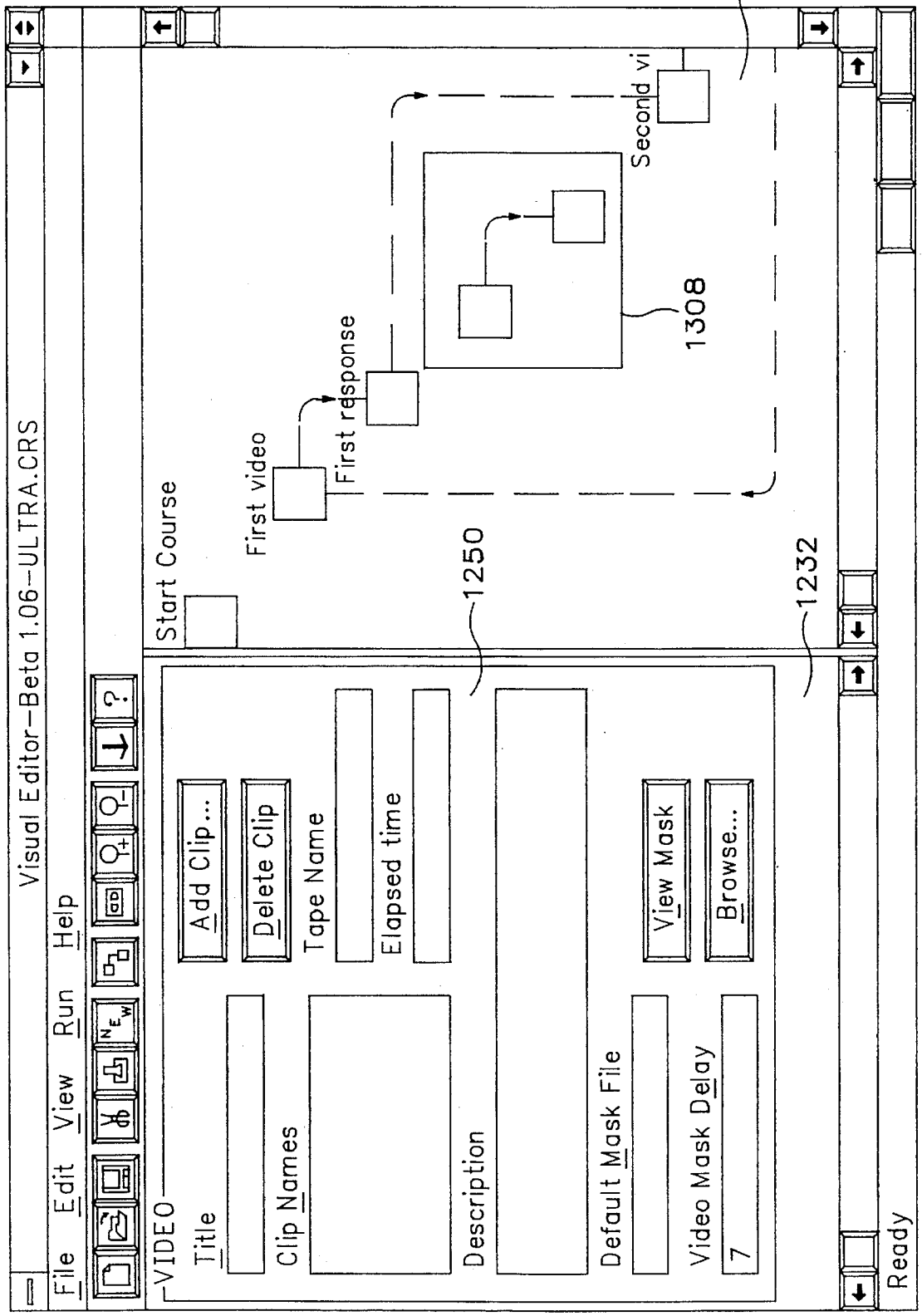
Figure 27H:
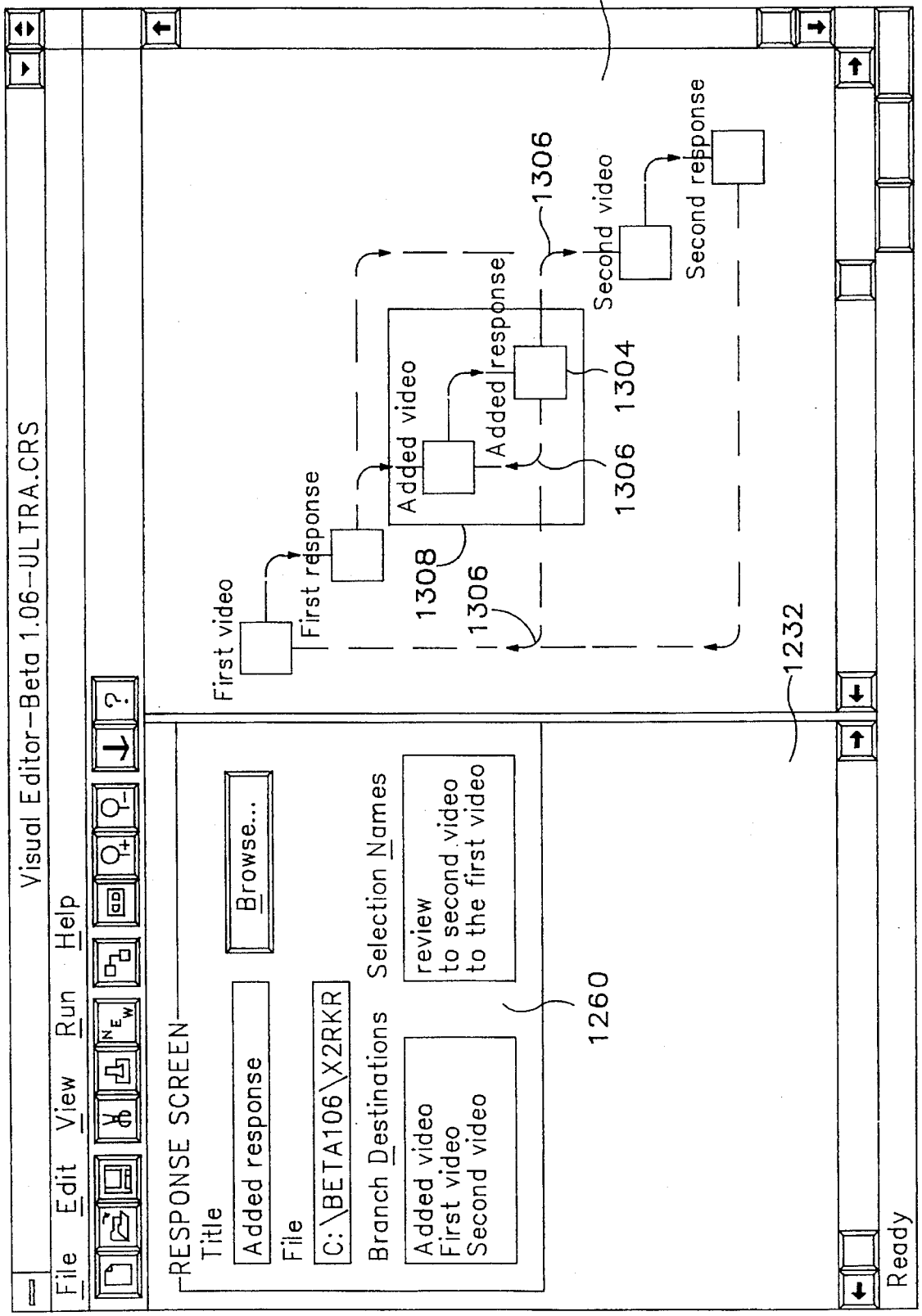
Figure 27I:
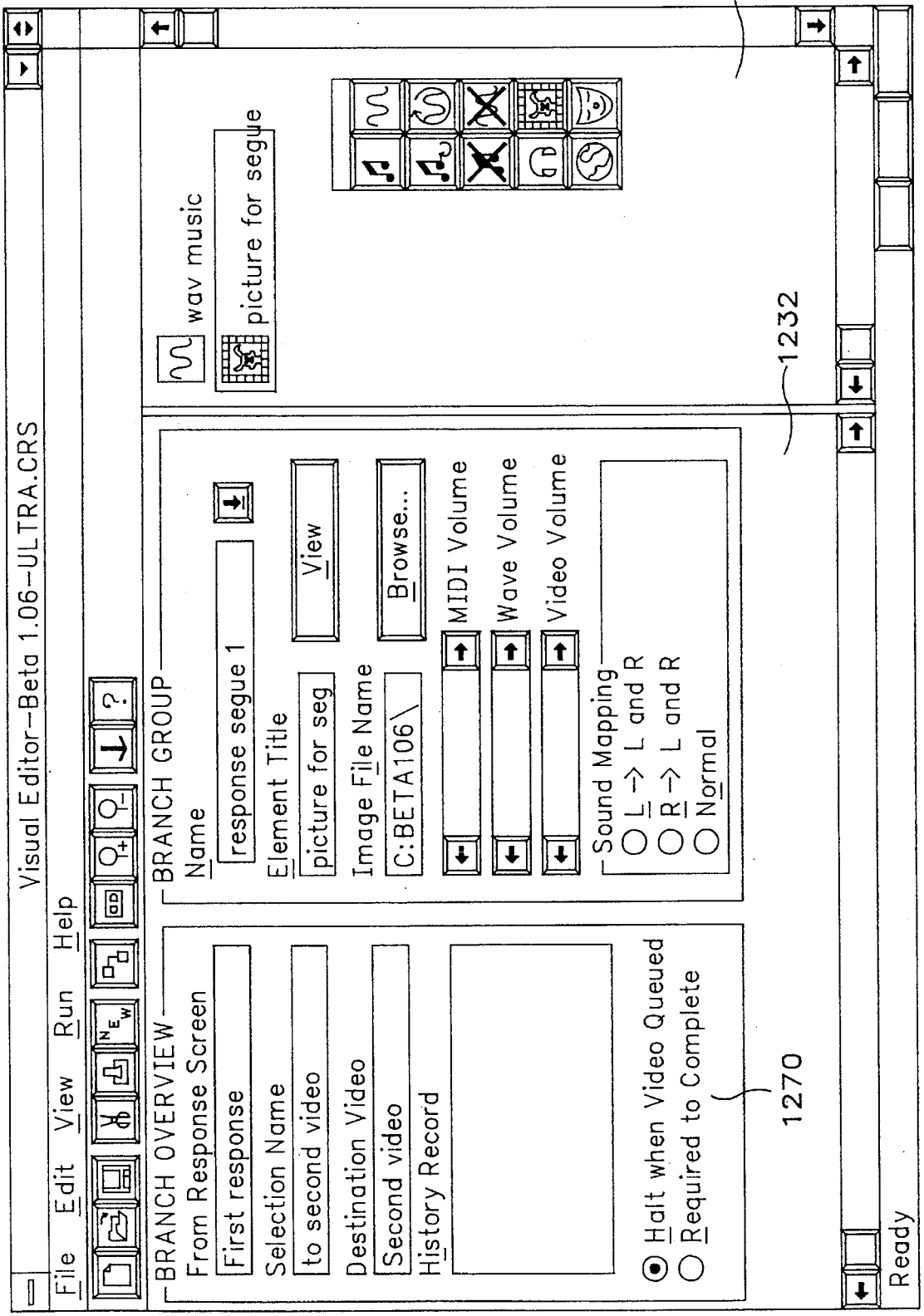

FIG. 27a shows the course creator screen 1240 and the creation of a first course segment 1308 which includes a video element 1302 "first video" and a response element 1304 "first response" connected by a branch 1306. FIG. 27b shows a video assignor screen 1250 which the instructor uses to assign a video selection to the video element 1302 "first video." In this example, the instructor has assigned a video clip "Vid 1 cut 1" to "first video." The instructor may add more than one video clip to the same video element 1302. The instructor may then add another course segment 1308 and assign a video selection to the video element 1302 as shown in FIG. 27c. In this section, the video clip "E 7 miles c—c p1" is assigned to the video element 1302 "Second video." At this point the instructor may connect the course segments 1308 by assigning response options to the response elements 1304. FIG. 27d shows that the response element 1304 "first response" is connected to the video element 1302 "second video" by a branch 1306 "to the last video." FIG. 27e shows that the response element 1304 "second response" is connected to the video element 1302 "first video" by a branch 1306 "to the start." FIG. 27f shows the course overview 1300 which includes the branches 1306 created in FIGS. 27e–27f. The instructor may add additional course segments 1308 at any point in the course as shown in FIG. 27g. FIG. 27h shows branch connections of the added course segment 1308. More specifically, the response element 1304 is connected to "added video," "first video," and "second video." FIG. 27i shows a branch filler creator screen 1270 which assigns a music selection and/or a still picture selection to a branch 1306.

Figure 27J:
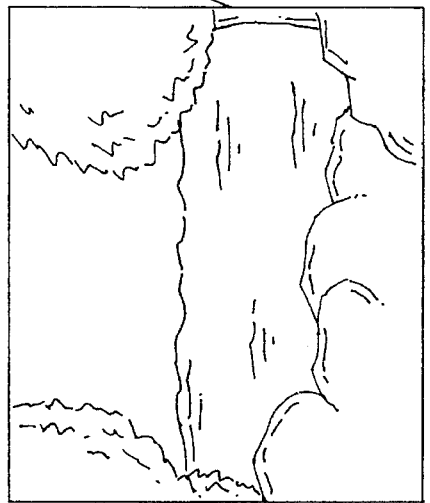
FIG. 27j is a representative response screen.

FIG. 27j shows an exemplary response screen 1160. A response screen may include, for example, text 1162, graphics or still pictures 1164, and branch activators or hot keys 1166. Each branch activator 1166 preferably corresponds to a specific branch 1306 of a course path.

As the course is being built, information regarding the course path is stored in a section of memory 1330 which is preferably RAM or other relatively temporary memory means. When the course path is complete, it may be stored in a section of memory 1330 which is preferably the hard disk or other relatively permanent memory means. The actual video clips, referenced by the addresses in the video reference library 1018, remain on the encoded media 1050 which is controlled by the editing hardware 1030.

Figure 28:
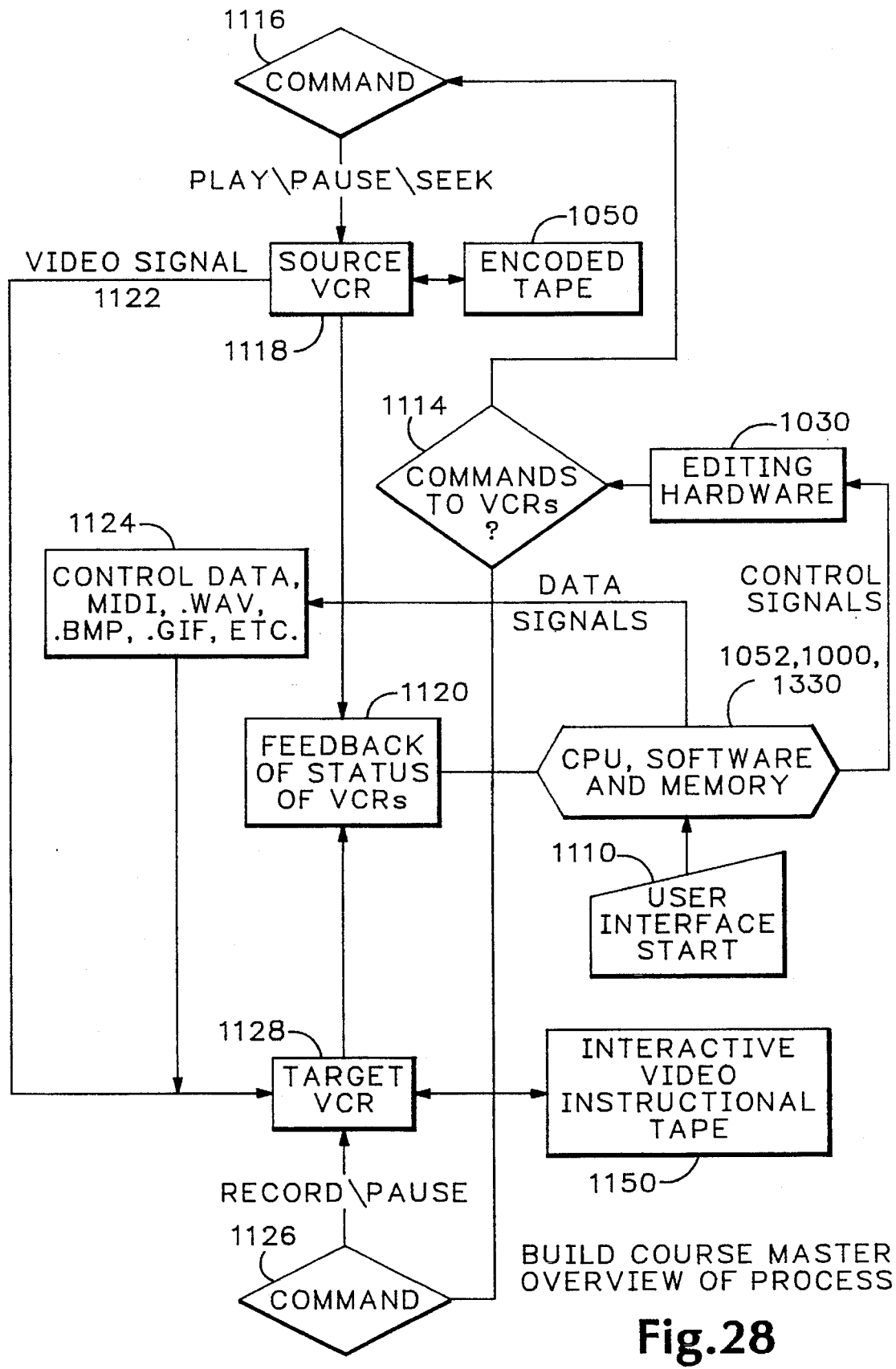
FIG. 28 bears a schematic flow diagram of a method and apparatus for building a course master interactive video instructional tape.

FIG. 28 is a schematic flow diagram of the method and apparatus for building the course master tape. The instructor indicates to the CPU 1052 and editing software 1000 that the instructor wishes the interactive tape to be recorded or created 1110. The CPU 1052 and editing software 1000 send signals to the editing hardware 1030 which sends play, pause, and seek commands 1116 to at least one source VCR 1114. The target VCR 1128 receives commands 1126 to record and pause. The target VCR 1128 performs these operations on the target course tape or interactive video instructional tape 1150. The source VCR 1118 accesses encoded media 1050 and performs the proper functions to send video signals 1122 to the target VCR 1128. The source VCR 118 also sends status information to the CPU 1052. The CPU 1052 and software 1000 also send data signals and information regarding the course path and selections from the course data 1016 section of memory 1330 such as control data, MIDI, .WAV, BMP, .GIF, and other information. The target VCR 1128 writes the information it receives to the target interactive video courseware tape 1150 and sends feedback of its status 1120 to the CPU 1052 and software 1000. It should be noted that once the instructor initiates this process, the preferred embodiment of the invention automatically completes the actual process using the course path as a "road map."

The interactive video courseware tape 1150 may be used by a student taking the course on the editing system 90 or it may be used by a student on a viewing system 92. When the student takes the course, the specific path chosen by the student is recorded on the audio portion of the interactive video courseware tape 1150. This allows an instructor to review the path the student chose using the course test and verify sub-unit 1012 of the editing system 90. The chosen course path may be stored to memory 1330 along with the course paths chosen by other students to allow the instructor to keep statistical data on the course results. The editing system 90 will preferably include a method and apparatus for refreshing the interactive video courseware tape 1150 to allow multiple use of a single tape. For example, such refreshing may include erasing the linear audio track portions thereof.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A system for the creation of an interactive video courseware tape comprising:

(a) a system bus electrically connecting a mother board, interface board, video capture board, audio control board, audio board and video control board together;

(b) said mother board including a microprocessor with associated random access memory for executing editing software;

(c) said editing software including a port structure and a host/VCB interface for communications to and from the video control board;

(d) said interface board electrically connected with a disk drive for the transmission of and receipt of information;

(e) said video capture board capable of receiving digital data from said system bus and displaying said digital data as an image on a computer screen;

(f) said video capture board also capable of receiving video signals and displaying said video signals on said computer screen as an image;

(g) said video control board including a serial interface and a video interface for sending and receiving signals from a video cassette recorder control board, said video control board further comprising:

(i) a host interface connected to said system bus;
  (ii) a microprocessor, random access memory and read only memory to process commands;
  (iii) an error correction chip with an associated tri-state buffer which under control of the microprocessor that can add additional error correction bytes to digital data;
  (iv) a digital video generator/recover circuit to encode digital data into a binary video signal by gating the digital data controlled by a timing control circuit;
  (v) a video mux operatively connected with said generator/recover circuit to selectively gate said binary video signal with video control signals to create a complete video signal;
  (vi) said complete video signal transmitted on said video interface;

(h) said audio control board serially connected to said video control board through a video controller interface, and said audio control board operating in two modes, namely;
- (i) a first mode that is a pass-through mode where digital signals from said video control board are recorder board for recording on said tape's linear audio track;
- (ii) a second mode that generates command codes to control a video cassette recorder connected to said audio control board's serial port;

(i) said video cassette recorder control board connected to said video control board and said audio control board to pass commands to said video cassette recorders and read and write video signals from said video cassette recorders, and further comprising;
- (i) a relay for selecting the linear audio track;
- (ii) damping circuits in the outputs of the video cassette recorder board selected for the source video cassette recorder;
- (iii) a microprocessor.

* * * * *